(12) United States Patent  
Horiguchi

(10) Patent No.: US 8,411,237 B2  
(45) Date of Patent: Apr. 2, 2013

(54) LIQUID CRYSTAL DEVICE, METHOD OF MANUFACTURING LIQUID CRYSTAL DEVICE, AND ELECTRONIC APPARATUS

(75) Inventor: Masahiro Horiguchi, Tottori (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 12/363,068

(22) Filed: Jan. 30, 2009

(65) Prior Publication Data

US 2009/0141219 A1  Jun. 4, 2009

Related U.S. Application Data

(63) Continuation of application No. 11/426,130, filed on Jun. 23, 2006, now abandoned.

(30) Foreign Application Priority Data

Jul. 6, 2005  (JP) ................................. 2005-197074  
Mar. 29, 2006  (JP) ................................. 2006-90365

(51) Int. Cl.  
*G02F 1/1335* (2006.01)  
*G02F 1/1333* (2006.01)  
(52) U.S. Cl. ......... 349/114; 349/107; 349/108; 349/138  
(58) Field of Classification Search .................. 349/114, 349/138, 106–109  
See application file for complete search history.

(56) References Cited

U.S. PATENT DOCUMENTS

| | | | | |
|---|---|---|---|---|
| 7,030,948 B2 * | 4/2006 | Fujimori et al. | ............... | 349/114 |
| 2005/0105023 A1 * | 5/2005 | Kim et al. | ...................... | 349/114 |
| 2005/0237450 A1 * | 10/2005 | Hu et al. | ........................ | 349/108 |
| 2005/0270449 A1 * | 12/2005 | Koma et al. | ................... | 349/114 |

FOREIGN PATENT DOCUMENTS

| | | |
|---|---|---|
| JP | 2004-004822 | 1/2004 |
| JP | 2004-078218 | 3/2004 |
| JP | 2004-102292 | 4/2004 |

* cited by examiner

*Primary Examiner* — Bumsuk Won  
*Assistant Examiner* — Charles Chang  
(74) *Attorney, Agent, or Firm* — K&L Gates LLP

(57) ABSTRACT

A liquid crystal device includes display pixels corresponding to at least a color of white or non-coloring and one color different from the color of white or non-coloring. Each of the display pixels corresponding to one color have a transmissive region and a reflective region. Each of the display pixels corresponding to the color of white or non-coloring have only a transmissive region. Colored layers are provided in the display pixels that correspond to one color, and cell-thickness-adjusting layers are included in the reflective region of each of the display pixels corresponding to one color and the transmissive region of each of the display pixels corresponding to the color of white or non-coloring. For the display pixels corresponding to one color, a thickness of a layer crystal layer corresponding to the transmissive region is larger than a thickness of the liquid crystal layer that corresponds to the reflective region.

16 Claims, 27 Drawing Sheets

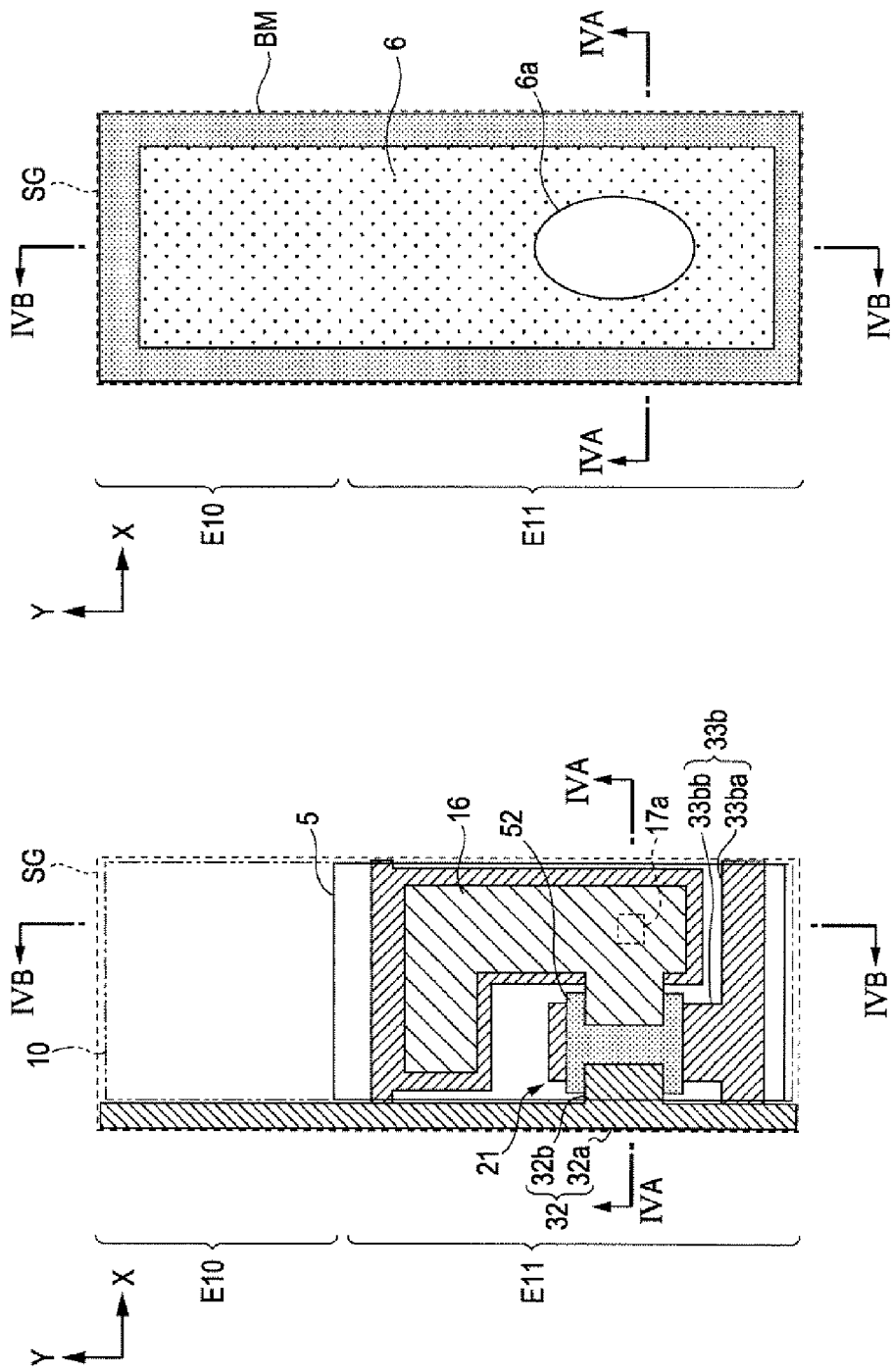

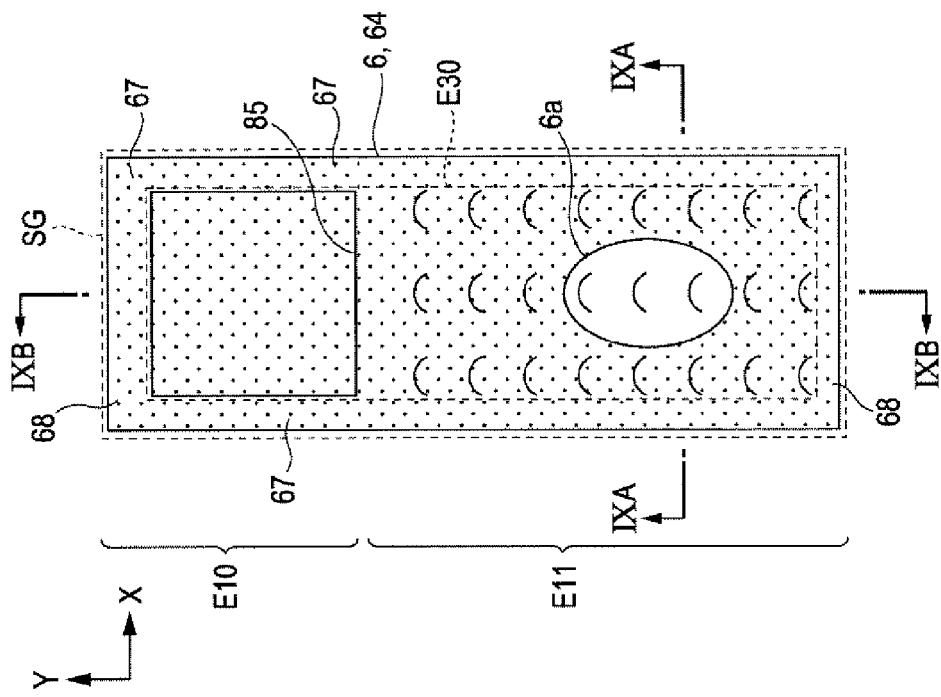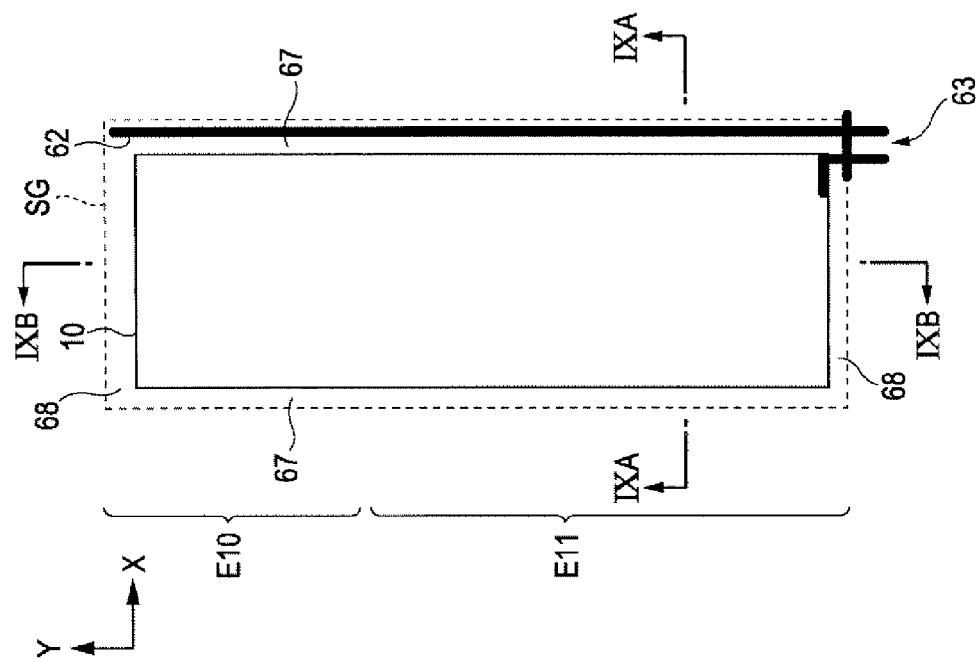

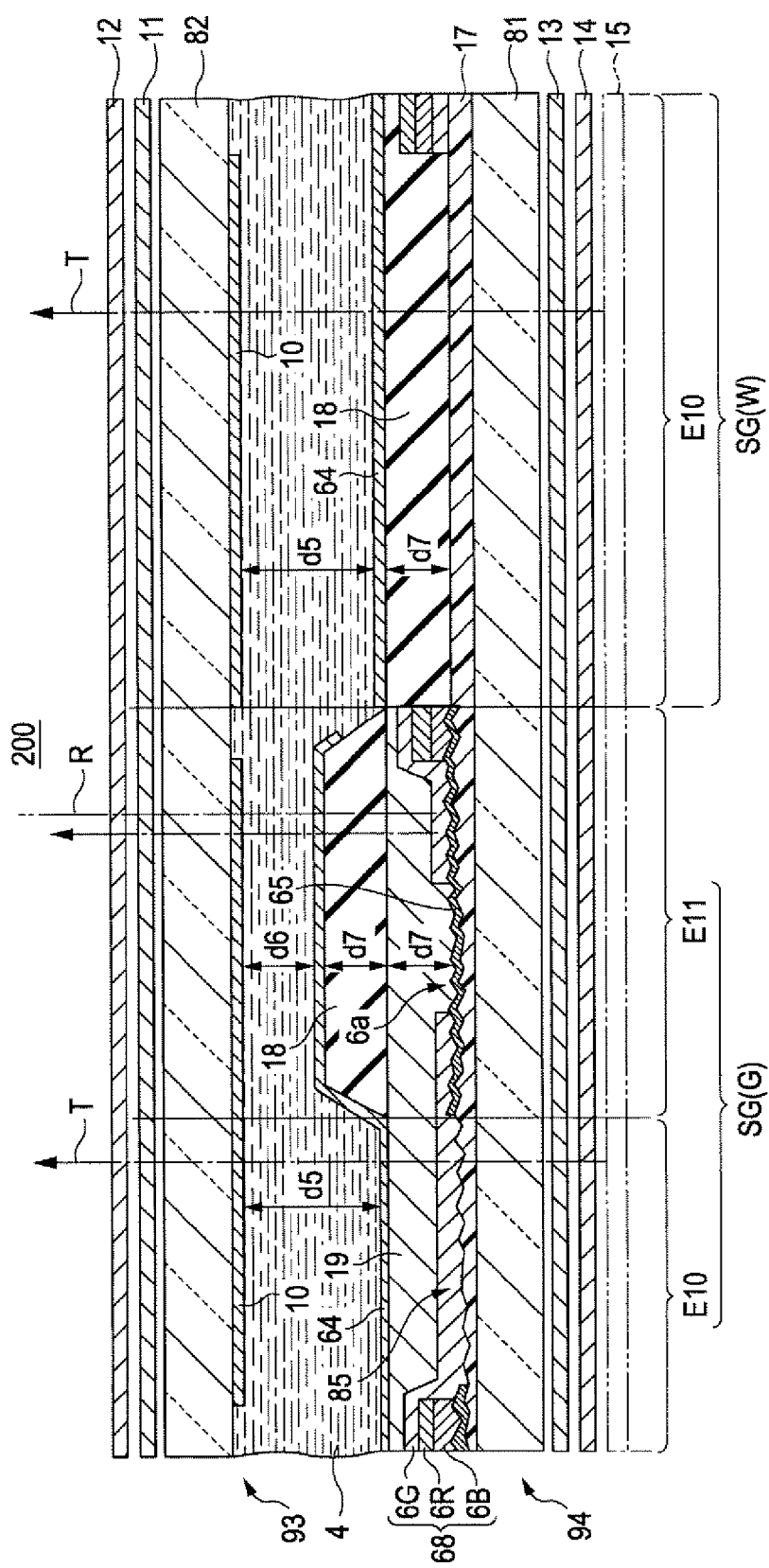

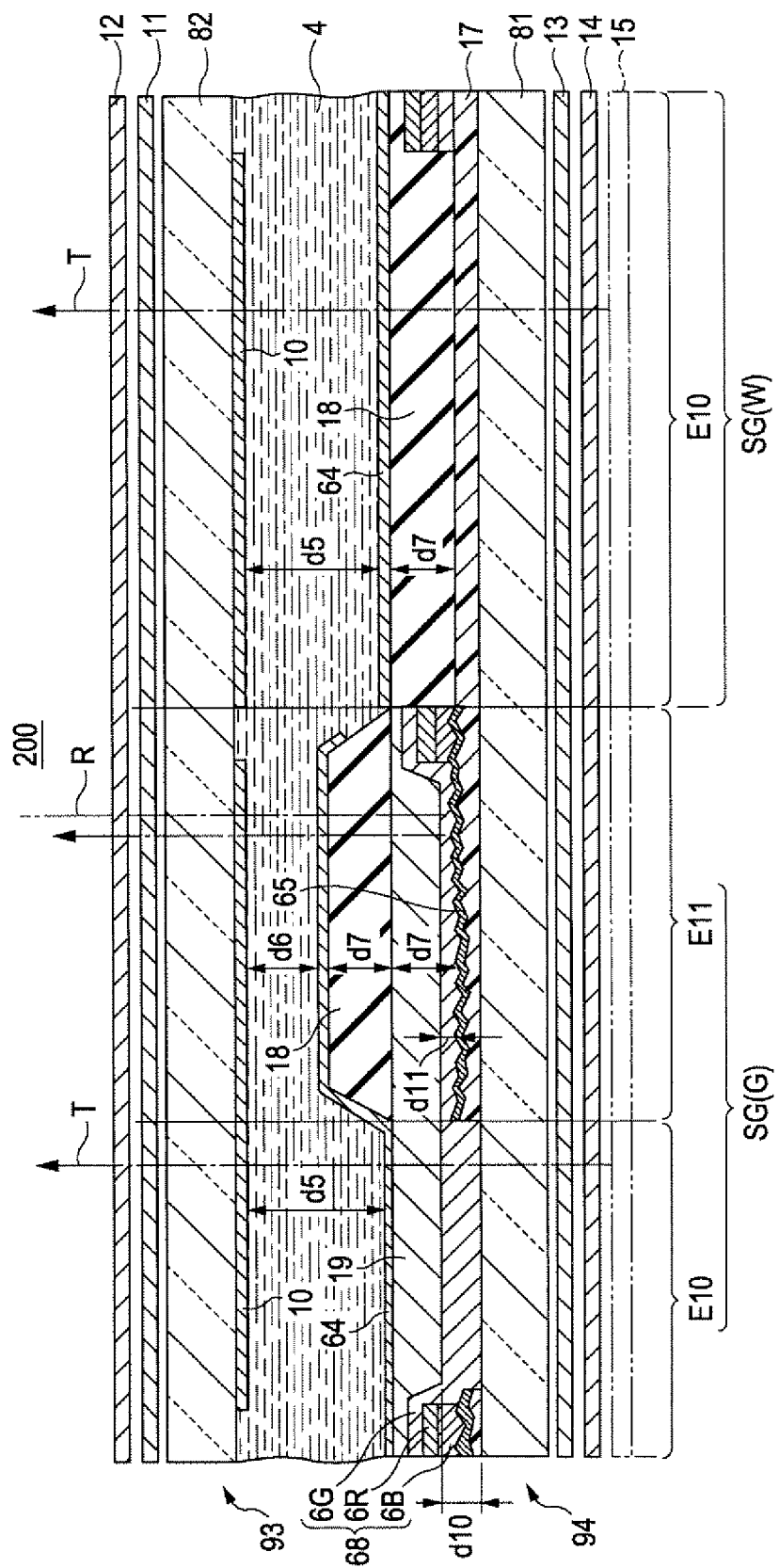

(PROCESS P1)

(PROCESS P2)

(PROCESS P3)

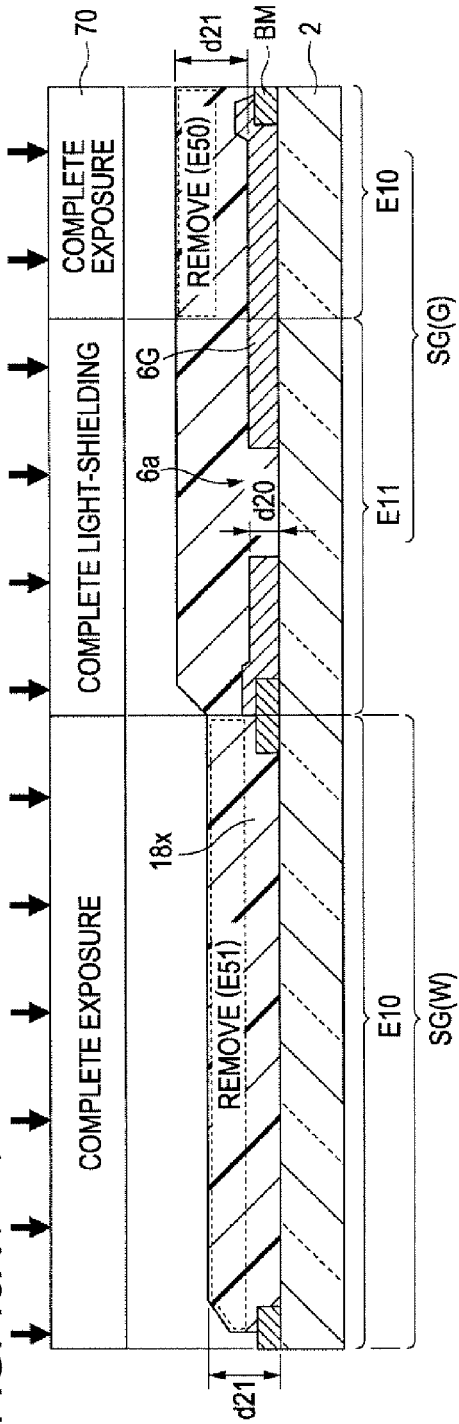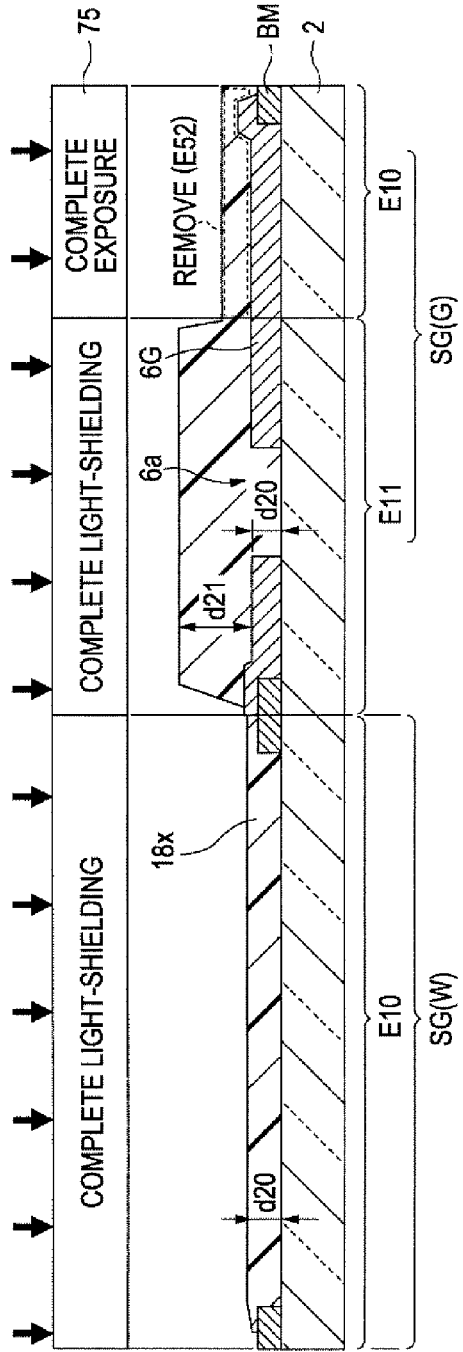

(PROCESS P4 [HALFTONE EXPOSURE METHOD])

(PROCESSES P5 AND P6)

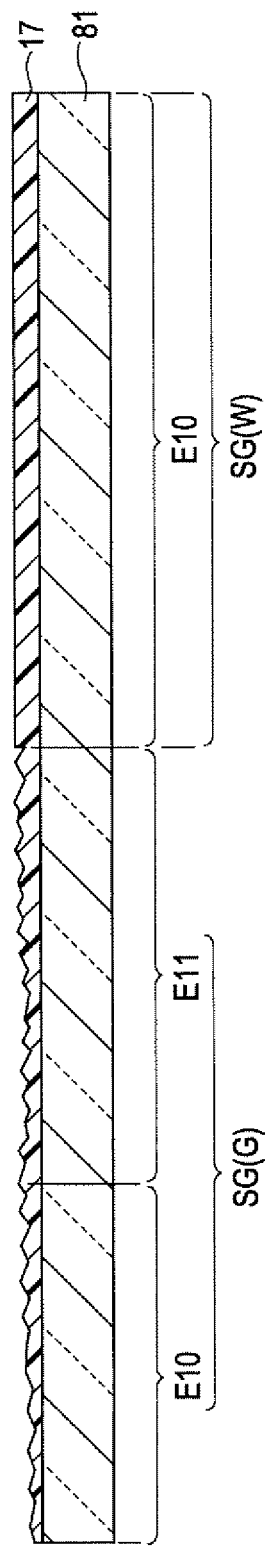
FIG. 23A (PROCESS R1)
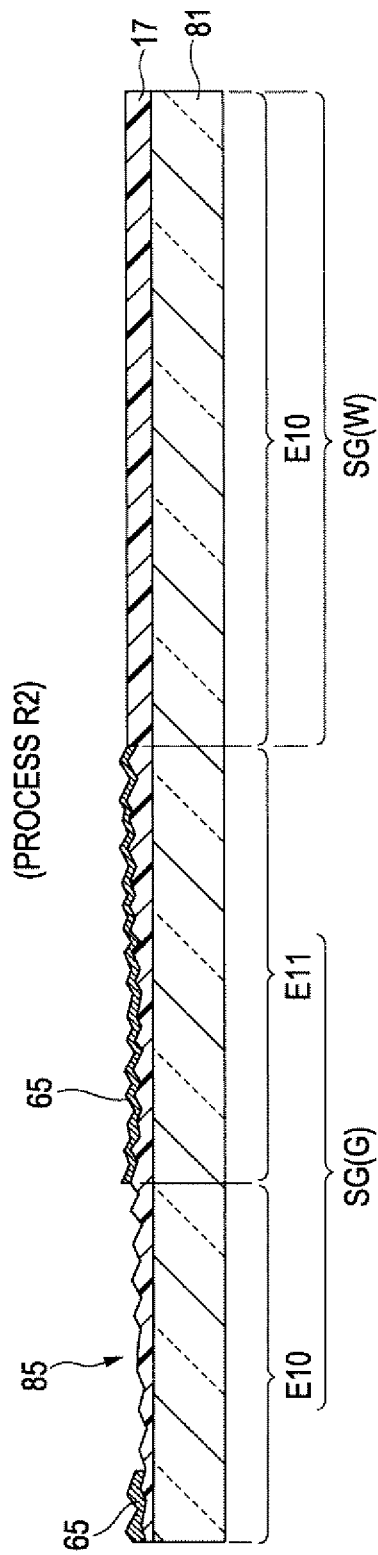
FIG. 23B (PROCESS R2)

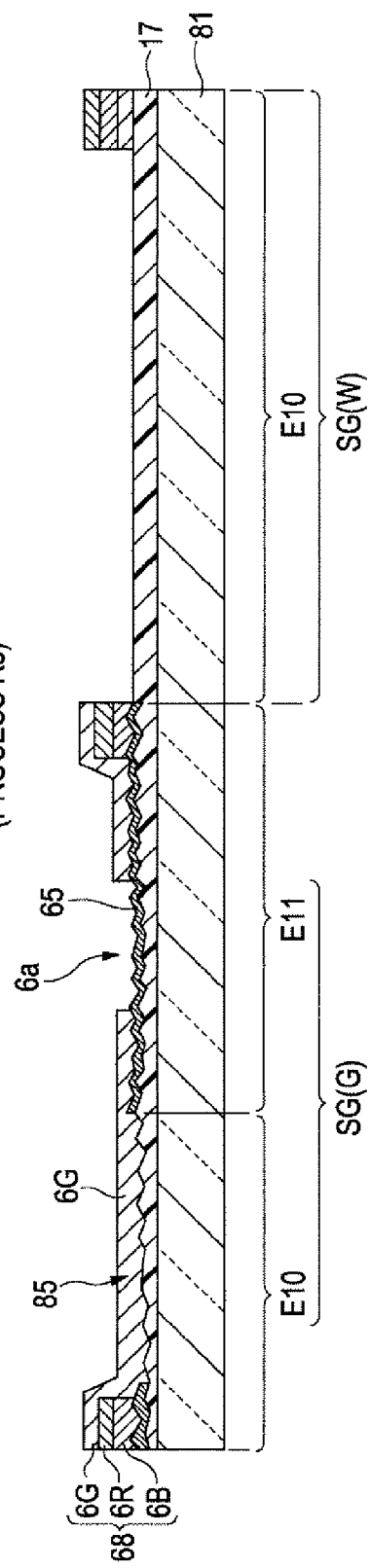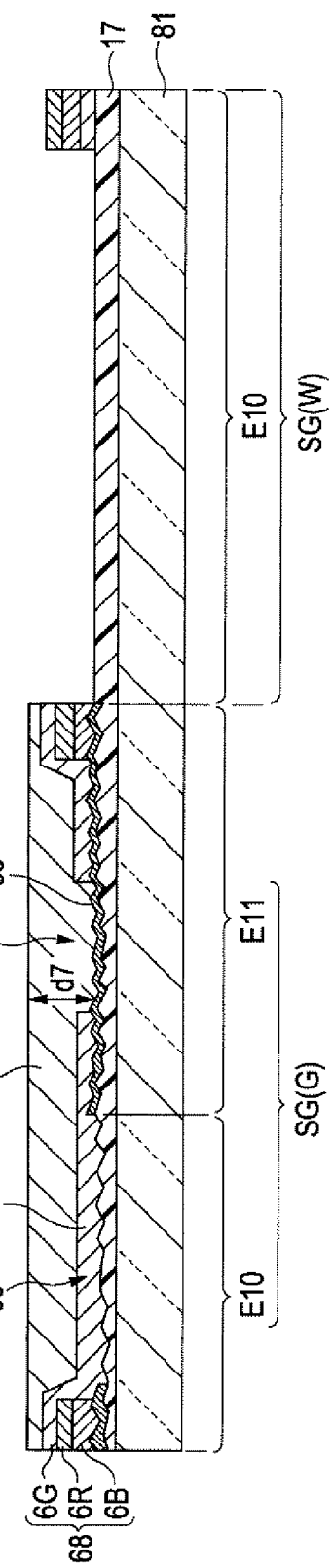

(PROCESSES R5 AND R6)

(PROCESSES R7 AND R8)

(PROCESS T1)

(PROCESS T2)

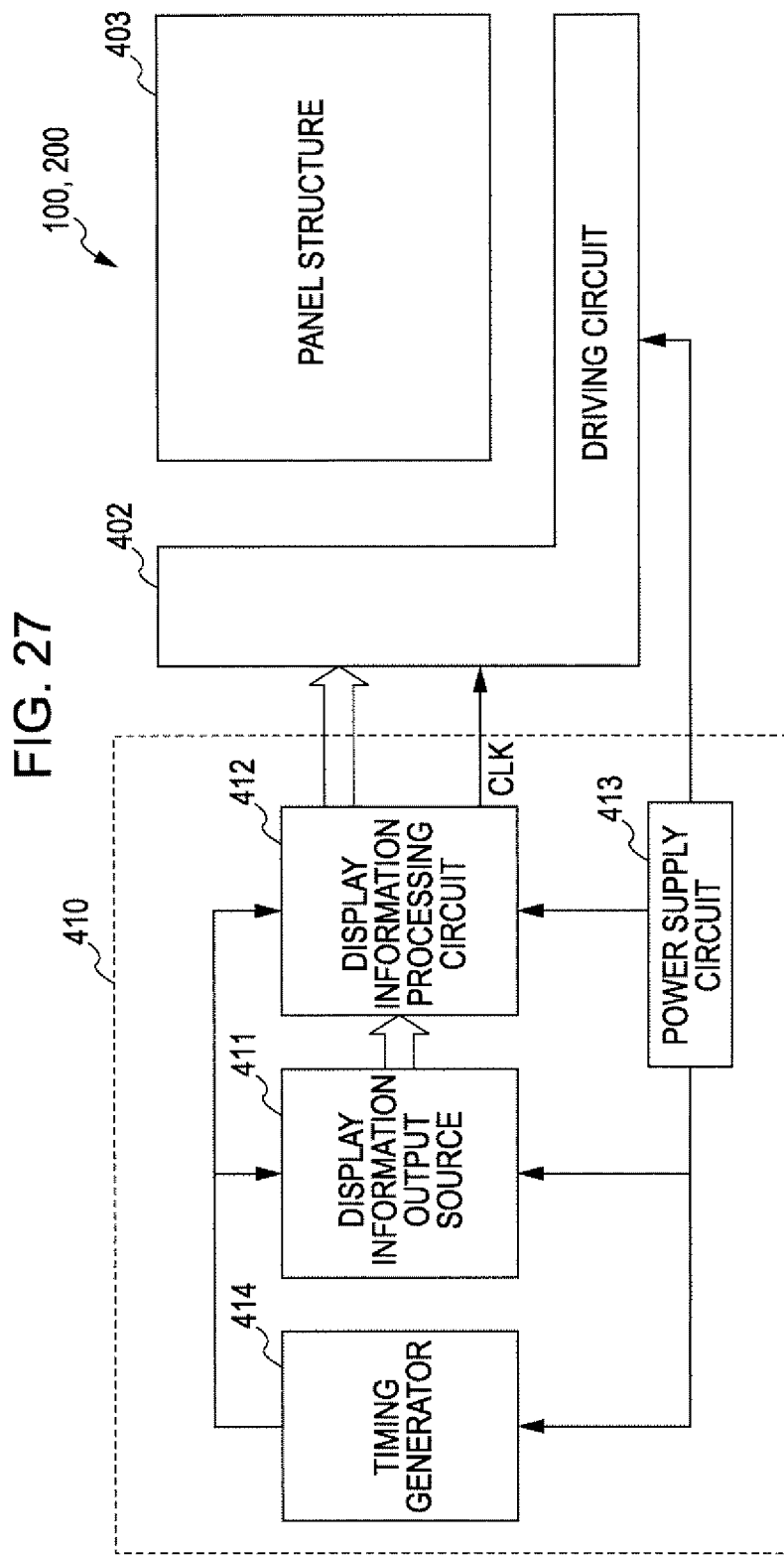

LIQUID CRYSTAL DEVICE, METHOD OF MANUFACTURING LIQUID CRYSTAL DEVICE, AND ELECTRONIC APPARATUS

This application is a continuation of U.S. patent application Ser. No. 11/426,130 filed on Jun. 23, 2006. This application claims the benefit of Japanese Patent Application No. 2006-90365 filed Mar. 29, 2006 and Japanese Patent Application No. 2005-197074 filed Jul. 6, 2005. The disclosures of the above applications are incorporated herein by reference.

BACKGROUND

1. Technical Field

The present invention relates to a liquid crystal device that is suitable for various information display, and to an electronic apparatus.

2. Related Art

In general, various electro-optical devices, such as liquid crystal devices, organic electroluminescent display devices, plasma display devices, and field emission display devices, are known.

As an example of these electro-optical devices, an active-matrix-type liquid crystal device, which uses a switching element, such as a thin film transistor (TFT), has advantages like high definition, high responsibility, or the like, and thus it is widely used for televisions or portable information terminals.

Such a liquid crystal device includes an element substrate in which pixel electrodes, TFT elements, a plurality of scanning lines (gate lines), a plurality of signal lines (source lines), a driver IC, or the like are formed or mounted, and a counter substrate in which color filters of three colors including R (red), G (green), and B (blue) or a count electrode is formed. The element substrate and the counter substrate are bonded to each other through a sealant having a frame shape, and liquid crystal is interposed therebetween.

In recent years, as this kind of liquid crystal device, a liquid crystal device has been known in which in addition to three primary colors including R, G, and B, a color of W (white) is additionally used, and images are displayed while using pixels for four colors as one dot (for example, see JP-A-2004-102292). By using this liquid crystal device, light efficiency is increased, and luminance and power efficiency are improved while maintaining color reproducibility. In addition, according to a structure disclosed in JP-A-2004-102292, a separated color filter is not provided in a white pixel.

SUMMARY

An advantage of some aspects of the invention is that it provides a transflective liquid crystal device having a multi-gap structure which can reduce the manufacturing cost and use respective colors including R, G, B, and W (white or transparent), a method of manufacturing the same, and an electronic apparatus.

According to a first aspect of the invention, a liquid crystal device includes: display pixels which correspond to at least a color of white or non-coloring and one color different from the color of white or non-coloring, each of the display pixels corresponding to one color having a transmissive region and a reflective region, and each of the display pixels corresponding to the color of white or non-coloring having only a transmissive region; a substrate; a counter substrate which is disposed so as to be opposite to the substrate; colored layers which are provided in the display pixels of the substrate or the counter substrate corresponding to one color; cell-thickness-adjusting layers which are provided in the substrate or the counter substrate and included in the reflective region of each of the display pixels corresponding to one color and the transmissive region of each of the display pixels corresponding to the color of white or non-coloring; and a liquid crystal layer which is interposed between the substrate and the counter substrate, the thickness of the layer crystal layer corresponding to the transmissive region of each of the display pixels corresponding to one color being larger than the thickness of the liquid crystal layer corresponding to the reflective region of each of the display pixels corresponding to one color according to the thickness of the cell-thickness-adjusting layer.

According to a second aspect of the invention, a liquid crystal device includes: display pixels which correspond to at least a color of white or non-coloring and one color different from the color of white or non-coloring, each of the display pixels corresponding to one color and each of the display pixels corresponding to the color of white or non-coloring having a transmissive region and a reflective region; a substrate; a counter substrate which is disposed so as to be opposite to the substrate; colored layers which are provided in the display pixels of the substrate or the counter substrate corresponding to one color; cell-thickness-adjusting layers which are provided in the substrate or the counter substrate, and included in at least the reflective region of each of the display pixels corresponding to one color and the transmissive region and the reflective region of each of the display pixels corresponding to the color of white or non-coloring, the thickness of the cell-thickness-adjusting layer in the reflective region of each of the display pixels corresponding to the color of white or non-coloring being larger than the thickness of the cell-thickness-adjusting layer in the transmissive region of each of the display pixels corresponding to the color of white or non-coloring; and a liquid crystal layer which is interposed between the substrate and the counter substrate, the thickness of the liquid crystal layer corresponding to the transmissive region of each of the display pixels corresponding to one color and the display pixels corresponding to the color of white or non-coloring being larger than the thickness of the liquid crystal layer corresponding to the reflective region of each of the display pixels corresponding to one color and the display pixels corresponding to the color of white or non-coloring according to the thickness of the cell-thickness-adjusting layer.

Preferably, in the display pixels corresponding to one color and the display pixels corresponding to the color of white or non-coloring, the cell-thickness-adjusting layers, each of which is made of the same material, are provided.

Preferably, the thickness of the cell-thickness-adjusting layer that is provided in the reflective region of each of the display pixels corresponding to one color is equal to the thickness of the cell-thickness-adjusting layer that is provided in the transmissive region of each of the display pixels corresponding to the color of white or non-coloring.

Preferably, the thickness of the liquid crystal layer corresponding to the transmissive region of each of the display pixels corresponding to one color is equal to the thickness of the liquid crystal layer corresponding to the transmissive region of each of the display pixels corresponding to the color of white or non-coloring.

The thickness of the colored layer corresponding to the transmissive region is larger than the thickness of the colored layer corresponding to the reflective region.

Preferably, at a location corresponding to the reflective region of any one of the substrate and the counter substrate, a reflecting layer that has a function of reflecting light is provided.

According to a third aspect of the invention, a liquid crystal device includes: a plurality of display pixels which correspond to respective colors of R (Red), G (Green), B (Blue), and W (white or non-coloring); a substrate; and a counter substrate which is disposed to be opposite to the substrate with a liquid crystal layer interposed therebetween. Each of the display pixels of R, G, and B has a transmissive region and a reflective region, and each of the display pixels of white or non-coloring has only a transmissive region. The thickness of the liquid crystal layer corresponding to the transmissive region of each of the display pixels of R, G, and B is larger than the thickness of the liquid crystal layer corresponding to the reflective region of each of the display pixels of R, G, and B, and cell-thickness-adjusting layers are provided in the reflective region of each of the display pixels of R, G, and B and the transmissive region of each of the display pixels corresponding to the color of white or non-coloring.

The liquid crystal device according to this aspect includes the plurality of display pixels which correspond to the respective colors of R (Red), G (Green), B (Blue), and W (White or non-coloring), the substrate, and the counter substrate which is disposed to be opposite to the substrate with a liquid crystal layer interposed therebetween.

In addition, each of the display pixels of R, G, and B has a transmissive region that performs transmissive display and a reflective region that performs reflective display, while each of the display pixels of white has only a transmissive region that performs transmissive display. Therefore, it is possible to construct a transflective liquid crystal device which has display pixels corresponding to the respective colors of R, G, B, and W.

In addition, in the liquid crystal device according to this aspect, the thickness of the liquid crystal layer corresponding to each of the transmissive regions of R, G, and B is larger than the thickness of the liquid crystal layer corresponding to each of the reflective regions of R, G, and B. This liquid crystal device has a structure in which optimum optical characteristics are set in the transmissive region and the reflective region, that is, a so-called multigap structure.

In this case, generally, in the liquid crystal device that has display pixels corresponding to the respective colors of R, G, B, and W, the display pixels of W are additionally provided, in addition to the respective display pixels of R, G, and B, so that it is possible to achieve high luminance and high contrast. Meanwhile, the coloring material does not exist in the display pixels of W. Therefore, in order that the thickness of the liquid crystal layer corresponding to the transmissive region of each of the display pixels of R, G, and B (cell thickness) and the thickness of the liquid crystal layer corresponding to the transmissive region of each of the display pixels of W (cell thickness) are set to have the same thickness, a transparent resin layer for cell thickness adjustment needs to be provided at a location that corresponds to the display pixel of W. In addition, in a transflective electro-optical device that has a multigap structure, in order to allow the optical characteristic to be uniform in the transmissive region and the reflective region, generally, a resin layer for a multigap is formed in the reflective region, and the thickness of the liquid crystal layer corresponding to the transmissive region is larger than the thickness of the liquid crystal layer corresponding to the reflective region.

In a transflective liquid crystal device that has a multigap structure, when the transflective liquid crystal device is constructed so as to have the display pixels that correspond to the respective colors of R, G, B, and W (hereinafter, referred to as comparative example), it is required that a transparent resin layer for cell thickness adjustment be provided at a location that corresponds to the display pixel of W, and a resin layer for a multigap, which is made of a material different from that of the transparent resin layer, be separately provided in a reflective region of each of the display pixels of R, G, and B. Due to this, the number of processes is increased, and thus the manufacturing cost of the liquid crystal device is increased.

In the liquid crystal device according to this aspect, cell-thickness-adjusting layers, each of which is made of a transparent resin material, are provided in a reflective region of each of the display pixels corresponding to R, G, and B and a transmissive region of each of the display pixels corresponding to the color of W. In this case, the display pixel corresponding to the color of W may be reddish, bluish, and yellowish. In addition, the display pixel corresponding to the color of W is preferably within a range of $(x, y)=(0.3$ to $0.4, 0.3$ to $0.4)$ in a CIE chromaticity diagram.

Preferably, in the reflective region of each of the display pixels corresponding to R, G, and B and the transmissive region of each of the display pixels corresponding to the color of W, the cell-thickness-adjusting layers, each of which is made of the same material, are preferably provided. That is, in the process of manufacturing the liquid crystal device, the cell-thickness-adjusting layer that is provided in the reflective region of each of the display pixels corresponding to R, G, and B and the cell-thickness-adjusting layer that is provided in a transmissive region of each of the display pixels corresponding to the color of W are simultaneously formed of the same material by the same process. Thereby, at the same time, the multigap structure can be formed at the location corresponding to the respective display pixels of R, G, and B and a cell thickness adjusting layer for cell thickness adjustment can be formed in the display pixels corresponding to the color of W. As a result, the number of processes can be reduced, as compared with a comparative example, which results in reducing the manufacturing cost of the liquid crystal device.

According to a fourth aspect of the invention, a liquid crystal device includes: a plurality of display pixels which correspond to respective colors of R, G, B, and W; a substrate; and a counter substrate which is disposed to be opposite to the substrate with a liquid crystal layer interposed therebetween. Each of the display pixels of R, G, B, and W has a transmissive region and a reflective region. In at least a reflective region of each of the display pixels corresponding to R, G, and B, and the transmissive region and the reflective region of each of the display pixels corresponding to the color of W, cell-thickness-adjusting layers are provided. The thickness of the cell-thickness-adjusting layer in the reflective region of each of the display pixels corresponding to W is larger than the thickness of the cell-thickness-adjusting layer in the transmissive region of each of the display pixels corresponding to the color of W, and the thickness of the liquid crystal layer corresponding to the transmissive region of each of the display pixels corresponding to R, G, B, and W is larger than the thickness of the liquid crystal layer corresponding to the reflective regions of each of the display pixels corresponding to R, G, and B according to the thickness of the cell-thickness-adjusting layer.

The liquid crystal device according to this aspect includes the plurality of display pixels that correspond to the respective colors of R, G, B, and W, the substrate, and the counter substrate that is disposed to be opposite to the substrate with the liquid crystal layer interposed therebetween. In addition, each of the display pixels that correspond to the respective colors of R, G, B, and W has a transmissive region and a reflective region. Therefore, it is possible to construct a transflective electro-optical device which has display pixels corresponding to the respective colors of R, G, B, and W.

In addition, in the liquid crystal device according to this aspect, in at least the reflective regions of the display pixels corresponding to R, G, and B, the transmissive region of W and the reflective regions of the display pixels corresponding to the color of W, the cell-thickness-adjusting layers are provided. Further, the thickness of the cell-thickness-adjusting layer in the reflective region of each of the display pixels corresponding to the color of W is larger than the thickness of the cell-thickness-adjusting layer in the transmissive region of each of the display pixels corresponding to the color of W, and the thickness of the liquid crystal layer corresponding to the transmissive regions of each of the display pixels corresponding to the colors of R, G, B, and W is larger than the thickness of the liquid crystal layer corresponding to the reflective regions of each of the display pixels corresponding to the colors of R, G, and B according to the cell-thickness-adjusting layer. In this case, the display pixel corresponding to the color of W may be reddish, bluish, and yellowish. In addition, the display pixel corresponding to W is preferably within a range of (x, y)=(0.3 to 0.4, 0.3 to 0.4) in a CIE chromaticity diagram.

Preferably, in the reflective region and transmissive region of each of the display pixels corresponding to the colors of R, G, B, and W, the cell-thickness-adjusting layers, each of which is made of the same material, are provided. That is, in the process of manufacturing the liquid crystal device, the cell-thickness-adjusting layer that is provided in at least the reflective region (or both the reflective region and the transmissive region) of each of the display pixels of R, G, and B and the cell-thickness-adjusting layer that is provided in a transmissive region and a reflective region of each of the display pixels corresponding to the color of W are simultaneously formed of the same material by the same process. Thereby, in the process of manufacturing the liquid crystal device, at the same time, the multigap structure can be simultaneously formed at the location corresponding to the respective display pixels of R, G, B, and W. As a result, the number of processes can be reduced, as compared with the comparative example, and thus the manufacturing cost of the liquid crystal device can be reduced.

Preferably, the thickness of the cell-thickness-adjusting layer that is provided in the reflective region of each of the display pixels of R, G, and B is set to have the same as the thickness of the cell-thickness-adjusting layer that is provided in the transmissive region corresponding to each of the display pixels corresponding to the transparent color.

Preferably, the thickness of the liquid crystal layer corresponding to the transmissive region of each of the display pixels of R, G, and B is the same as the thickness of the liquid crystal layer corresponding to the transmissive region of each of the display pixels corresponding to the color of W. Thereby, the predetermined optical characteristic can be set to the respective transmissive regions of R, G, and B and the transmissive region of W.

Preferably, at locations that correspond to the display pixels of R, G, and B, the colored layers corresponding to the respective colors of R, G, and B are respectively provided, and the thickness of the colored layers of the respective colors of R, G, and B that correspond to the transmissive regions is larger than the thickness of each of the colored layers that are provided in the reflective regions of R, G, and B.

In this case, at a location that corresponds to each of the display pixels of R, G, and B, each of the colored layers corresponding to the R, G, and B is provided. In addition, the thickness of each of the colored layers that correspond to the transmissive regions is larger than the thickness of each of the colored layers that are provided in the reflective regions of R, G, and B. Thereby, the predetermined optical characteristic can be set to the respective reflective regions of R, G, and B and the respective transmissive regions of R, G, and B. Preferably, the thickness of the respective colored layers of R, G, and B that correspond to the transmissive regions is about twice as large as the thickness of the colored layers that are provided in the respective reflective regions of R, G, and B.

Preferably, at a location that corresponds to the reflective region of any one of the substrate and the counter substrate, a reflecting layer that has a function of reflecting light is provided. Thereby, the reflective display can be performed in a reflective region.

According to a fifth aspect of the invention, a liquid crystal device includes: display pixels which correspond to one color or a plurality of display pixels corresponding to a plurality of colors and display pixels which correspond to a color of W; a substrate; and a counter substrate which is disposed to be opposite to the substrate with a liquid crystal layer interposed therebetween. Each of the display pixels that correspond to one color or the plurality of display pixels that correspond to the plurality of colors has a transmissive region and a reflective region. Each of the display pixels that correspond to the color of W has only a transmissive region. The thickness of the liquid crystal layer that corresponds to each of the transmissive region of the display pixels corresponding to one color or the plurality of display pixels that correspond to the plurality of colors is larger than the thickness of the liquid crystal layer that corresponds to each of the reflective regions of the display pixels corresponding to one color or the plurality of display pixels corresponding to the plurality of colors, and the cell-thickness-adjusting layers are formed in the reflective region of each of the display pixels that correspond to one color or the plurality of display pixels that correspond to the plurality of colors and the transmissive region of each of the display pixels that correspond to the color of W.

The liquid crystal device according to this aspect includes the display pixels that correspond to one color or the plurality of display pixels that correspond to the plurality of colors, and the plurality of display pixels that correspond to the color of W, the substrate, and the counter substrate that is disposed so as to be opposite to the substrate with the liquid crystal layer interposed therebetween.

In addition, each of the display pixels that correspond to one color and the plurality of display pixels that correspond to the plurality of colors has a transmissive region that performs transmissive display and a reflective region that performs reflective display, while each of the display pixels that correspond to the color of W has only a transmissive region that performs transmissive display. Therefore, it is possible to construct a transflective liquid crystal device which includes display pixels corresponding to one color or a plurality of display pixels corresponding to a plurality of colors, and display pixels corresponding to a color of W.

In this case, the thickness of the liquid crystal layer that corresponds to the transmissive region of each of the display pixels corresponding to one color or the plurality of display pixels corresponding to the plurality of colors is larger than the thickness of the liquid crystal layer that corresponds to the reflective region of each of the display pixels corresponding to one color or the plurality of display pixels corresponding to the plurality of colors, and optimum optical characteristics are set in the transmissive region and the reflective region. As a result, the liquid crystal device has a multigap structure.

In particular, in this case, in the reflective region of each of the display pixels that correspond to one color or the plurality of display pixels that correspond to the plurality of colors, and the transmissive region of each of the display pixels corresponding to the color of W, the cell-thickness-adjusting layers, each of which is made of a transparent resin material, are provided. In this case, the display pixel corresponding to W may be reddish, bluish, and yellowish. In addition, the display pixel corresponding to W is preferably within a range of (x, y)=(0.3 to 0.4, 0.3 to 0.4) in a CIE chromaticity diagram.

That is, in the process of manufacturing the liquid crystal device, the cell-thickness-adjusting layer that is provided in the reflective region of each of the display pixels corresponding to one color or the plurality of display pixels corresponding to the plurality of colors and the cell-thickness-adjusting layer that is provided in a transmissive region of each of the display pixels corresponding to the color of W are simultaneously formed of the same material by the same process. Thereby, at the same time, the multigap structure can be formed at the location corresponding to the display pixels that correspond to one color or the plurality of display pixels that correspond to the plurality of colors, and a cell thickness adjusting layer for cell thickness adjustment can be formed in the display pixels corresponding to the color of W. As a result, the number of processes can be reduced, as compared with a comparative example, which results in reducing the manufacturing cost of the liquid crystal device.

According to a sixth aspect of the invention, a liquid crystal device includes: display pixels which correspond to one color or a plurality of display pixels which correspond to a plurality of colors, and display pixels which corresponds to a color of W; a substrate; and a counter substrate which is disposed to be opposite to the substrate with a liquid crystal layer interposed therebetween. Each of the display pixels that correspond to one color or the plurality of display pixels corresponding to the plurality of colors and the display pixels corresponding to the color of W has a transmissive region and a reflective region. In at least a reflective region of each of the display pixels that correspond to one color or the plurality of display pixels that correspond to the plurality of colors, the cell-thickness-adjusting layer is provided, and the thickness of the cell-thickness-adjusting layer in the reflective region of each of the display pixels corresponding to the color of W is larger than the thickness of the cell-thickness-adjusting layer in the transmissive region of each of the display pixels corresponding to the color of W. The thickness of the liquid crystal layer that corresponds to the transmissive region of each of the display pixels corresponding to one color or the plurality of display pixels corresponding to the plurality of colors and the display pixels corresponding to the color of W is larger than the thickness of the liquid crystal layer that corresponds to each of the reflective regions of the display pixels corresponding to one color or the plurality of display pixels corresponding to the plurality of display pixels according to the thickness of the cell-thickness-adjusting layer.

The liquid crystal device according to this aspect includes the display pixels that correspond to one color or the plurality of display pixels that correspond to the plurality of colors, and the plurality of display pixels that correspond to the color of W, the substrate, and the counter substrate that is disposed so as to be opposite to the substrate with the liquid crystal layer interposed therebetween. In addition, each of the display pixels that correspond to one color or the plurality of display pixels that correspond to the plurality of colors and the display pixels that corresponds to the color of W has a transmissive region and a reflective region. Therefore, it is possible to construct a transflective electro-optical device which includes display pixels corresponding to one color or a plurality of display pixels corresponding to a plurality of colors, and display pixels corresponding to a color of W.

In particular, in the liquid crystal device according to this aspect, in at least the reflective region of each of the display pixels that correspond to one color or the plurality of display pixels that correspond to the plurality of colors, and the transmissive region and the reflective region of each of the display pixels corresponding to the color of W, the cell-thickness-adjusting layers are provided. The thickness of the cell-thickness-adjusting layer in the reflective region of each of the display pixels corresponding to the color of W is larger than the thickness of the cell-thickness-adjusting layer in the transmissive region of each of the display pixels corresponding to the color of W, and the thickness of the liquid crystal layer that corresponds to the transmissive region of each of the display pixels corresponding to one color and the plurality of display pixels corresponding to the plurality of colors and the display pixels corresponding to the color of W is set to be larger than the thickness of the liquid crystal layer that corresponds to the reflective region of each of the display pixels corresponding to one color or the plurality of display pixels corresponding to the plurality of colors according to the thickness of the cell-thickness-adjusting layer. In this case, the display pixel corresponding to W may be reddish, bluish, and yellowish. In addition, the display pixel corresponding to W is preferably within a range of (x, y)=(0.3 to 0.4, 0.3 to 0.4) in a CIE chromaticity diagram.

That is, in the process of manufacturing the liquid crystal device, the cell-thickness-adjusting layer that is provided in at least the reflective region (or both the reflective region and the transmissive region) of each of the display pixels corresponding to one color or the plurality of display pixels corresponding to the plurality of colors and the cell-thickness-adjusting layer that is provided in a transmissive region of each of the display pixels corresponding to the color of W are simultaneously formed of the same material by the same process. Thereby, in the process of manufacturing the liquid crystal device, the multigap structure can be simultaneously formed at a location that corresponds to each of the display pixels corresponding to one color or the plurality of display pixels corresponding to the plurality of colors and the display pixels corresponding to the color of W. As a result, the number of processes can be reduced, as compared with a comparative example, which results in reducing the manufacturing cost of the liquid crystal device.

According to a seventh aspect of the invention, an electronic apparatus includes the above-described liquid crystal device as a display unit.

According to an eighth aspect, there is provided a method of manufacturing a liquid crystal device, which has display pixels corresponding to at least a color of W and one color different from the color of W, each of the display pixels corresponding to one color having a transmissive region and a reflective region, each of the display pixels corresponding to the color of W having only a transmissive region, and the thickness of a liquid crystal layer corresponding to the transmissive region of each of the display pixels corresponding to one color being larger than the thickness of the liquid crystal layer corresponding to the reflective region of each of the display pixels corresponding to one color. The method of manufacturing a liquid crystal device includes: forming colored layers in the display pixels corresponding to one color, on a substrate; and forming cell-thickness-adjusting layers in the reflective region of each of the display pixels corresponding to one color and the transmissive region of each of the display pixels corresponding to the color of W, on the substrate, the cell-thickness-adjusting layers made of transparent materials.

Preferably, each of the display pixels corresponding to the color of W does not have the reflective region.

Preferably, each of the display pixels corresponding to the color of W has a reflective region, the thickness of the liquid crystal layer that corresponds to the transmissive region of each of the display pixels corresponding to the color of W is larger than the thickness of the liquid crystal layer that corresponds to the reflective region of each of the display pixels corresponding to the color of W, and during the forming of the cell-thickness-adjusting layers, the cell-thickness-adjusting layers are simultaneously formed in the reflective region of each of the display pixels corresponding to one color and the transmissive region and the reflective region of each of the display pixels corresponding to the color of W, on the substrate.

Preferably, during the forming of the colored layers, an opening is formed in the colored layer that is located in the reflective region.

Preferably, during the forming of the cell-thickness-adjusting layers, the cell-thickness-adjusting layer is formed with the same thickness as the colored layer.

Preferably, the forming of the cell-thickness-adjusting layers includes adjusting the layer thickness. The adjusting of the layer thickness includes: coating a resist on the colored layers of the display pixels corresponding to the color of W and the display pixels of one color, performing an exposure process on the coated resist once by using a first mask and then performing development and etching processes on the coated resist, the first mask having a complete exposure region for completely transmitting light and a complete light shielding region for completely shielding the light, and performing the resist coating again, performing an exposure process on the coated resist once by using a second mask that has a complete exposure region and a complete light shielding region and a structure different from a structure of the first mask layer, and performing development and etching processes on the coated resist. Furthermore, during the adjusting of the layer thickness, the thickness of the cell-thickness-adjusting layer that is provided in the transmissive region of each of the display pixels corresponding to the color of W is equal to the thickness of the colored layer in the transmissive region of each of the display pixels that correspond to one color.

Preferably, the forming of the cell-thickness-adjusting layer includes adjusting the layer thickness. Further, the adjusting of the layer thickness includes: coating a resist on the colored layers of the display pixels corresponding to the color of W and the display pixels of one color, performing an exposure process on the coated resist at least once by using a mask and then performing development and etching processes on the coated resist, the mask having a complete exposure region for completely transmitting light, a complete light shielding region for completely shielding the light, and a halftone exposure region that is made of a semitransparent film, and performing development and etching processes on the coated resist, and during the adjusting of the cell-thickness, the thickness of the cell-thickness-adjusting layer that is provided in the transmissive region of each of the display pixels corresponding to the color of W is equal to the thickness of the colored layer in the transmissive region of each of the display pixels that correspond to one color.

Preferably, the method of manufacturing the liquid crystal device further includes: forming a protective film on the colored layers of the display pixels corresponding to one color between the forming of the colored layers and the forming of the cell-thickness-adjusting layers. During the forming of the cell-thickness-adjusting layer, the cell-thickness-adjusting layer is formed on the protective film in the reflective display region of each of the display pixels corresponding to the color of W and the display pixels corresponding to one color, and during the adjusting of the layer thickness, the thickness of the cell-thickness-adjusting layer that is provided in the transmissive region of each of the display pixels corresponding to the color of W is equal to the thickness of the colored layer in the transmissive region of each of the display pixels that correspond to one color.

Preferably, the method of manufacturing the liquid crystal device further includes: before the forming of the colored layers, forming a reflecting layer in the reflective region, on the substrate.

According to a ninth aspect of the invention, there is provided a method of manufacturing a liquid crystal device, in which each of a plurality of display pixels corresponding to respective colors of R, G, and B has a transmissive region and a reflective region, each of the display pixels corresponding to the color of W has only a transmissive region, and the thickness of a liquid crystal layer corresponding to each of the transmissive regions of R, G, and B is larger than the thickness of the liquid crystal layer corresponding to the respective regions of R, G, and B. The method of manufacturing a liquid crystal device includes: forming colored layers having the respective colors of R, G, and B in regions where the display pixels corresponding to the respective colors of R, G, and B are formed, on the substrate; and forming cell-thickness-adjusting layers made of transparent materials in regions where the respective regions of R, G, and B and the transmissive region of W are formed, on the substrate.

In this case, the method corresponds to a method of manufacturing a liquid crystal device having a multigap structure in which each of the display pixels corresponding to the respective colors of R, G, and B has a transmissive region and a reflective region, each of the display pixels corresponding to the color of W has only a transmissive region, and the thickness of the liquid crystal layer corresponding to the transmissive regions of R, G, and B is set to be larger than the thickness of the liquid crystal layer corresponding to the reflective regions of R, G, and B.

In the method of manufacturing a liquid crystal device according to this aspect, the colored layers having the respective colors of R, G, and B are formed in regions where the plurality of display pixels corresponding to the respective colors of R, G, and B are formed, on the substrate which is made of a material, such as glass or quartz. Then, the cell-thickness-adjusting layer made of a transparent material (for example, a transparent resin material or the like) is formed in a region where the respective regions of R, G, and B and the transmissive region of W are formed, on the substrate.

Thereby, at the same time, the multigap structure can be formed at the location corresponding to the display pixels of R, G, and B, and a cell thickness adjusting layer for cell thickness adjustment can be formed in the display pixels corresponding to the color of W. As a result, the number of processes can be reduced, as compared with a method of manufacturing a liquid crystal device according to a comparative example, which results in reducing the manufacturing cost of the liquid crystal device.

According to a tenth aspect of the invention, there is provided a method of manufacturing a liquid crystal device, in which each of a plurality of display pixels corresponding to respective colors of R, G, B, and W has a transmissive region and a reflective region, and the thickness of a liquid crystal layer corresponding to each of transmissive regions of R, G, B, and W is larger than the thickness of the liquid crystal layer corresponding to respective regions of R, G, B, and W. The method of manufacturing a liquid crystal device includes: forming colored layers having the respective colors of R, G, and B in regions where the display pixels corresponding to the respective colors of R, G, and B are formed, on the substrate; and forming cell-thickness-adjusting layers made of transparent materials in regions where the respective regions of R, G, and B and the transmissive region and the reflective region of W are formed, on the substrate.

In this case, the method corresponds to a method of manufacturing a liquid crystal device having a multigap structure in which each of the display pixels corresponding the respective colors of R, G, B, and W has a transmissive region and a reflective region, and the thickness of the liquid crystal layer corresponding to the transmissive regions of R, G, B, and W is larger than the thickness of the liquid crystal layer corresponding to the reflective regions of R, G, B, and W.

In the method of manufacturing a liquid crystal device according to this aspect, the colored layers having the respective colors of R, G, and B are formed in regions where the display pixels corresponding to the respective colors of R, G, and B are formed, on the substrate which is made of a material, such as glass or quartz. Then, the cell-thickness-adjusting layer made of a transparent material (for example, a transparent resin material or the like) is formed in a region where the respective regions of R, G, and B and the transparent transmissive and reflective regions are formed, on the substrate.

Thereby, at the same time, the multigap structure can be formed at the location corresponding to the display pixels of R, G, B, and W. As a result, the number of processes can be reduced, as compared with a method of manufacturing a liquid crystal device according to a comparative example, which results in reducing the manufacturing cost of the liquid crystal device.

Preferably, during the forming the colored layers, an opening is formed in each of the colored layers of R, G, and B that are located in the reflective regions. Thereby, the predetermined optical characteristic can be set in the respective reflective regions of R, G, and B and the respective transmissive regions of R, G, and B.

Preferably, during the forming of the cell-thickness-adjusting layer, the cell-thickness-adjusting layers and the colored layers of R, G, and B can be formed with the same thickness.

Preferably, the forming of the cell-thickness-adjusting layer includes adjusting the layer thickness. The adjusting of the layer thickness includes: forming, when the thickness of the cell-thickness-adjusting layer is larger than the thickness of each of the colored layers of R, G, and B, coating a resist on at least the reflective regions of R, G, and B, the cell-thickness-adjusting layer that is formed in each of the transmissive region and/or the reflective region of W, and the colored layers of R, G, and B that are formed in the transmissive regions of R, G, and B; performing an exposure process once with respect to the coated resist by using a first mask having a complete exposure region for completely transmitting light and a complete light shielding region for completely shielding light and performing development and etching processes on the coated resist; and coating the resist again, performing an exposure process once with respect to the resist by using a second mask, and performing development and etching processes on the resist, the second mask having the complete exposure region and the complete light shielding region, and the second mask having a different structure from that of the first mask. During the adjusting of the layer thickness, the thickness of the cell-thickness-adjusting layer that is provided in the transmissive region of at least W and the thickness of the colored layers of the transmissive regions of R, G, and B are set to have the same thickness.

In this case, the forming of the cell-thickness-adjusting layer has adjusting layer thickness. In addition, the adjusting of the layer thickness includes a resist coating process, a first exposure process, and a second exposure process. First, during the coating of the resist, when the thickness of the cell-thickness-adjusting layer is larger than the thickness of each of the colored layers of R, G, and B, the resist (photosensitive resin) is coated on at least the respective reflective regions of R, G, and B, the cell-thickness-adjusting layer that is formed in each of the transmissive region and/or the reflective region of W, and the colored layers of R, G, and B that are formed in the respective transmissive regions of R, G, and B.

Next, during the first exposure process, the exposure process is performed on the coated resist once by using the first mask including a complete exposure region for completely transmitting the light (light, such as ultraviolet rays or i rays, and this is the same in the below description) and a complete light shielding region, and the development and etching processes are performed.

Next, during the second exposure process, the resist coating process is performed again, the exposure process is performed once on the coated resist (photosensitive resin) by using a second mask including a complete exposure region and a complete light shielding region and having a different structure from that of the first mask, and the development and etching processes are performed. During the adjusting of the layer thickness, the thickness of the cell-thickness-adjusting layer that is provided in the transmissive region of at least W and the thickness of the colored layers of the respective transmissive regions of R, G, and B are set to have the same thickness by using these series of processes. Thereby, predetermined optical characteristic can be set in the respective transmissive regions of R, G, and B and the transmissive regions of W.

Preferably, the forming of the cell-thickness-adjusting layer includes adjusting the layer thickness. The adjusting of the layer thickness includes: forming, when the thickness of the cell-thickness-adjusting layer is larger than the thickness of each of the colored layers of R, G, and B, coating a resist on at least the reflective regions of R, G, and B, the cell-thickness-adjusting layer that is formed in each of the transmissive region and/or the reflective region of W, and the colored layers of R, G, and B that are formed in the transmissive regions of R, G, and B; and performing an exposure process once on the coated resist by using a mask having a complete exposure region for completely transmitting light, a complete light shielding region for completely shielding light, and a halftone exposure region made of a semitransparent film and performing development and etching processes on the coated resist. During the adjusting of the layer thickness, the thickness of the cell-thickness-adjusting layer that is provided in the transmissive region of at least W and the thickness of the colored layers of the transmissive regions of R, G, and B are set to have the same thickness.

In this case, the forming of the cell-thickness-adjusting layer includes adjusting the layer thickness. The adjusting of the layer thickness includes the resist coating process and a halftone exposure process.

First, during the coating of the resist, when the thickness of the cell-thickness-adjusting layer is larger than the thickness of each of the colored layers of R, G, and B, a resist (photosensitive resin) is coated on at least the reflective regions of R, G, and B, the cell-thickness-adjusting layer that is formed in each of the transmissive region and/or the reflective region of W, and the colored layers of R, G, and B that are formed in the transmissive regions of R, G, and B.

Then, during the halftone exposure, an exposure process is performed at least once on the coated resist by using a mask having a complete exposure region for completely transmitting light, a complete light shielding region for completely shielding light, and a halftone exposure region made of a semitransparent film, and development and etching processes are performed on the coated resist. During the adjusting of the layer thickness, the thickness of the cell-thickness-adjusting layer that is provided in the transmissive region of at least W and the thickness of the colored layers of the respective transmissive regions of R, G, and B are set to have the same thickness by using these series of processes (halftone exposure method). Thereby, predetermined optical characteristic can be set in the respective transmissive regions of R, G, and B and the transmissive regions of W.

Preferably, the method of manufacturing a liquid crystal device further includes: before the forming of the colored layers, forming a reflecting layer on the reflective regions of R, G, and B, on the substrate. Thereby, in the reflective regions of R, G, and B, the reflective display corresponding to the respective colors can be performed.

Preferably, the method of manufacturing a liquid crystal device further includes: before the forming of the colored layers, forming a reflecting layer on the reflective regions of R, G, and B and the reflective region of W, on the substrate. Thereby, in the reflective regions of R, G, B, and W, the reflective display corresponding to the respective colors can be performed.

According to an eleventh aspect of the invention, there is provided a method of manufacturing a liquid crystal device, in which each of display pixels corresponding to one color or each of a plurality of display pixels corresponding to a plurality of colors has a transmissive region and a reflective region, each of display pixels corresponding to W has only a transmissive region, and the thickness of a liquid crystal layer corresponding to each of transmissive regions of the display pixels corresponding to one color or the plurality of display pixels corresponding to the plurality of colors is larger than the thickness of the liquid crystal layer corresponding to each of reflective regions of the display pixels corresponding to one color or the plurality of display pixels corresponding to the plurality of colors. The method of manufacturing a liquid crystal device includes: forming colored layers having one color or the plurality of colors in regions where the display pixels corresponding to one color or the plurality of colors are formed, on the substrate; and forming a cell-thickness-adjusting layer made of a transparent material in a region where the respective reflective regions of the display pixels corresponding to one color or the plurality of display pixels corresponding to the plurality of colors and the transmissive regions of W are formed, on the substrate.

In this case, the method corresponds to a method of manufacturing a liquid crystal device having a multigap structure in which Each of the display pixels corresponding to one color and the plurality of pixels corresponding to the plurality of colors has a transmissive region and a reflective region. Each of the display pixels that correspond to W has only a transmissive region. Further, the thickness of the liquid crystal layer that corresponds to each of the transmissive regions of the display pixels corresponding to one color and the plurality of display pixels corresponding to the plurality of colors is larger than the thickness of the liquid crystal layer that corresponds to each of the reflective regions of the display pixels corresponding to one color and the plurality of display pixels corresponding to the plurality of colors.

In the method of manufacturing a liquid crystal device according to this aspect, during the forming of the colored layer, the colored layers having one color or the plurality of colors are formed in regions where the display pixels corresponding to one color or the plurality of display pixels corresponding to the plurality of colors are formed, on the substrate which is made of a material, such as glass or quartz. Then, during the forming of the cell-thickness-adjusting layer, the cell-thickness-adjusting layer made of a transparent material (for example, a transparent resin material or the like) is formed in a region where the respective regions of the display pixels corresponding to one color or the plurality of display pixels corresponding to the plurality of colors and the transmissive regions of W are formed, on the substrate.

Thereby, at the same time, the multigap structure can be formed at the location corresponding to the display pixels corresponding to one color or the plurality of display pixels corresponding to the plurality of colors, and the cell-thickness-adjusting layer for cell thickness adjustment is formed in the display pixels of W. As a result, the number of processes can be reduced, as compared with a method of manufacturing a liquid crystal device according to a comparative example, which results in reducing the manufacturing cost of the liquid crystal device.

According to a twelfth aspect of the invention, there is provided a method of manufacturing a liquid crystal device, in which each of display pixels corresponding to one color or each of a plurality of pixels corresponding to a plurality of colors, each of display pixels corresponding to W has a transmissive region and a reflective region, and the thickness of a liquid crystal layer corresponding to a transmissive region of each of the display pixels corresponding to one color or the plurality of display pixels corresponding to the plurality of colors and the display pixels of W is larger than the thickness of the liquid crystal layer corresponding to a reflective region of each of the display pixels corresponding to one color or the plurality of display pixels corresponding to the plurality of colors and the display pixels of W. The method of manufacturing a liquid crystal device includes: forming colored layers having one color or the plurality of colors in regions where the display pixels corresponding to one color or the plurality of colors are formed, on the substrate; and forming a cell-thickness-adjusting layer made of a transparent material in a region where the respective reflective regions of the display pixels corresponding to one color or the plurality of display pixels corresponding to the plurality of colors and the transmissive regions and the reflective regions of W are formed, on the substrate.

In this case, the method corresponds to a method of manufacturing a liquid crystal device having a multigap structure in which each of the display pixels corresponding to one color or the plurality of pixels corresponding to the plurality of colors and the display pixels of W has a transmissive region and a reflective region. Each of the display pixels that correspond to W has only a transmissive region. Further, the thickness of the liquid crystal layer that corresponds to each of the transmissive regions of the display pixels corresponding to one color or the plurality of display pixels corresponding to the plurality of colors and the display pixels of W is larger than the thickness of the liquid crystal layer that corresponds to each of the reflective regions of the display pixels corresponding to one color or the plurality of display pixels corresponding to the plurality of colors and the display pixels of W.

In the method of manufacturing a liquid crystal device according to this aspect, during the forming of the colored layer, the colored layers having one color or the plurality of colors are formed in regions where the display pixels corresponding to one color or the plurality of display pixels corresponding to the plurality of colors are formed, on the substrate which is made of a material, such as glass or quartz. Then, during the forming of the cell-thickness-adjusting layer, the cell-thickness-adjusting layer made of a transparent material (for example, a transparent resin material or the like) is formed in a region where the respective regions of the display pixels corresponding to one color or the plurality of display pixels corresponding to the plurality of colors and the transmissive regions and the reflective regions of W are formed, on the substrate.

Thereby, at the same time, the multigap structure can be formed at the location corresponding to the display pixels corresponding to one color or the plurality of display pixels corresponding to the plurality of colors and the display pixels of W, and the cell-thickness-adjusting layer for cell thickness adjustment is formed in the display pixels of W. As a result, the number of processes can be reduced, as compared with a method of manufacturing a liquid crystal device according to a comparative example, which results in reducing the manufacturing cost of the liquid crystal device.

BRIEF DESCRIPTION OF THE DRAWINGS

The invention will be described with reference to the accompanying drawings, wherein like numbers reference like elements.

FIG. 3A is a plan view illustrating a structure of an element substrate corresponding each of sub-pixels of R, G, and B in an electro-optical device according to a first embodiment of the invention.

FIG. 3B is a plan view illustrating a structure of each of sub-pixels of R, G, and B in an electro-optical device according to a first embodiment of the invention.

FIG. 8A is a plan view illustrating a structure of an element substrate corresponding each of sub-pixels of R, G, and B in an electro-optical device according to a second embodiment of the invention.

FIG. 8B is a plan view illustrating a structure of each of sub-pixels of R, G, and B in an electro-optical device according to a second embodiment of the invention.

FIG. 10 is a partial cross-sectional view taken along the cut line X-X in FIG. 7.

FIG. 12 is a partial cross-sectional view illustrating a structure of a modification of a liquid crystal device according to a second embodiment of the invention.

FIG. 19A is a cross-sectional view illustrating a process of a method of manufacturing a color filter substrate according to a first embodiment of the invention.

FIG. 19B is a cross-sectional view illustrating a process of a method of manufacturing a color filter substrate according to a first embodiment of the invention.

FIG. 23A is a cross-sectional view illustrating a process of a method of manufacturing a color filter substrate according to a second embodiment of the invention.

FIG. 23B is a cross-sectional view illustrating a process of a method of manufacturing a color filter substrate according to a second embodiment of the invention.

FIG. 24A is a cross-sectional view illustrating a process of a method of manufacturing a color filter substrate according to a second embodiment of the invention.

FIG. 24B is a cross-sectional view illustrating a process of a method of manufacturing a color filter substrate according to a second embodiment of the invention.

FIG. 27 is a circuit block diagram illustrating an electronic apparatus to which a liquid crystal device according to embodiments of the invention is applied.

DESCRIPTION OF EXEMPLARY EMBODIMENTS

Hereinafter, the preferred embodiments of the invention will be described in detail with reference to the accompanying drawings. In various embodiments described below, the invention is applied to a liquid crystal device which is an example of an electro-optical device.

First Embodiment

According to the first embodiment, the invention is applied to an active-matrix-driven liquid crystal device that uses an a-si type thin film transistor (hereinafter, referred to as TFT) which is an example of a three-terminal element.
Structure of Liquid Crystal Device First, a structure of a liquid crystal device 100 according to the first embodiment of the invention will be described with reference to FIGS. 1 to 5.

Figure 1:
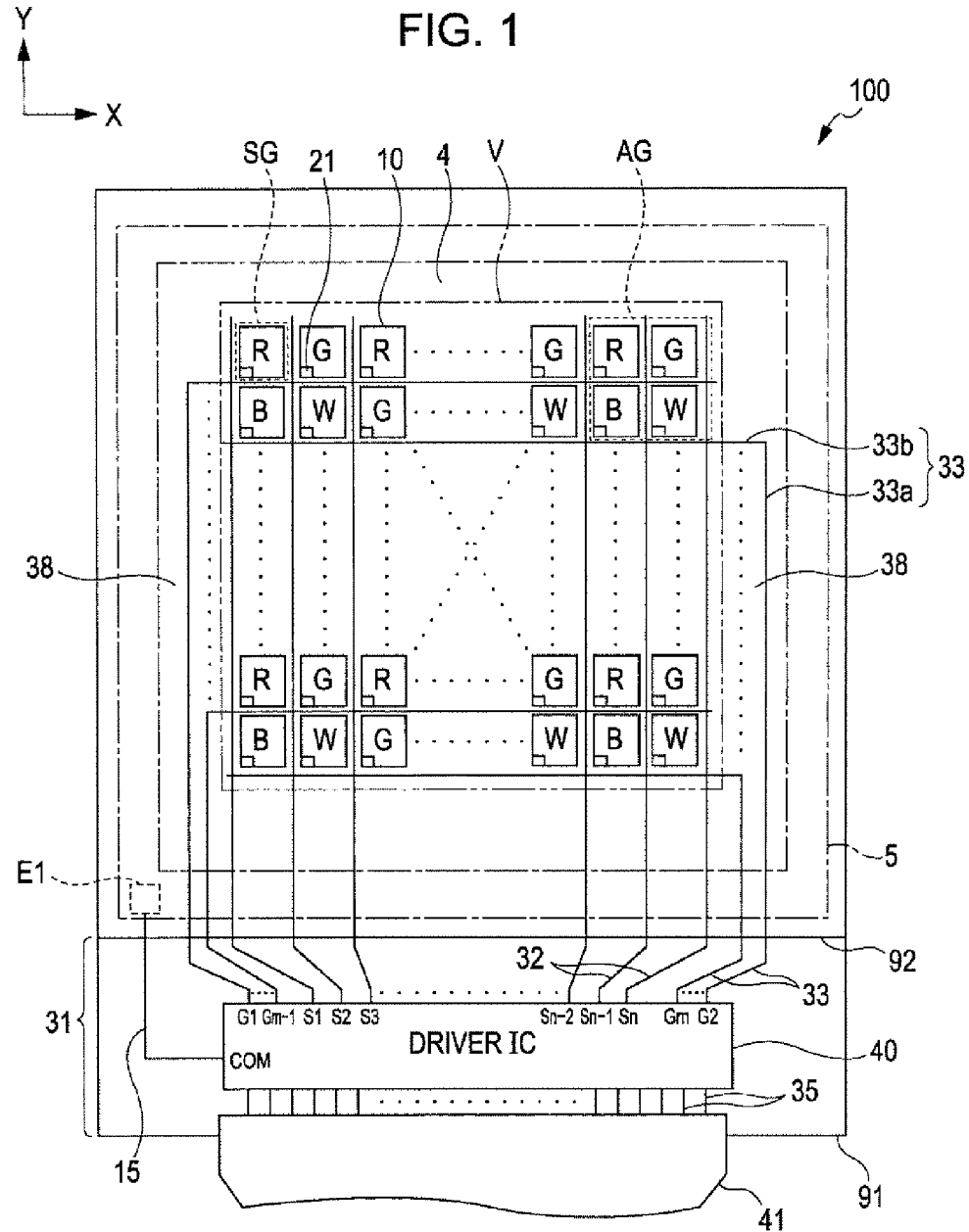
FIG. 1 is a plan view schematically illustrating a structure of a liquid crystal device according to a first embodiment of the invention.

FIG. 1 is a plan view schematically illustrating a structure of a liquid crystal device 100 according to the first embodiment of the invention. In FIG. 1, a color filer substrate 92 is disposed on the front side of the paper (viewing side), and an element substrate 91 is disposed on the interior side of the paper. In FIG. 1, a longitudinal direction of the paper (column direction) is defined as a Y direction, and a horizontal direction of the paper (row direction) is defined as an X direction. In addition, in FIG. 1, each of regions corresponding to R (red), G (green), B (blue), and W (transparent) indicates one sub-pixel region SG, and sub-pixel regions SG of two rows and two columns that correspond to R, G, B, and W indicate one pixel region AG.

In the present embodiment, each of the pixel regions AG has sub-pixels corresponding to R, G, B, and W. Therefore, the invention is different from the related art in that one pixel region is composed of sub-pixels that correspond to R, G, and B. As a result, in the present embodiment, different from the related art, display is performed by using a plotting operation technology (rendering). The rendering uses an image process technology. According to this image process technology, in any pixel region AG, gradation signals, which are applied to sub-pixel regions SG each of which has one colored layer among colored layers corresponding to the respective colors including R, G, and B, are applied to not only the sub-pixel regions SG in the corresponding pixel region AG but also sub-pixel regions in peripheral pixel regions of the corresponding pixel region AG having the same colors so as to overlap each. That is, the sub-pixel regions SG (sub-pixels) of the respective colors including R, G, and B in one pixel region AG (display pixel) are applied with gradation signals contributing to display of the sub-pixels in one display pixel such a manner that the gradation signals are applied to not only the respective sub-pixel regions SG in one pixel region AG but also the sub-pixels in the peripheral display pixels of the one display pixel having the same colors so as to overlap each other, and thus display is performed.

In this way, a viewer can feel a sense of resolution more than a sense of resolution as much as the actual number of pixels. For example, when using a liquid crystal device having screen display resolution corresponding to a QVGA (Quarter Video Graphics Array) standard, it is possible to achieve screen display resolution corresponding to a VGA (Video Graphics Array) standard.

A liquid crystal device 100 includes an element substrate 91 and a color filter substrate 92 that is disposed so as to be opposite to the element substrate 91. The element substrate 91 and the color filter substrate 92 are bonded to each other through a sealant 5. Liquid crystal is injected inside the sealant 5 so as to form a liquid crystal layer 4.

In this case, the liquid crystal device 100 corresponds to a liquid crystal device for color display which is constructed by using four colors including R, G, B, and W and an active-matrix-driven liquid crystal device that uses an a-Si type TFT element serving as a switching element. Further, the liquid crystal device 100 corresponds to a transflective liquid crystal device in which each of the sub-pixel regions SG corresponding to R, G, and B has a transmissive region and a reflective region and a liquid crystal device having a multigap structure in which the thickness of a liquid crystal layer 4 is different in the corresponding transmissive region and the corresponding reflective region.

First, a planar structure of the element substrate 91 will be described. On an inner surface of the element substrate 91, a plurality of source lines 32, a plurality of gate lines 33, a plurality of a-Si type TFT elements 21, a plurality of pixel electrodes 10, a driver IC 40, external connection wiring lines 35, an FPC (Flexible Printed Circuit) 41, or the like are formed or mounted.

As shown in FIG. 1, the element substrate 91 has an extending region 31 that extends from one side of the color filter substrate 92 to the outside, and the driver IC 40 is mounted on the extending region 31. An input-side terminal (not shown) of the driver IC 40 is electrically connected to one end of each of the plurality of external connection wiring lines 35, and the other end of each of the plurality of external connection wiring lines 35 is electrically connected to the FPC. The respective source lines 32 are formed such that they extend in a Y direction at predetermined intervals in an X direction, and one end 32 of each of the source lines 32 is electrically connected to an output-side terminal (not shown) of the driver IC 40.

Each of the gate lines 33 has a first wiring line 33a that is formed so as to extend in a Y direction, and a second wiring line 33b that is formed so as to extend in an X direction from a terminating portion of the first wiring line 33a. The second wiring lines 33b of the respective gate lines 33 are formed such that they extend in a direction crossing the respective source lines 32, that is, an X direction at predetermined intervals in a Y direction. One end of the first wiring line 33a of each of the gate lines 33 is electrically connected to an output-side terminal (not shown) of the driver IC 40. Further, the TFT element 21 is provided at a location corresponding to an intersection between each source line 32 and the second wiring line 33b of each gate line 33, and each TFT element 21 is electrically connected to each source line 32, each gate line 33, and each pixel electrode 10. Each TFT element 21 and each pixel electrode 10 are provided at locations corresponding to each sub-pixel region SG. Each pixel electrode 10 is formed of a transparent conductive material, such as, for example, an ITO (Indium-Tin Oxide) or the like.

An effective display region V (a region surrounded with two-dot chain lines) corresponds to a region where a plurality of pixel regions AG are disposed in a matrix in an X direction and a Y direction. In the effective display region V, images, such as characters, figures, diagrams, or the like, are displayed. Further, a region outside the effective display region V forms a frame region 38 that is not related to display. Furthermore, on inner surfaces of each source line 32, each gate line 33, each TFT element 21, each pixel electrode 10, or the like, an alignment film (not shown) is formed.

Next, a planar structure of the color filter substrate 92 will be described. This color filter substrate 92 has a light shielding layer (it is generally referred to as a 'black matrix', and in the below description, it is simply referred to as 'BM'), colored layers 6R, 6G, and 6B of three colors including R, G, and B, a common electrode 8, or the like. Further, in the below description, when indicating the colored layer regardless of a color thereof, it is simply described as a 'colored layer 6', and when indicating the colored layer depending on a color thereof, it is simply described as a 'colored layer 6R'. The BM is formed at a location that partitions the respective sub-pixel regions SG. In FIG. 1, in the respective sub-pixel region SG that corresponds to W, the colored layers are not provided. Similar to the pixel electrode, the common electrode 8 is formed of a transparent conductive material, such as an ITO or the like, and it is provided over substantially an entire surface of the color filter substrate 92. In a region E1 of a corner of the sealant 5, the common electrode 8 is electrically connected to one end of the wiring line 15, and the other end of the corresponding wiring line 15 is electrically connected to an output terminal that corresponds to COM of the driver IC 40.

In the liquid crystal device 100 having the above-described structure, the gate lines 33 are sequentially and exclusively selected one by one by the driver IC 40 in the order of G1, G2, . . . , Gm−1, and Gm (m is a natural number) on the basis of power and a signal from the FPC 41 side that is connected to the electronic apparatus or the like, and the selected gate lines 33 are provided with a gate signal of selected voltage while the other gate lines 33 that are not selected are supplied with a gate signal of the non-selected voltage. In addition, the driver IC 40 supplies a source signal according to display contents to the pixel electrodes 10 formed at locations corresponding to the selected gate line 33 through the corresponding source lines 32 of S1, S2, . . . , Sn−1, and Sn (n is a natural number) and the TFT elements 21. As a result, a display state of the liquid crystal layer 4 is changed to a non-display state or an intermediate display state, and thus an alignment state of the liquid crystal layer 4 is controlled.

Structure of Pixel

Figure 2:
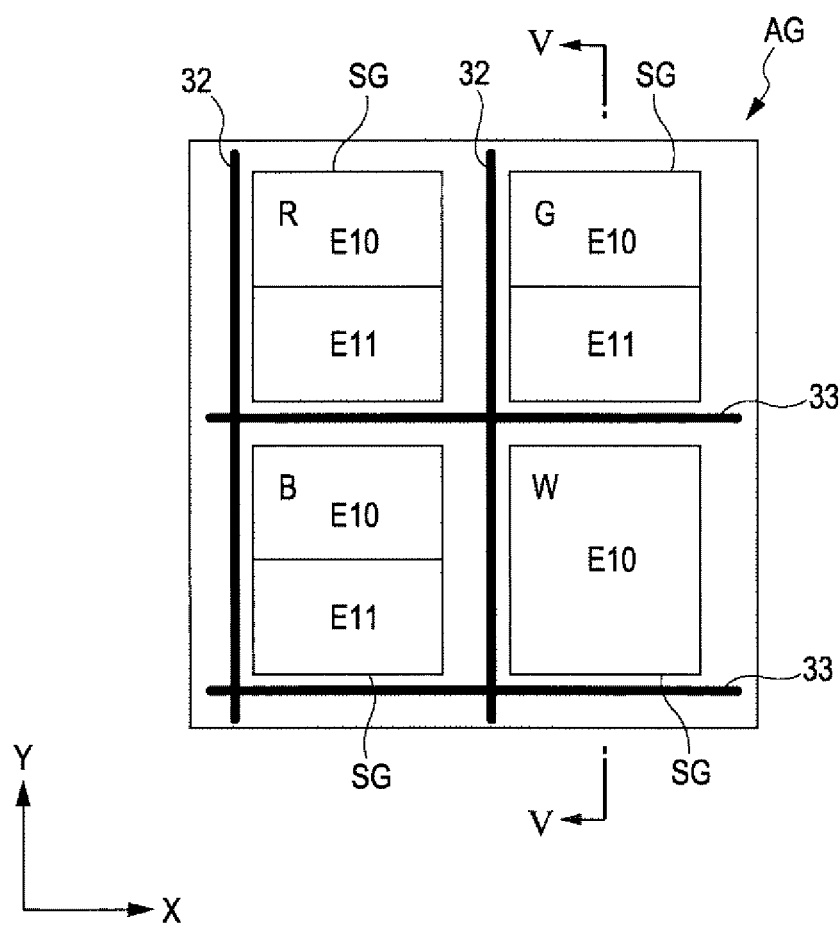
FIG. 2 is a plan view illustrating a structure of one pixel including R, G, B, and W in a liquid crystal device according to a first embodiment of the invention.

Next, a structure of one pixel region AG will be described with reference to FIG. 2. FIG. 2 is an enlarged plan view illustrating a portion corresponding to one pixel region AG (a portion surrounded with broken lines) in FIG. 1.

As shown in FIG. 2, one pixel region AG has a structure in which it has sub-pixel regions SG of two rows and two columns that correspond to R, G, B, and W. Further, each of the sub-pixel regions SG that correspond to R, G, and B has a transmissive region E10 where transmissive display is performed, and a reflective region E11 where reflective display is performed. Meanwhile, the sub-pixel region SG that corresponds to W has only a transmissive region E10, and does not have a reflective region E11.

Next, a structure of each of the sub-pixel regions SG that correspond to R, G, and B in FIG. 2 will be described with reference to FIG. 3 in a state in which it is divided into a structure of the reflective region E11 and a structure of the transmissive region E10.

Figure 4A:
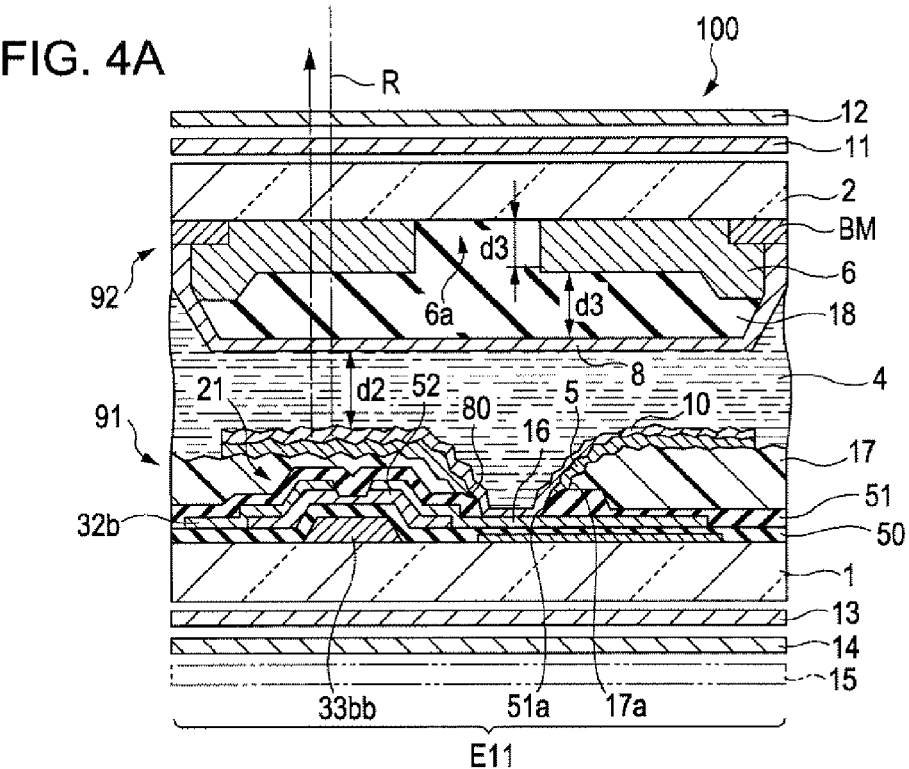
FIG. 4A is a partial cross-sectional view taken along the cut line IVA-IVA in FIGS. 3A and 3B.
Figure 4B:
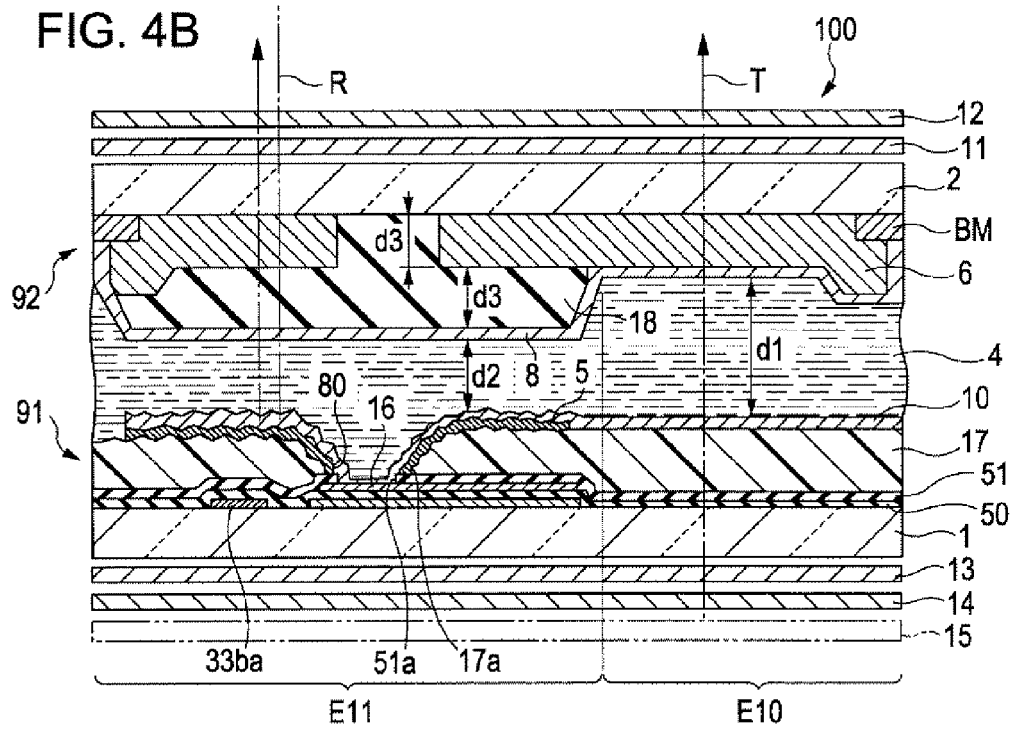
FIG. 4B is a partial cross-sectional view taken along the cut line IVB-IVB in FIGS. 3A and 3B.

FIG. 3A is a partial enlarged plan view illustrating a structure of an element substrate 91 that corresponds to the respective sub-pixel regions SG of R, G, and B. FIG. 3B is a partial enlarged plan view illustrating a structure of a color filter substrate 92 that is disposed to be opposite to the element substrate 91 of FIG. 3A and corresponds to the respective sub-pixel regions SG of R, G, and B. FIG. 4A is a partial cross-sectional view taken along the cutting lines IVA-IVA in FIGS. 3A and 3B, and illustrates a sectional structure of the liquid crystal device 100 that corresponds to the respective reflective regions E11 of R, G, and B. FIG. 4B is a partial cross-sectional view taken along the cutting lines IVB-IVB in FIGS. 3A and 3B, and illustrates a sectional structure of the liquid crystal device 100 that corresponds to the respective sub-pixel regions SG of R, G, and B.

First, a structure of a reflective region E11 in one of the sub-pixel regions SG of R, G, and B will be described.

On a lower substrate 1 that is formed of a material, such as glass or quartz, the gate lines 33 are formed. In FIG. 3A, a second wiring line 33*b* that is an element of the gate line 33 has a main line portion 33*ba* that extends in an X direction, and a branch line portion 33*bb* that is branched from the main line portion 33*ba* so as to be curved in a Y direction. On the lower substrate 1 and the gate line 33, a gate insulating layer 50 having an insulating property is formed. At a location of a top surface of the gate insulating layer 50 which overlaps the branch line portion 33*bb* of the gate line 33 in plan view, an a-Si layer 52 that is an element of the TFT element 21 is provided. The source line 32 is formed such that it extends on the gate insulating layer 50 in a direction crossing the gate line 33.

As shown in FIG. 3A, each of the source lines 32 has a main line portion 32*a* that extends in a Y direction, and a branch line portion 32*b* that is branched from the main line portion 32*a* so as to be curved in an X direction. A portion of the branch line portion 32*b* of the source line 32 is formed on a portion of the a-si layer 52 at one end side. On a portion of the a-si layer 52 at the other end side and the gate insulating layer 50, a storage capacitor electrode 16 is formed which is made of metal. Therefore, the a-si layer 52 is electrically connected to the source line 32 and the storage capacitor electrode 16. In addition, at a location that corresponds to the a-si layer 52, the TFT element 21 that includes the a-si layer 52 as an element is formed.

On the source line 32, the storage capacitor electrode 16, and the gate insulating layer 50, a passivation layer (reaction preventing layer) 51 that has an insulating property is formed. The passivation layer 51 has a contact hole (opening) 51*a* that is formed at a location which overlaps the storage capacitor electrode 16 in plan view. On the passivation layer 51, a resin layer 17 is formed which is made of a resin material. On a surface of the resin layer 17, a plurality of unevenness portions, each of which has a function of scattering light, are formed. The resin layer 17 has a contact hole 17*a* that is formed at a location which corresponds to the contact hole 51*a* of the passivation layer 51. On the resin layer 17, a reflective electrode 5, which is formed of Al (aluminum) or the like and has a reflecting function, is formed. Since the reflective electrode 5 is formed on a resin layer 17 having a plurality of minute unevenness portions, the reflective electrode 5 is formed in a shape that reflects the plurality of minute unevenness portions. At a location of the reflective electrode 5 that corresponds to the contact holes 51*a* and 17*a*, a transmissive opening region 80 is formed for transmitting light. On the reflective electrode 5, the pixel electrode 10 is formed.

In addition, a phase difference plate 13 (¼ wavelength plate) is disposed on an external surface of the lower substrate 1, and a polarizer 14 is disposed on an external surface of the phase difference plate 13. In addition, a backlight 15 that serves as an illumination device is disposed on an external surface of the polarizer 14. Preferably, the backlight 15 may be a combination between a point light source such as an LED (Light Emitting Diode) or a line light source such as a cold cathode fluorescent lamp and a light guiding plate.

Meanwhile, a structure of the color filter substrate 92 that corresponds to the reflective region E11 in one of the sub-pixel regions SG of R, G, and B is as follows.

At locations of a top surface of an upper substrate 2 made of the same material as the lower substrate 1, which correspond to the reflective region E11, colored layers 6 of R, G, and B are formed. The thickness of each of the colored layers 6 is set to d3. Each of the colored layers 6 has an opening 6a that has a function of uniformly displaying a color in a transmissive region E10 and a reflective region E11. At a location which partitions adjacent colored layers 6, the BM is formed. On the colored layer 6, a cell-thickness-adjusting insulating layer 18 is formed which is made of a resin material. As described below, the cell-thickness-adjusting insulating layer 18 has some functions. That is, the cell-thickness-adjusting insulating layer 18 has a function of setting to optimum values the thickness of the liquid crystal layer 4 (thickness of cells) that correspond to the respective transmissive regions E10 of R, G, and B and the thickness of the liquid crystal layer 4 that corresponds to the respective reflective regions E11 of R, G, and B and setting optical characteristic at both regions of the liquid crystal layer to be uniform, that is a function of having a multigap structure; and has a function of setting the thickness of the liquid crystal layer 4 that correspond to the respective transmissive regions E10 of R, G, and B and the thickness of the liquid crystal layer 4 that corresponds to a sub-pixel region SG (transmissive region E10) of W to the same value and setting optical characteristic at both regions of the liquid crystal layer to be uniform. The thickness of the cell-thickness-adjusting insulating layer 18 is set to have the same thickness as the thickness d3 of each colored layer 6. On the cell-thickness-adjusting insulating layer 18, a common electrode 8 is formed.

In addition, a phase difference plate 11 (¼ wavelength plate) is disposed on an external surface of an upper substrate 2, and a polarizer 12 is disposed on an external surface of the phase difference plate 11.

The element substrate 91 that corresponds to the above-described reflective region E11 and the color filter substrate 92 that corresponds to the corresponding reflective region E11 are opposite to each other with the liquid crystal layer 4 interposed therebetween. In addition, the thickness of the liquid crystal layer 4 that corresponds to the reflective region E11 is set to d2.

Further, when reflective display is performed in a reflective region E11 having the above-described structure, external light, which is incident on the liquid crystal device 100, propagates along a path R shown in FIGS. 4A and 4B. That is, the external light having been incident on the liquid crystal device 100 is reflected on the reflective electrode 5 and then propagates to a viewer. In this case, the external light is transmitted through a region where the respective colored layers 6 of R, G, and B, the common electrode 8, and the pixel electrode 10 are formed, then reflected on the reflective electrode 5 located below the pixel electrode 10, and then transmitted through the pixel electrode 10, the common electrode 8, and the colored layer 6 so as to represent predetermined hue and brightness. In this way, a viewer can view a desired color display image.

Next, a structure of the transmissive region E10 in one of the sub-pixel regions SG of R, G, and B will be described.

As shown in FIG. 4B, on the lower substrate 1, a gate insulating layer 50 is formed. On the gate insulating layer 50, the passivation layer 51 is formed. On the passivation layer 51, a resin layer 17 is formed. As described above, the plurality of minute unevenness portions are formed on the surface of the resin layer 17 formed in the reflective region E11 while the minute unevenness portion is not formed on the surface of the resin layer 15 formed in the transmissive region E10. That is, the resin layer 17 that is formed in the transmissive region E10 is formed such that its surface is substantially flat. On the resin layer 17, the pixel electrode 10 is formed. In addition, the phase difference plate 13 is disposed on an external surface of the lower substrate 1, and the polarizer 14 is disposed on an external surface of the phase difference plate 13. Further, a backlight 15 is disposed on an external surface of the polarizer 14.

Meanwhile, a structure of the color filter substrate 92 that corresponds to the transmissive region E10 in one of the sub-pixel regions SG of R, G, and B is as follows. On the upper substrate 2, colored layers 6 of R, G, and B are formed. On the respective colored layers 6, the common electrode 8 is formed. In addition, a phase difference plate 11 is disposed on an external surface of the upper substrate 2, and the polarizer 12 is disposed on an external surface of the phase difference plate 11.

The element substrate 91 that corresponds to the above-described transmissive region E10 and the color filter substrate 92 that corresponds to the transmissive region E10 are opposite to each other with the liquid crystal layer 4 interposed therebetween. In addition, the thickness d1 of the liquid crystal layer 4 that corresponds to the transmissive region E10 is set to be larger than the thickness d2 of the liquid crystal layer 4 that corresponds to the reflective region E11, which results in forming a multigap structure.

Further, when transmissive display is performed in a transmissive region E10 having the above-described structure, illumination light, which is emitted from the backlight 15, propagates along a path T shown in FIG. 4B, and then passes through the gate insulating layer 50, the passivation layer 51, the pixel electrode 10, and the colored layer 6 so as to propagate to a viewer. In this case, the illumination light is transmitted through the respective colored layers of R, G, and B so as to represent predetermined hue and brightness. In this way, a viewer can view a desired color display image.

Next, a structure of a sub-pixel SG corresponding to W will be described with reference to FIG. 5.

Figure 5:
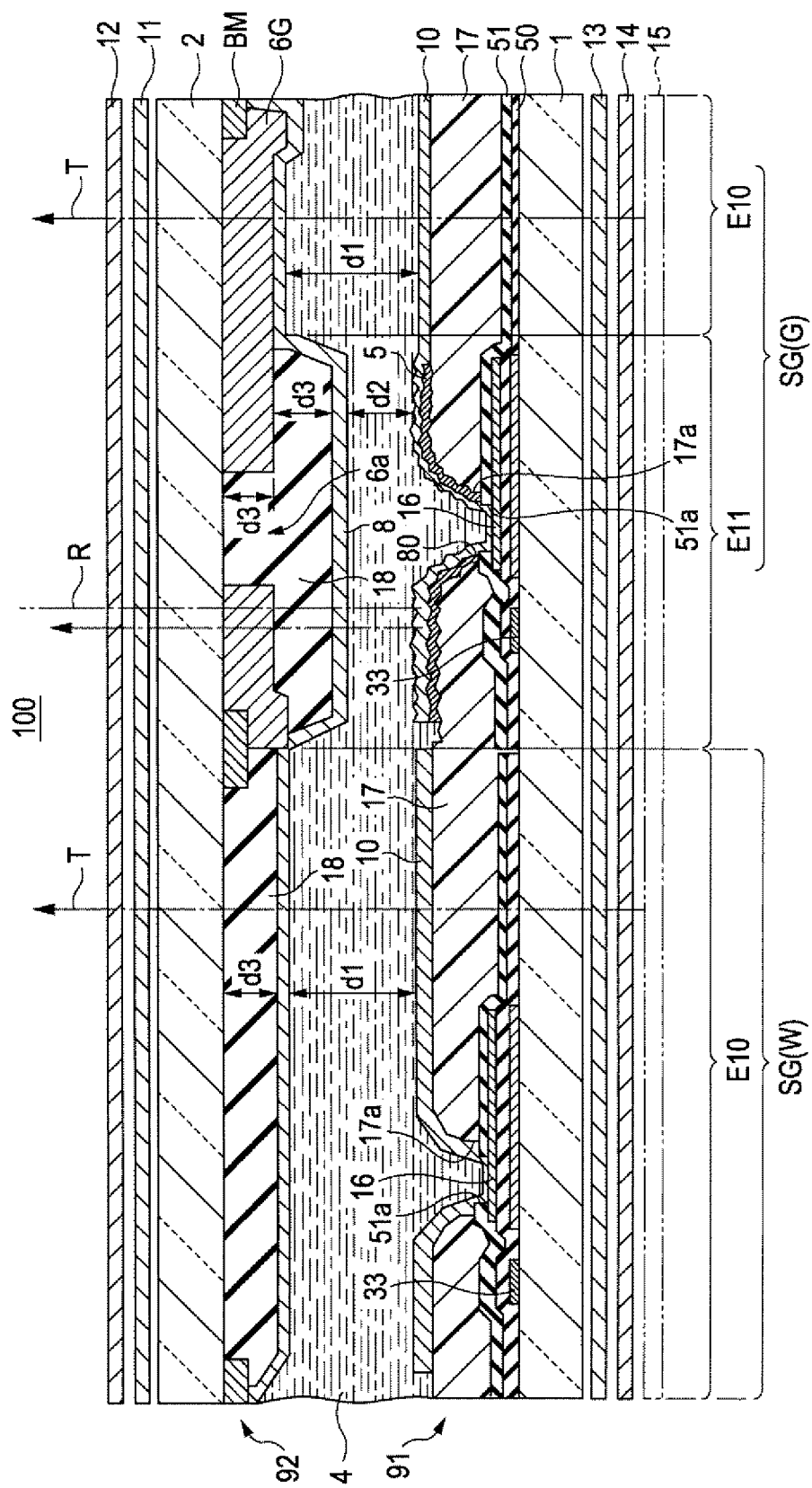
FIG. 5 is a partial cross-sectional view taken along the cut line V-V in FIG. 3.

FIG. 5 is a partial cross-sectional view taken along the line V-V in FIG. 2, which illustrates a sectional structure including a sub-pixel region SG corresponding to W. In addition, in order to easily recognize a different portion between the sectional structure of the sub-pixel region SG corresponding to W and the sectional structure of each of the sub-pixel regions SG corresponding to R, G, and B, FIG. 5 also shows a sectional structure of a sub-pixel region SG that corresponds to G among the three colors including R, G, and B. In addition, in FIG. 5, the sub-pixel region SG corresponding to W is simply denoted by SG (W), and the sub-pixel region SG corresponding to G is simply denoted by SG (G). Further, in the below description, the constituent elements that are the same as the above-described constituent elements are denoted by the same reference numerals, and the description thereof will be simplified or omitted.

First, a structure of the element substrate 91 that corresponds to the sub-pixel region SG of W will be described while comparing it with a structure of the element substrate 91 that corresponds to the sub-pixel region SG of G.

In order that the difference between both structures can be easily recognized by comparing both structures with each other, in the sub-pixel region SG that corresponds to W, a reflective electrode 5 is not provided between the resin layer 17 and the pixel electrode 10. In addition, both structures are substantially equal to each other in the other portions. Therefore, the sub-pixel region SG of W has a structure in which only a transmissive region E10 is provided. Meanwhile, a structure of a color filter substrate 92 that corresponds to the sub-pixel region SG of W is as follows. The cell-thickness-adjusting insulating layer 18 is formed on the upper substrate 2 so as to have predetermined thickness d3, and the common electrode 8 is formed on the cell-thickness-adjusting insulating layer 18. In addition, in the sub-pixel region SG that corresponds to W, the colored layer using a white material is not provided, as described above.

The element substrate 91 that corresponds to the above-described sub-pixel region SG of W and the color filter substrate 92 that corresponds to the corresponding transmissive region E10 are opposite to each other with the liquid crystal layer 4 interposed therebetween. In addition, the thickness of the liquid crystal 4 that corresponds to the sub-pixel region SG of W is set to have the same value as the thickness d1 ($\approx$d2+d3) of the liquid crystal layer 4 that corresponds to the respective transmissive regions E10 of R, G, and B.

In addition, the reason why the transmissive display is performed in the sub-pixel region SG of W is substantially the same as the above. That is, when the transmissive display is performed in the sub-pixel region SG of W, the illumination light, which is emitted from the backlight 15, propagates along a path T shown in FIG. 5, then passes through the gate insulating layer 50, the passivation layer 51, the pixel electrode 10, the common electrode 8, and the cell-thickness-adjusting insulating layer 18, and then propagates to a viewer. In this case, the illumination light is transmitted through the above-described elements so as to represent predetermined brightness. Thereby, the luminance and the contrast can be improved.

Next, advantages and effects of the liquid crystal device 100 according to the first embodiment of the invention will be described.

In general, in the liquid crystal device that has display pixels corresponding to the respective colors of R, G, B, and W (transparent), the display pixel of W is added, in addition to the respective display pixels of R, G, and B, which results in achieving high luminance and high contrast. Meanwhile, a color material does not exist in the display of W. Therefore, in order that the thickness of the liquid crystal layer (cell thickness) that corresponds to the transmissive regions of the display pixels of R, G, and B is set to the same thickness as the liquid crystal layer (cell thickness) that corresponds to the transmissive region of the display pixel of W, a cell-thickness-adjusting transparent resin layer needs to be provided at a location that corresponds to the display pixel of W. In addition, in the transflective liquid crystal device that has a multigap structure, in order that optical characteristic is made to be uniform in the transmissive region and the reflective region, a resin layer for a multigap is generally formed in the reflective region. Further, the thickness of the liquid crystal layer that corresponds to the transmissive region is set to be larger than the thickness of the liquid crystal device that corresponds to the reflective region.

In the transflective liquid crystal device having such a multigap structure, in a case in which the liquid crystal device is constructed such that it has display pixels corresponding to the respective colors of R, G, B, and W (transparent) (hereinafter, referred to as a comparative example), it is necessary that the cell-thickness-adjusting transparent resin layer and a resin layer for a multigap made of a different material from that of the cell-thickness-adjusting transparent resin layer be respectively provided at a location corresponding to the display pixel of W and in the respective reflective regions of the respective display pixels of R, G, and B in a separated manner. Due to this, the number of processes is increased, which results in increasing the manufacturing cost of the liquid crystal device.

In the liquid crystal device 100 according to the first embodiment, in particular, the cell-thickness-adjusting insulating layer 18, which is made of the same transparent material (for example, a transparent resin material), is provided in the reflective regions E11 of R, G, and B and the transmissive region E10 of W (transparent). That is, in the course of manufacturing the liquid crystal device 100, the cell-thickness-adjusting insulating layer 18 that is provided on the respective colored layers 6 in the respective reflective regions E11 of R, G, and B and the cell-thickness-adjusting insulating layer 18 that is provided in the transmissive region E10 of W (transparent) are simultaneously formed of the same transparent material through the same process. Thereby, the multigap structure and the cell-thickness-adjusting insulating layer 18 can be simultaneously respective formed at a location that corresponds each of the sub-pixel regions SG of R, G, and B and the sub-pixel region SG (transmissive region E10) of W. As a result, it is possible to reduce the number of processes as compared with the comparative example, which results in reducing the manufacturing cost of the liquid crystal device 100.

As described above, in the relationship among the thickness d1 of the liquid crystal layer 4 that corresponds to the respective transmissive regions E10 of R, G, B, and W, the thickness d2 of the liquid crystal layer 4 that correspond to the respective reflective regions E11 of R, G, and B, the thickness d3 of the cell-thickness-adjusting insulating layer 18 that corresponds to the respective reflective regions E11 of R, G, and B, the thickness d3 of the cell-thickness-adjusting insulating layer 18 that corresponds to the respective transmissive region E10 of W, and the thickness d3 of the respective colored layers 6, the relationship is preferably set to satisfy the condition d1$\cong$d2+d3. In addition, when the thickness d1 is set to 4 µm and the thickness d2 is set to 2 µm, the thickness d3 is preferably set to about 2 µm.

Second Embodiment

In the second embodiment, the invention is applied to an active-matrix-driven liquid crystal device that uses a TFD (Thin Film Diode) element as an example of a two-terminal element.

Structure of Liquid Crystal Device

Next, a structure of a liquid crystal device 200 according to the second embodiment of the invention will be described. In the below description, the same constituent elements as the first embodiment are denoted by the same reference numerals, and the description thereof is simplified or omitted.

Figure 6:
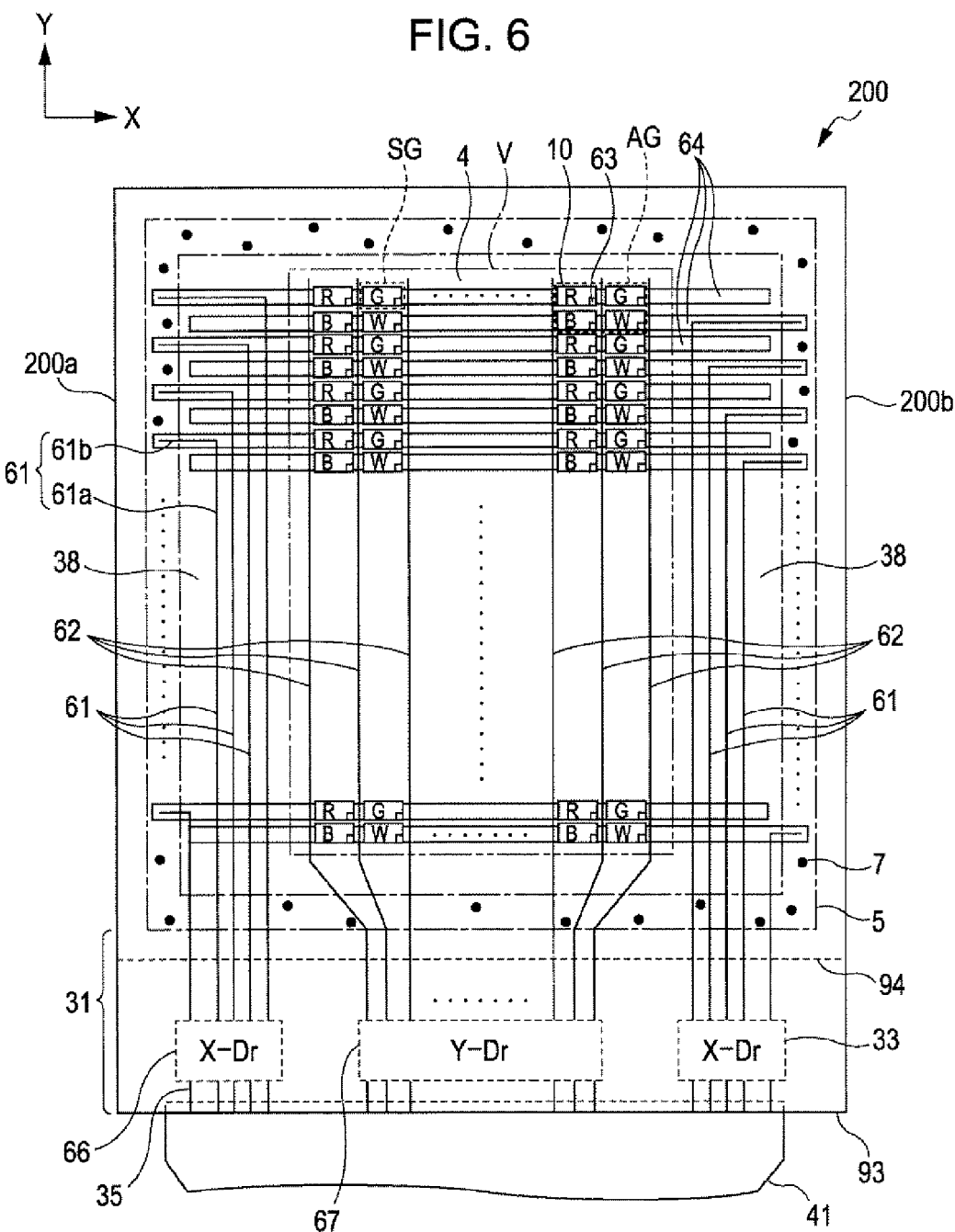
FIG. 6 is a partial cross-sectional view taken along the cut line VI-VI in FIG. 2.

FIG. 6 is a plan view schematically illustrating a structure of a liquid crystal device 200 according to the second embodiment of the invention. As shown in FIG. 6, the liquid crystal device 200 includes an element substrate 93 and a color filter substrate 94 that is disposed so as to be opposite to the element substrate 93. The element substrate 93 and the color filter substrate 94 are bonded to each other through a sealant 5 with a frame shape in which conductive members 7, such as a plurality of metallic particles, are mixed. Liquid crystal is injected inside the sealant 5 so as to form a liquid crystal layer 4. In FIG. 6, the element substrate 93 is disposed on the front side of the paper (viewing side), and the color filter substrate 94 is disposed on the interior side of the paper. That is, the arrangement of both substrates in the second embodiment is opposite to that in the first embodiment.

In this case, the liquid crystal device 200 corresponds to a liquid crystal device for color display which is constructed by using four colors including R, G, B, and W and an active-matrix-driven liquid crystal device that uses a TFD element as a switching element. Further, the liquid crystal device 200 corresponds to a transflective liquid crystal device in which each of the sub-pixel regions SG corresponding to R, G, and B has a transmissive region and a reflective region and a liquid crystal device having a multigap structure in which the thickness of a liquid crystal layer 4 is different in the corresponding transmissive region and the corresponding reflective region.

First, a planar structure of the element substrate 93 will be described. The element substrate 93 mainly includes a plurality of data lines 62, a plurality of TFD elements 63, a plurality of pixel electrodes 10, a plurality of wiring lines 61, a Y driver IC 69, a plurality of X driver ICs 66, a plurality of external connection wiring lines 35, and an FPC 41.

As shown in FIG. 6, the plurality of data lines 62 are linear wiring lines that extend in a Y direction, and they are formed from an extending region 31 to an effective display region V. The respective data lines 62 are formed at predetermined intervals in an X direction. Further, each of the data lines 62 is connected to each of the corresponding TFD elements 63, and each of the TFD elements 63 is connected to each of the corresponding pixel electrodes 10. Therefore, the respective data lines 62 and the respective pixel electrodes 10 are electrically connected to each other through the respective TFD elements 63.

Each of the plurality of wiring lines 61 has a main line portion 61a that extends in a Y direction, and a bent portion 61b that is bent at substantially a right angle with respect to the main line portion 61a in an X direction. Each of the main line portions 61a is formed such that it extends in a frame region 38 from the extending region 31 to a Y direction. In addition, each of the main line portions 61a is formed so as to be substantially parallel to each data line 62 at a predetermined interval. Each of the bent portions 61b extends to the sealant 5 located at the left and right sides in an X direction, in the frame region 38. In addition, a terminating portion of the bent portion 61b is electrically connected to the conductive member 7 in the sealant 5.

On the extending region 31 of the element substrate 93, the Y driver IC 69 and the plurality of X driver ICs 66 are mounted. Further, a plurality of external connection wiring lines 35 are formed on the extending region 31.

An input side of each of the X driver ICs 66 is electrically connected to one end side of each of the external circuit connection wiring lines 35, and an output side of each of the X driver ICs 66 is electrically connected to one end side of each of the wiring lines 61. Thereby, each of the X driver ICs 66 can output a scanning signal to each of the wiring lines 61.

An input side of the Y driver IC 69 is electrically connected to one end side of each of the external circuit connection wiring lines 35, and an output side of the Y driver IC 69 is electrically connected to one end side of each of the data lines 62. Thereby, the Y driver IC 69 can output a data signal to each of the date lines 62.

The FPC 41 is electrically connected to an electronic apparatus to be described below and the other end side of each of the plurality of external circuit connection wiring lines 35.

In the element substrate 93 having the above-described structure, the data signals and the scanning signals are respectively output to the respective data lines 62 and the respective wiring lines 61 through the FPC 41, the Y driver IC 69, and each of the X driver ICs 66 from the electronic apparatus, such as, for example, the cellular phone or the information terminal.

Next, a planar structure of the color filter substrate 94 will be described. As shown in FIG. 6, the color filter substrate 94 mainly has the respective colored layers 6 of R, G, and B, and the scanning electrodes 64 that are formed in a stripe.

The respective colored layers 6 are formed at locations that correspond to the pixel electrodes 10. A light shielding layer 67 (see FIG. 9A), which is formed by overlapping the colored layers of any two colors among the respective colored layers 6 of R, G, and B, is formed between adjacent colored layers 6 in a Y direction. In addition, a light shielding layer 68 (see FIG. 9B), which is formed by overlapping the colored layers of three colors among the respective colored layers 6 of R, G, and B, is formed between adjacent colored layers 6 in an X direction. The respective scanning electrodes 64 are formed such that they extend in an X direction at predetermined intervals in a Y direction. As shown in FIG. 6, left end portions or right end portions of the respective scanning electrodes 64 extend to the inside of the sealant 5, and they are electrically connected to the plurality of conductive members 7 that are provided in the sealant 5.

The above-described state in which the color filter substrate 94 and the element substrate 93 are bonded to each other through the sealant 5 is shown in FIG. 6. As shown in FIG. 6, the respective scanning electrodes 64 of the color filter substrate 94 cross the respective data lines 62 of the element substrate 93, and overlap two-dimensionally the plurality of pixel electrodes 10 that forms columns in an X direction. As such, one sub-pixel region SG is constructed by a region where one scanning electrode 64 and one pixel electrode 10 overlap each other.

In addition, the respective scanning electrodes 64 of the color filter substrate 94 and the respective wiring lines 61 of the element substrate 93 are alternately disposed between the left side 200a and the right side 200b, as shown in the drawing. The respective scanning electrodes 64 and the respective wiring lines 61 are vertically connected to each other through conductive members 7 provided in the sealant 5. That is, the respective scanning electrodes 64 of the color filter substrate 94 and the respective wiring lines 61 of the element substrate 93 are alternately disposed between the left side 200a and the right side 200b, as shown in the drawing, so that they are electrically connected to each other. For this reason, the respective scanning electrodes 64 of the color filter substrate 94 are electrically connected to the respective X driver ICs 66, which are respectively located on the right and left sides of the paper, through the respective wiring lines 61 of the element substrate 93.

In the liquid crystal device 200 having the above-described structure, the respective scanning electrodes 64 are sequentially and exclusively selected one by one by the respective X driver ICs 66 through the respective wiring lines 61 on the basis of power and a signal from the FPC 41 side that is connected to the electronic apparatus or the like, and the selected scanning electrodes 64 are supplied with a gate signal of the selection voltage. Meanwhile, the other non-selected scanning electrodes 64 are provided with the scanning signals of the non-selected voltage. In addition, the Y driver IC 69 supplies data signals according to display contents to the pixel electrodes 10 formed at locations corresponding to the selected scanning electrode 64 through the corresponding data lines 62 and the corresponding TFD elements 63. As a result, a display state of the liquid crystal layer 4 is changed to a non-display state or an intermediate display state, and an alignment state of the liquid crystal layer 4 is controlled.

Structure of Pixel

Figure 7:
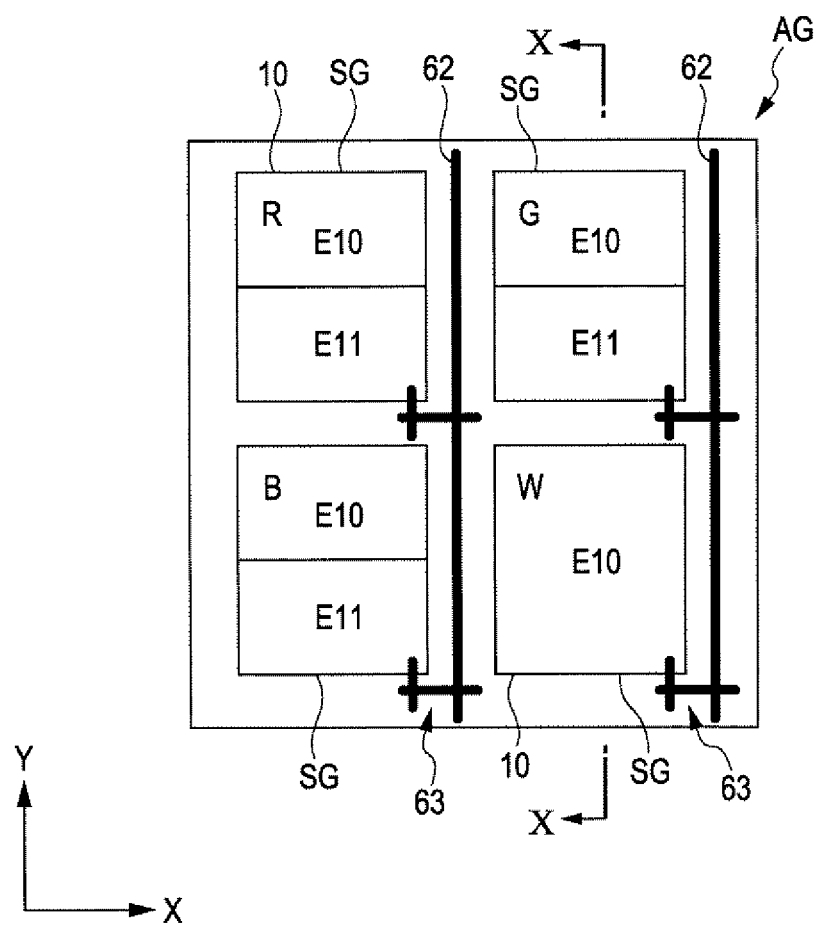
FIG. 7 is a plan view illustrating a structure of one pixel including R, G, B, and W in a liquid crystal device according to a second embodiment of the invention.

Next, a structure of one pixel region AG will be described with reference to FIG. 7. FIG. 7 is an enlarged plan view illustrating a portion corresponding to one pixel region AG (a portion surrounded with broken lines) in FIG. 6.

As shown in FIG. 7, one pixel region AG has a structure in which sub-pixel regions SG of two rows and two columns corresponding to R, G, B, and W are provided. Further, each of the sub-pixel regions SG that correspond to R, G, and B has a transmissive region E10 where transmissive display is performed, and a reflective region E11 where reflective display is performed. Meanwhile, the sub-pixel region SG that corresponds to W has only a transmissive region E10, and does not have a reflective region E11.

Next, a structure of each of the sub-pixel regions SG that correspond to R, G, and B in FIG. 7 will be described with reference to FIG. 8.

Figure 9A:
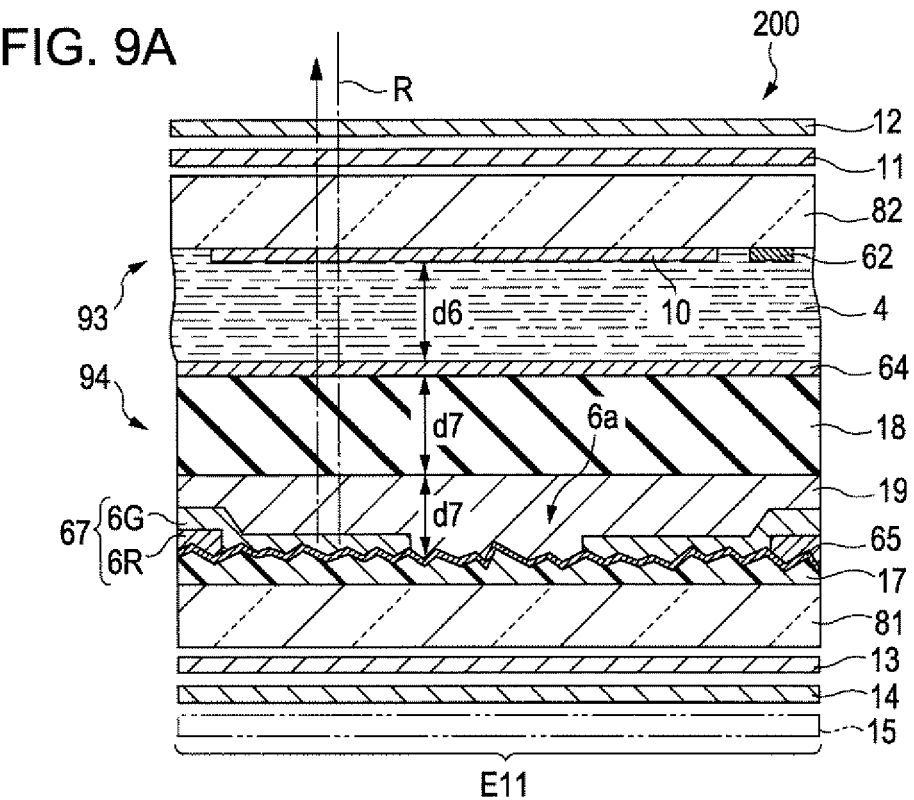
FIG. 9A is a partial cross-sectional view taken along the cut line IXA-IXA in FIGS. 8A and 8B.
Figure 9B:
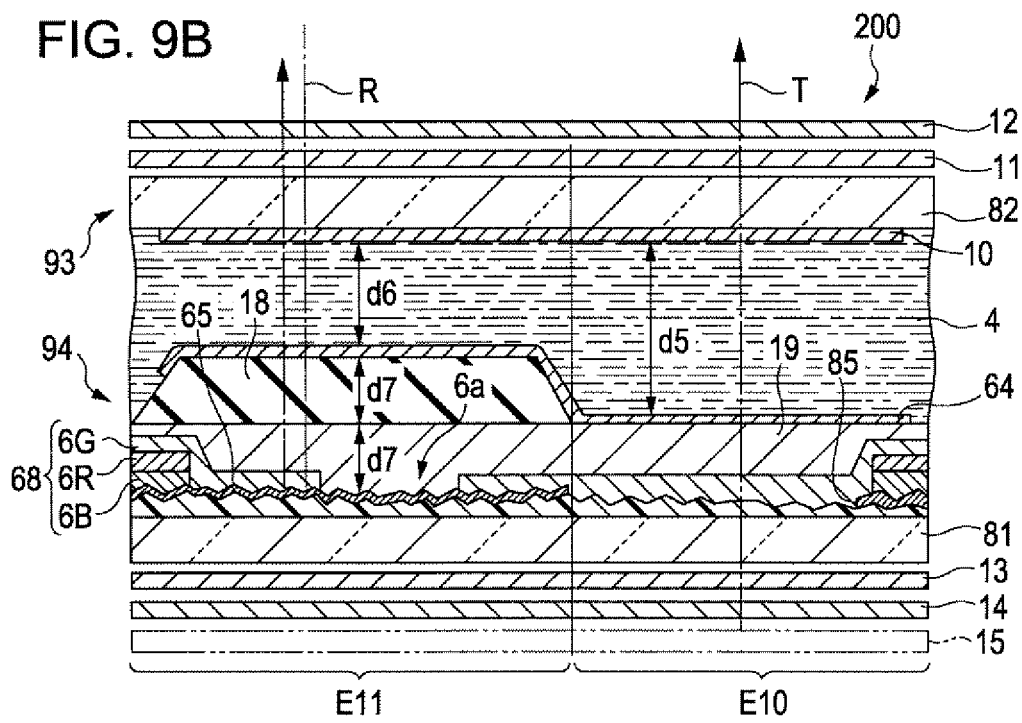
FIG. 9B is a partial cross-sectional view taken along the cut line IXB-IXB in FIG. 8.

FIG. 8A is a partial enlarged plan view illustrating a structure of an element substrate 93 corresponding to the respective sub-pixel regions SG of R, G, and B. FIG. 8B is a partial enlarged plane view illustrating a structure of a color filter substrate 94 that corresponds to the respective sub-pixel regions SG of R, G, and B. FIG. 9A is a partial cross-sectional view taken along the cutting line IXA-IXA in FIG. 8A, and illustrates a sectional structure of the liquid crystal device 200 that corresponds to the respective reflective regions E11 of R, G, and B. FIG. 9B is a partial cross-sectional view taken along the cutting line IXB-IXB in FIG. 8A, and illustrates a sectional structure of the liquid crystal device 200 that corresponds to the respective sub-pixel regions SG of R, G, and B.

First, a structure of an element substrate 93 that corresponds to one of the sub-pixel regions SG of R, G, and B will be described. On a lower substrate 81 that is formed of a material, such as glass, the data line 62, the TFD element 63, and the pixel electrode 10 are formed. As shown in FIG. 8, the data line 62 is formed such that it extends in a Y direction near a right end of the sub-pixel region SG. The TFD element 63 is provided near a corner of the sub-pixel region SG. The pixel electrode 10 is provided in the sub-pixel region SG, so that it is electrically connected to the TFD element 63. Therefore, the data line 62 is electrically connected to the pixel electrode 10 through the TFD element 63. In addition, on the pixel electrode 10 or the like, an alignment film (not shown) is formed.

Next, a structure of the color filter substrate 94 that corresponds to one sub-pixel region SG will be described. Here, one sub-pixel region SG is divided into a structure of a transmissive region E10 and a structure of a reflective region E11.

First, a structure of the reflective region E11 in one of the sub-pixel regions SG of R, G, and B will be described.

On the upper substrate 82 that is made of glass or the like, the resin layer 17 is formed. On the surface of the resin layer 17, a plurality of unevenness portions, each of which has a function of scattering light, are formed. On the resin layer 17, a reflecting layer 65 made of Al or the like is formed. For this reason, the reflecting layer 65 is formed in a shape that reflects the plurality of unevenness portions of the resin layer 17. On the reflecting layer 65, the respective colored layers 6 of R, G, and B are formed. Each of the colored layers 6 of R, G, and B has an opening 6a that has a function of uniformly displaying a color in a transmissive region E10 and a reflective region E11. In FIG. 8B, a region that is partitioned by the sub-pixel region SG and the broken line region E30 has a region in which a light shielding layer 67 where the colored layers 6 of any two colors among the colored layers 6 of R, G, and B overlap each other is formed, and a region in which a light shielding layer 68 where the colored layers 6 of any three colors overlap one another is formed. On the colored layer 6 and the reflecting layer 65 that is located in the opening 6a, a protective layer 19 having an insulating property is formed. The protective layer 19 has a function of protecting the colored layer 6 from being corroded or contaminated due to impurities that are used in a process of manufacturing the color filter substrate 94. The distance between the top surface of the resin layer 17 and the top surface to the protective layer 19 is set to d7. On the protective layer 19, the cell-thickness-adjusting insulating layer 18 is formed. The thickness of the cell-thickness-adjusting insulating layer 18 is set to d7. The scanning electrode 64 is formed on the cell-thickness-adjusting insulating layer 18. Further, an alignment film (not shown) is formed on the scanning electrode 64.

In addition, on an external surface of the lower substrate 81, a phase difference plate 13 is disposed, and on an external surface of the phase difference plate 13, a polarizer 14 is disposed. Further, a backlight 15 is disposed on an external surface of the polarizer 14.

The element substrate 93 that corresponds to the above-described reflective region E11 and the color filter substrate 94 that corresponds to the corresponding reflective region E11 are opposite to each other with the liquid crystal layer 4 interposed therebetween. In addition, the thickness of the liquid crystal layer 4 that corresponds to the reflective region E11 is set to d6.

Furthermore, when the reflective display is performed in a reflective region E11 having the above-described structure, external light, which is incident on the liquid crystal device 200, propagates along a path R shown in FIGS. 9A and 9B. That is, the external light having been incident on the liquid crystal device 200 is reflected on the reflecting layer 65 and then propagates to a viewer. In this case, the external light passes through a region where the pixel region 10, the cell-thickness-adjusting insulating layer 18, and the respective colored layers 6 of R, G, and B are formed, then reflected on the reflecting layer 65 located below the respective colored layers 6 and the reflecting layer 65 located in the opening 6a, and then passes through the colored layer 6, the cell-thickness-adjusting insulating layer 18, and the pixel electrode 10 again so as to represent predetermined hue and brightness. In this way, a viewer can view a desired color display image.

Next, a structure of the transmissive region E10 in one of the sub-pixel regions SG of R, G, and B will be described.

As shown in FIG. 9B, on the lower substrate 81, a resin layer 17 is formed. On the resin layer 17, a transmissive opening region 85 that transmits the light is formed. In addition, on the resin layer 17 that is located in the transmissive opening region 85, the colored layers 6 of R, G, and B are formed. On the colored layers 6 of R, G, and B, the protective layer 19 is formed. In addition, on the protective layer 19, the scanning electrode 64 is formed. In addition, on the scanning electrode 64, an alignment film (not shown) is formed.

Further, on an external surface of the lower substrate 81, a phase difference plate 13 is disposed, and a polarizer 14 is disposed on the external surface of the phase difference plate 13. Further, on an external surface of the polarizer 14, a backlight 15 is disposed. Meanwhile, on the upper substrate 82, the pixel electrode 10 is formed. Further, on the pixel electrode 10, an alignment film (not shown) is formed.

The element substrate 93 that corresponds to the above-described transmissive region E10 and the color filter substrate 94 that corresponds to the corresponding transmissive region E10 are opposite to each other with the liquid crystal layer 4 interposed therebetween. In addition, the thickness d5 (≅d6+d7) of the liquid crystal layer 4 that corresponds to the transmissive region E10 is set to be larger than the thickness d6 of the liquid crystal layer 4 that corresponds to the reflective region E11, which results in forming a multigap structure.

Further, when transmissive display is performed in a transmissive region E10 having the above-described structure, illumination light, which is emitted from the backlight 15, propagates along a path T shown in FIG. 9B, and then passes through the resin layer 17, the colored layer 6, the protective layer 19, the scanning electrode 64, and the pixel electrode 10 so as to propagate to a viewer. In this case, the illumination light passes through the colored layers 6 of R, G, and B, which results in representing predetermined hue and brightness. In this way, a viewer can view a desired color display image.

Next, a structure of a sub-pixel SG corresponding to W will be described with reference to FIG. 10.

FIG. 10 is a partial cross-sectional view taken along the cutting line X-X in FIG. 7, which illustrates a sectional structure including a sub-pixel region SG corresponding to W. In addition, in order to easily recognize a different portion between the sectional structure of the sub-pixel region SG corresponding to W and the sectional structure of each of the sub-pixel regions SG corresponding to R, G, and B, FIG. 10 also shows a sectional structure of a sub-pixel region SG that corresponds to G among the three colors. In addition, in FIG. 10, the sub-pixel region SG corresponding to W is simply denoted by SG (W), and the sub-pixel region SG corresponding to G is simply denoted by SG (G). Further, in the below description, the constituent elements that are the same as the above-described constituent elements are denoted by the same reference numerals, and the description thereof will be simplified or omitted.

First, a structure of the color filter 94 that corresponds to the sub-pixel region SG of W will be described. On the lower substrate 81, the resin layer 17 is formed. The resin layer 17, which is formed in the transmissive region E10, is formed such that its surface is flat. On the resin layer 17, the cell-thickness-adjusting insulating layer 18 is formed. On the cell-thickness-adjusting insulating layer 18, the scanning electrode 64 is formed. Further, on the scanning electrode 64, an alignment film (not shown) is formed. For this reason, the sub-pixel region SG which corresponds to W has only a transmissive region E10. In addition, in the sub-pixel region SG that corresponds to W, a colored layer that uses a white material is not provided. Meanwhile, a structure of the element substrate 93 that corresponds to the sub-pixel region SG corresponding to W is the same as that of the element substrate 93 that corresponds to the sub-pixel regions SG of R, G, and B.

The element substrate 93 that corresponds to the above-described sub-pixel region SG of W and the color filter substrate 94 that corresponds to the corresponding transmissive region E10 are opposite to each other with the liquid crystal layer 4 interposed therebetween. In addition, the thickness of the liquid crystal layer 4 that corresponds to the sub-pixel region SG of W is set to have the same value as the thickness d5 of the liquid crystal layer 4 that corresponds to the respective transmissive regions E10 of R, G, and B.

In addition, the reason why the transmissive display is performed in the sub-pixel region SG of W is substantially the same as the above. That is, when the transmissive display is performed in the sub-pixel region SG of W, the illumination light, which is emitted from the backlight 15, propagates along a path T shown in FIG. 10, then passes through the resin layer 17, the cell-thickness-adjusting insulating layer 18, the scanning electrode 64, and the pixel electrode 10, and then propagates to a viewer. In this case, the illumination light passes through the above-described elements so as to represent predetermined brightness. Thereby, the luminance and the contrast can be improved.

Next, advantages and effects of the liquid crystal device 200 according to the second embodiment of the invention will be described. The liquid crystal device 200 according to the second embodiment has the same advantages and effects as the liquid crystal device according to the first embodiment.

That is, in the liquid crystal device 200, in particular, in the reflective region E11 of each of R, G, and B and the transmissive region E10 of W (transparent), the cell-thickness-adjusting insulating layer 18, which is made of the same transparent material (for example, transparent resin material), is provided. That is, in the course of manufacturing the liquid crystal device 200, the cell-thickness-adjusting insulating layer 18 that is provided on the respective protective layers 19 in the respective reflective regions E11 of R, G, and B and the cell-thickness-adjusting insulating layer 18 that is provided in the transmissive region E10 of W (transparent) are simultaneously formed of the same transparent material through the same process. Thereby, the multigap structure and the cell-thickness-adjusting insulating layer 18 can be simultaneously respective formed at a location that corresponds each of the sub-pixel regions SG of R, G, and B and the sub-pixel region SG (transmissive region E10) of W. As a result, it is possible to reduce the number of processes as compared with the comparative example, which results in reducing the manufacturing cost of the liquid crystal device 200.

As described above, in the relationship among the thickness d5 of the liquid crystal layer 4 that corresponds to the respective transmissive regions E10 of R, G, B, and W, the thickness d6 of the liquid crystal layer 4 that correspond to the respective reflective regions E11 of R, G, and B, and the thickness d7 of the cell-thickness-adjusting insulating layer 18 that corresponds to the respective reflective regions E11 of R, G, and B, and the cell-thickness-adjusting insulating layer 18 that corresponds to the respective transmissive region E10 of W, the relationship is set to satisfy the condition d5≅d6+d7. In addition, when the thickness d5 is set to 4 μm and the thickness d6 is set to 2 μm, the thickness d7 is preferably set to about 2 μm.

Modification

In the first embodiment, since the uniform color is displayed in the transmissive region E10 and the reflective region E11 in the respective sub-pixel regions SG of R, G, and B at the color filter substrate 92 side, the opening 6a is provided in the colored layer 6 that is formed in the reflective region E11. The invention is not limited thereto, and the opening 6a is not provided in the colored layer 6, the thickness of the colored layer 6 that is provided in the transmissive region E10 is made to be larger than the thickness of the colored layer 6 that is formed in the reflective region E11 so as to obtain the same advantages and effects.

Figure 11:
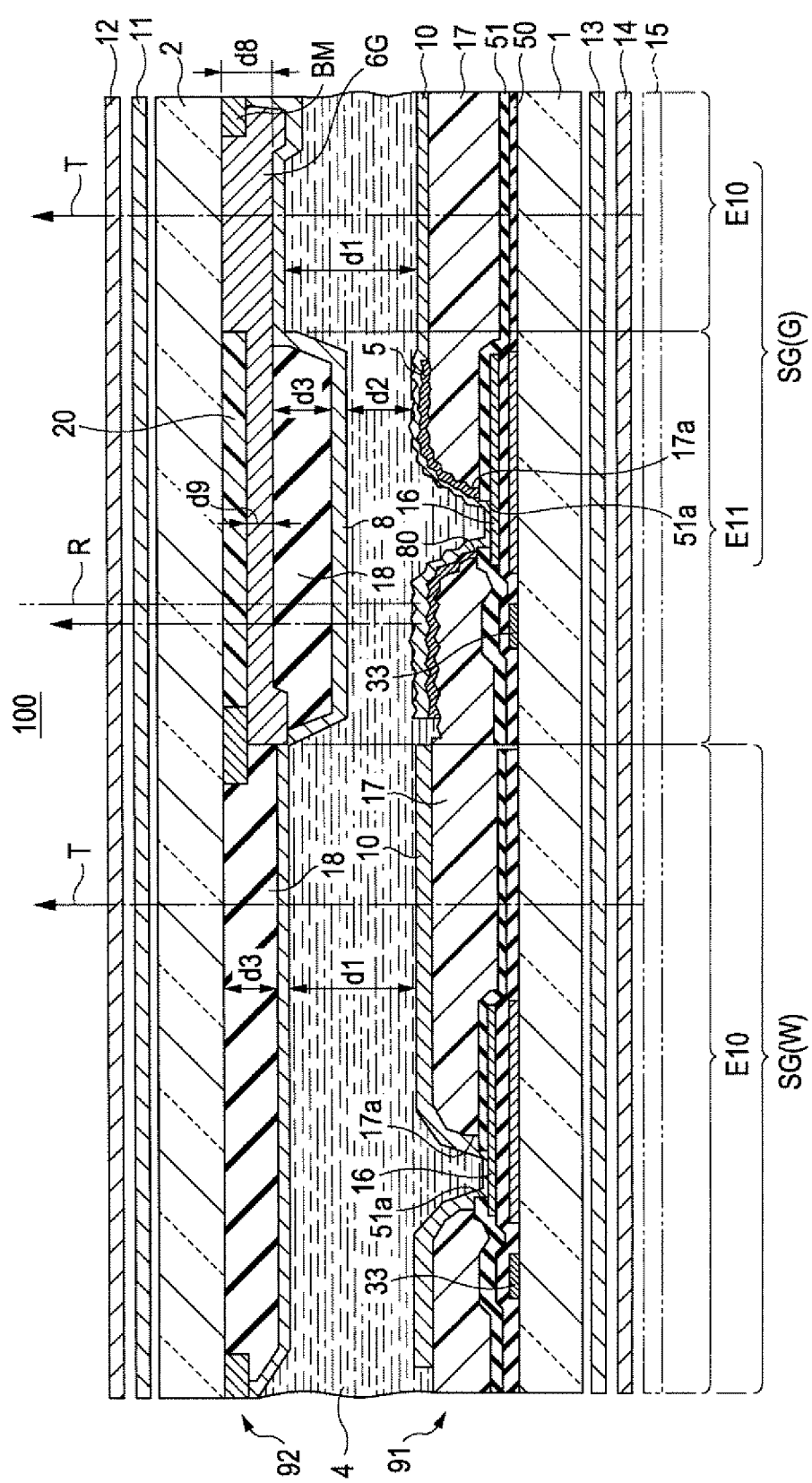
FIG. 11 is a partial cross-sectional view illustrating a structure of a modification of a liquid crystal device according to a second embodiment of the invention.

The above-described structure will be simply described with reference to FIG. 11. FIG. 11 is a cross-sectional view that corresponds to FIG. 5. In this case, in FIG. 11, as can be apprehended in the sub-pixel region SG of G, the thickness of the colored layer 6 that is formed in the transmissive region E10 is different from that of the colored layer 6 that is formed in the reflective region E11.

That is, as shown in FIG. 11, when focusing on the sub-pixel region SG that corresponds to the colored layer 6G, the structures of the transmissive region E10 and the reflective region E11 are as follows. First, in the transmissive region E10, the colored layer 6G is formed on the upper substrate 2, and the common electrode 8 is formed on the colored layer 6G. Meanwhile, in the reflective region E11, the resin layer 20, which is made of a resin material, is formed on the upper substrate 2, the colored layer 6G is formed on the resin layer 20, and the cell-thickness-adjusting insulating layer 18 is formed on the colored layer 6G. In addition, on the cell-thickness-adjusting insulating layer 18, the common electrode 8 is formed. Further, the thickness of the colored layer 6G that is formed in the transmissive region E10 is set to d8, and the thickness of the colored layer 6G that is formed in the reflective region E11 is set to d9 (<d8). In this case, preferably, the thickness d8 of the colored layer 6G that is formed in the transmissive region E10 is set to the thickness that is twice as much as the thickness d9 of the colored layer 6G that is formed in the reflective region E11.

In this structure, when the transmissive display is performed, the illumination light that has been emitted from the backlight 15 passes through the colored layer 6G of the transmissive region E10 along the path T one time. Meanwhile, when the reflective display is performed, the external light firstly passes through the colored layer 6G of the reflective region E11 along the path R, then the external light that has passed through the colored layer 6G is reflected on the reflective electrode 5 that is disposed below the colored layer 6G, and then passes through the colored layer 6G along the path R again. As a result, the external light passes through the colored layer 6G twice. That is, when the reflective display is performed, the external light passes though the colored layer 6G by the small number of times, as compared with the case in which the transmissive display is performed.

For this reason, in a case in which the thickness d8 of the colored layer 6G that is formed in the transmissive region E10 is set to the thickness that is twice as much as the thickness d9 of the colored layer 6G that is formed in the reflective region E11, the light passes through the transmissive region E10 and the reflective region E11 at the same wavelength. As a result, a color can be uniformly displayed in both the transmissive region and the reflective region. In this case, although not described, each of the sub-pixel regions of R and B can have the same structure as the modification.

Further, similar to the first embodiment, in order that in each of the sub-pixel regions SG of R, G, and B, the uniform color is displayed in the transmissive region E10 and the reflective region E11, the second embodiment is constructed such that the opening 6a is provided in the colored layer 6 that is formed in the reflective region E11.

The invention is not limited thereto. That is, even in the second embodiment, the same structure as the above-described modification can be used. This characteristic is simply described with reference to FIG. 12. FIG. 12 is a cross-sectional view that corresponds to FIG. 10. In this case, in FIG. 12, the thickness of the colored layer 6 that is formed in the transmissive region E10 is different from that of the colored layer 6 that is formed in the reflective region E11, as is apprehended by focusing on the sub-pixel region SG of G.

That is, as shown in FIG. 12, when focusing on the sub-pixel region SG that corresponds to the colored layer 6G, the structures of the transmissive region E10 and the reflective region E11 are as follows. First, in the transmissive region E10, the colored layer 6G is formed on the lower substrate 81, the protective layer 19 is formed on the colored layer 6G, and the scanning electrode 64 is formed on the protective layer 19. Meanwhile, in the reflective region E11, the resin layer 17 is formed on the lower substrate 81, and the reflecting layer 65 is formed on the resin layer 17. In addition, the colored layer 6G is formed on the reflecting layer 65, and the protective layer 19 is formed on the colored layer 6G. In addition, on the protective layer 19, the cell-thickness-adjusting insulating layer 18 is formed, and the scanning electrode 64 is formed on the cell-thickness-adjusting insulating layer 18.

In addition, the thickness of the colored layer 6G that is formed in the transmissive region E10 is set to d10, and the thickness of the colored layer 6G that is formed in the reflective region E11 is set to d11 (<d10). In this case, preferably, the thickness d10 of the colored layer 6G that is formed in the transmissive region E10 is set to the thickness that is twice as much as the thickness d11 of the colored layer 6G that is formed in the reflective region E11. As a result, by using the above-mentioned method, the light is transmitted through the transmissive region E10 and the reflective region E11, and the uniform color can be displayed in the transmissive region E10 and the reflective region E11. In addition, each of the sub-pixel regions SG of R and B can have the same structure as the above-mentioned modification.

Figure 13A:
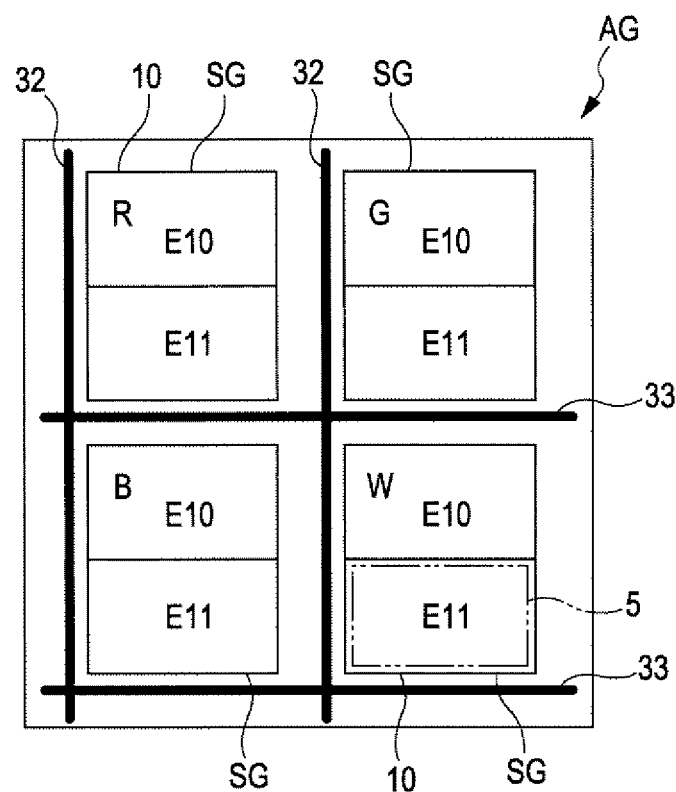
FIG. 13A is a plan view illustrating a modification of the configuration of one pixel including R, G, and B.
Figure 13B:
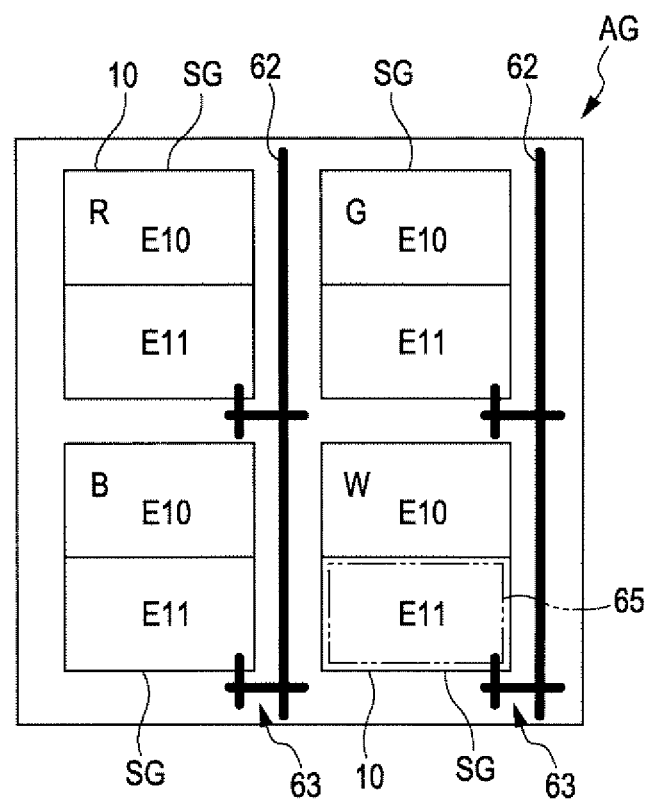
FIG. 13B is a plan view illustrating a modification of the configuration of one pixel including R, G, and B.

In addition, in the first and second embodiments (including the above-mentioned modification), in each of the respective sub-pixel regions SG of R, G, and B, the transmissive region E10 and the reflective region E11 are provided, while only the transmissive region E10 is provided in the sub-pixel region SG of W. However, the invention is not limited thereto. In the first and second embodiments of the invention, similar to the structures of the respective sub-pixel regions SG of R, G, and B, the sub-pixel region SG of W also has a structure in which the transmissive region E10 and the reflective region E11 are provided. FIGS. 13A and 13B illustrates a planar structure of one pixel region AG having the above-mentioned structure in which the sub-pixel region SG of W has the transmissive region E10 and the reflective region E11. FIG. 13A is a plan view illustrating a portion the corresponds to FIG. 2 showing the liquid crystal device according to the first embodiment of the invention, and illustrates a structure in which the transmissive region E10 and the reflective region E11 are provided in the sub-pixel region SG of W. FIG. 13B is a plan view illustrating a portion the corresponds to FIG. 7 showing the liquid crystal device according to the second embodiment of the invention, and illustrates a structure in which the transmissive region E10 and the reflective region E11 are provided in the sub-pixel region SG of W.

In this case, in the first embodiment (including the above-mentioned modification), at the element substrate 91 side, the reflective electrode 5 needs to be provided between the resin layer 17 and the pixel electrode 10 that correspond to the reflective region E11 of W. Meanwhile, in the second embodiment (including the above-described modification), at the color filter substrate 94 side, the reflecting layer 65 needs to be provided between the resin layer 17 and the cell-thickness-adjusting insulating layer 18 in the reflective region E11 of W.

Figure 14A:
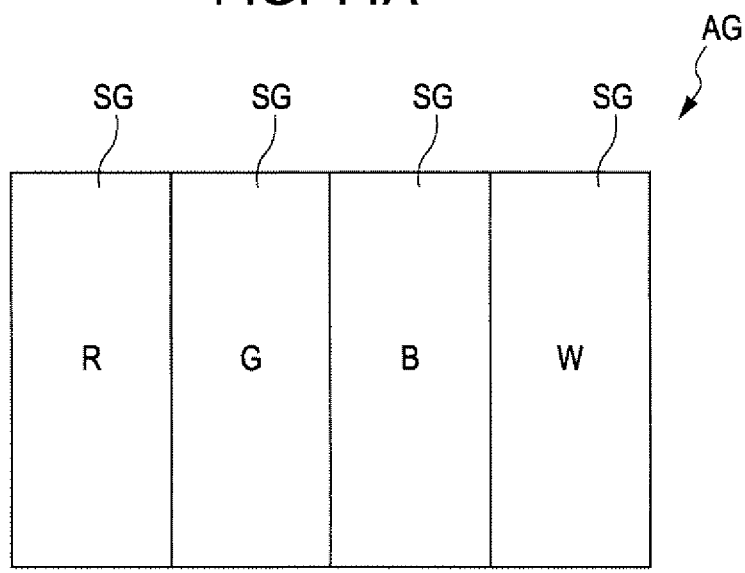
FIG. 14A is a plan view illustrating a modification of a structure of one pixel including R, G, B, and W.
Figure 14B:
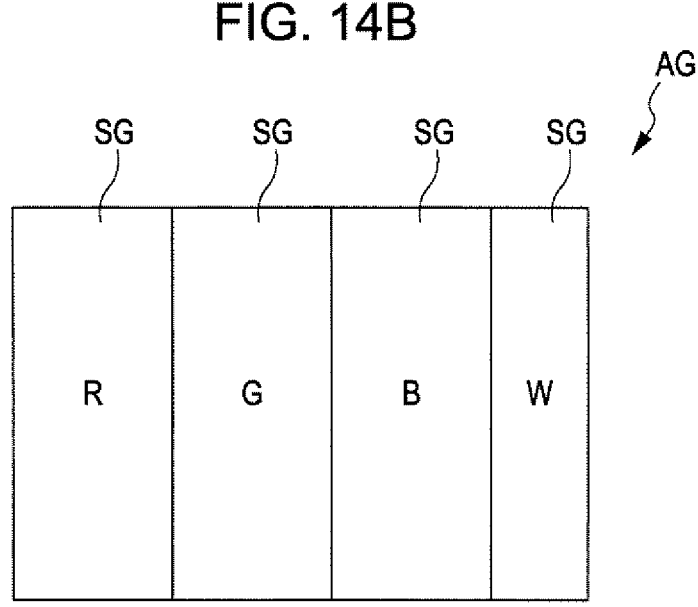
FIG. 14B is a plan view illustrating a modification of a structure of one pixel including R, G, B, and W.

In addition, in the first and second embodiments, one pixel region AG is formed by the sub-pixel regions SG of two rows and two columns that include the colored layers 6 of R, G, B, and W, but the invention is not limited thereto. That is, as shown in FIG. 14A, one pixel region AG may be formed by sub-pixel regions SG (each of which has the same area) of one row and four columns including the colored layers 6 of R, G, B, and W. In addition, at this time, the arrangement order of R, G, B, and W is not limited to the structure shown in FIG. 14A, and it may be properly changed, if necessary. As described above, if the colored layer of W is provided in one pixel region AG, the luminance is improved, while the color density is lowered due to the high luminance. Therefore, in order to prevent the color density from being lowered while improving the luminance, as shown in FIG. 14B, the area of sub-pixel region SG of W is preferably set such that it is relatively smaller than an area of each of the sub-pixel regions SG of R, G, and B. In the present embodiment, the structure of one pixel region, which includes the colored layers 6 of R, G, B, and W, is not limited to the above-mentioned structure, but various changes and modifications can be made without departing from the spirit and scope of the invention.

In addition, in the first and second embodiments of the invention, since the cell-thickness-adjusting insulating layer 18 may serve as the protective film of the respective colored layers 6 of R, G, and B, on the portion of the colored layer 6 that corresponds to the transmissive region of each of the colored layers of R, G, and B, the cell-thickness-adjusting insulating layer 18 may remain as a thin-walled portion.

In addition, in the first and second embodiments of the invention, the cell-thickness-adjusting insulating layer 18 and the colored layer are disposed on the same substrate, but the invention is not limited thereto. The cell-thickness-adjusting insulating layer 18 and the colored layer 6 may be disposed on the separate substrates. Specifically, the cell-thickness-adjusting insulating layer 18 may be disposed on the substrate where the switching element is provided, and the colored layer 6 may be disposed on the substrate that is disposed to be opposite to the corresponding substrate. At this time, the reflective electrode 5 or the reflecting layer 65 may be disposed on the cell-thickness-adjusting insulating layer 18. That is, it is preferable that it is prevented by the cell-thickness-adjusting insulating layer 18 that the difference in the thickness of the liquid crystal layer is largely different between the transmissive region of each of the display pixels including the colored layers 6 of R, G, and B and the transmissive region of each of the display pixels of W not having the colored layer.

Method of Manufacturing Liquid Crystal Device

Next, a method of manufacturing each of the liquid crystal devices according to the first and second embodiment of the invention will be described.

Method of Manufacturing Liquid Crystal Device According to First Embodiment

Figure 15:
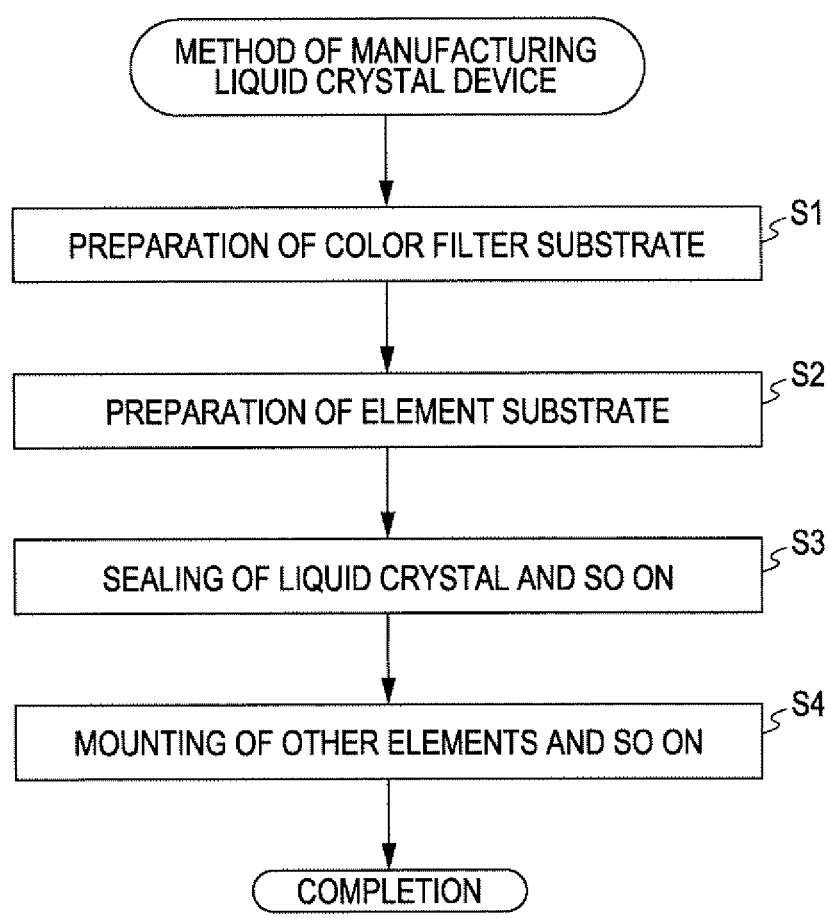
FIG. 15 is a flowchart illustrating a method of manufacturing liquid crystal devices according to first and second embodiment of the invention.
Figure 16:
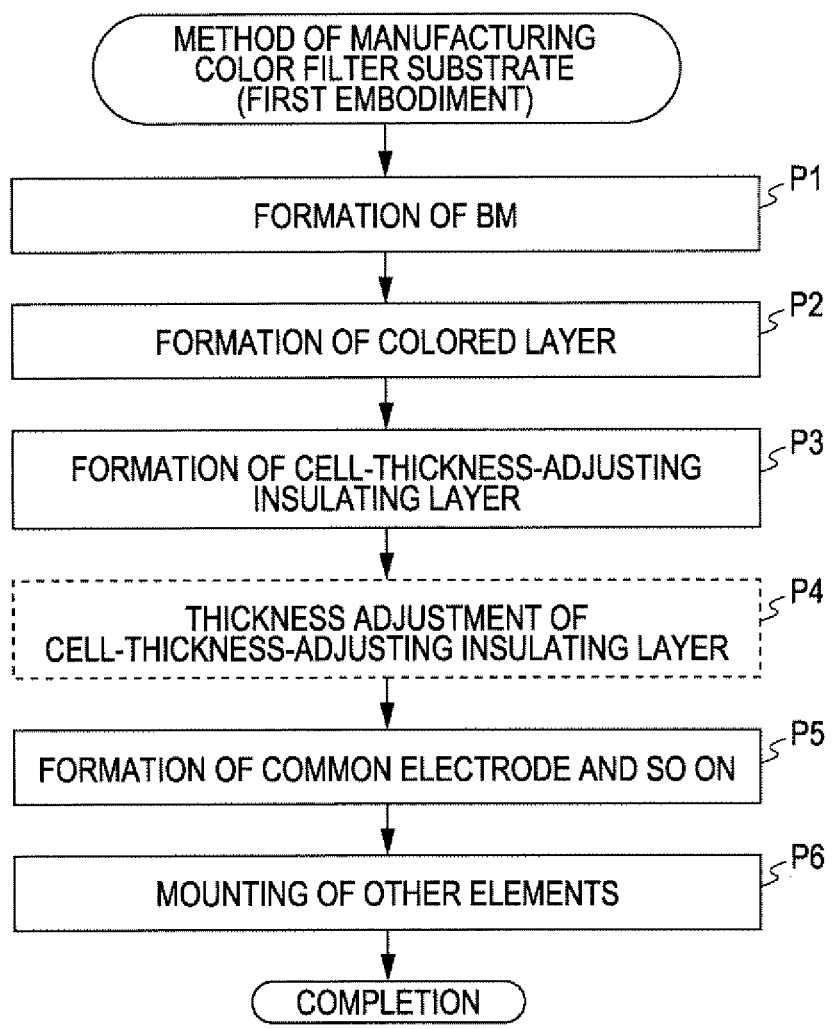
FIG. 16 is a flow chart illustrating a method of manufacturing a color filter substrate according to a first embodiment of the invention.

First, a method of manufacturing a liquid crystal device 100 according to the first embodiment of the invention will be described with reference to FIGS. 15 to 21. FIG. 15 is a flowchart illustrating a method of manufacturing each of the liquid crystal devices 100 and 200 according to the first and second embodiment of the invention. FIG. 16 is a flowchart illustrating a method of manufacturing a color filter substrate 92 according to the first embodiment of the invention. FIGS. 17 to 21 are diagrams illustrating the respective processes that correspond to the process S1 in FIG. 15. In FIGS. 17 to 21, the SG (W) indicates the sub-pixel region SG that corresponds to W (transparent), and the SG (G) indicates the sub-pixel region SG that corresponds to G (green). In addition, E10 indicates the region that becomes the transmissive region, and E11 indicates the region that becomes the reflective region. In the below description, the sectional structure of the color filter substrate 92 shown in FIG. 5 will be exemplified.

First, the above-mentioned color filter substrate 92 is manufactured (Process S1). This color filter substrate 92 is manufactured through the processes P1 to P6.

Figure 17A:
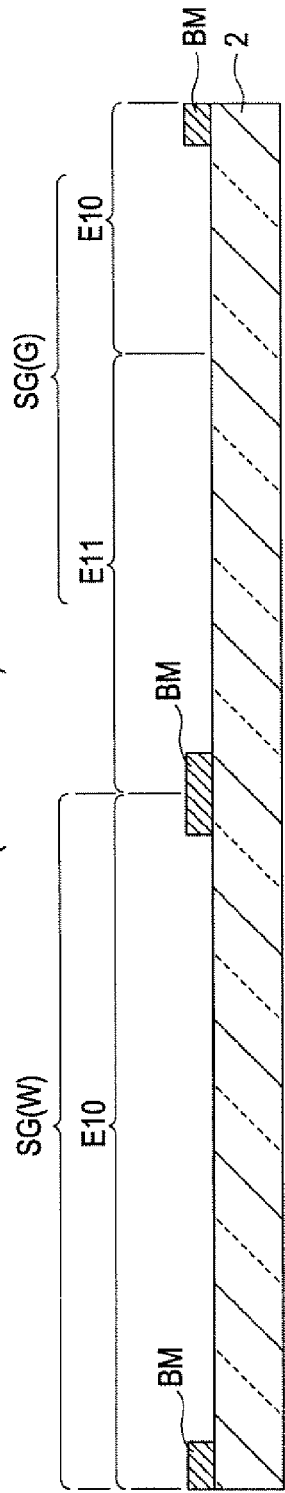
FIG. 17A is a cross-sectional view illustrating a process of a method of manufacturing a color filter substrate according to a first embodiment of the invention.

Specifically, first, the upper substrate 2, which is made of a material, such as glass or quartz, is prepared. Then, a BM film, which is made of, for example, a black resin material, is formed on the upper substrate 2 by means of a photolithography technology, and then an etching process is performed. Thereby, as shown in FIG. 17A, the BM is formed around the sub-pixel region SG so as to have a frame shape (Process P1).

Figure 17B:
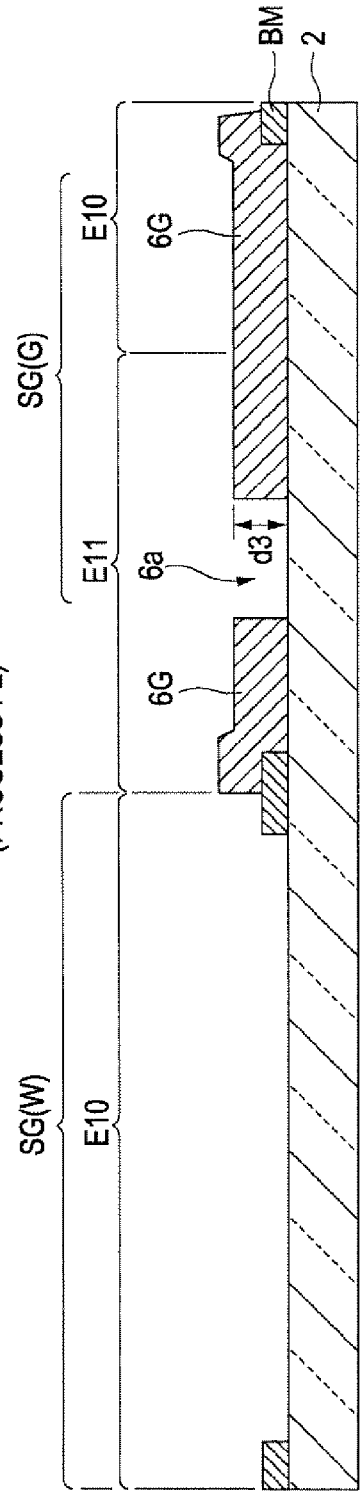
FIG. 17B is a cross-sectional view illustrating a process of a method of manufacturing a color filter substrate according to a first embodiment of the invention.

Next, the respective colored layer of R, G, and B are formed (Process P2). Specifically, as shown in FIG. 17B, the respective colored layers 6 of R, G, and B are formed in the respective sub-pixel regions SG by means of a photolithography technology such that they form the arrangement patterns shown in FIG. 1. At this time, the thickness of each of the colored layers 6 is set to d3. Preferably, the thickness d3 of each of the colored layers 6 is set to about 2 µm. Further, at this time, the opening 6a, which has a function of uniformly displaying a color in the transmissive region E10 and the reflective region E11, is provided in the respective colored layers 6R, 6G, and 6B that correspond to the reflective region 11. At this time, the colored layer 6, which is formed in the sub-pixel region SG of W, is removed by means of an etching process.

Next, the cell-thickness-adjusting insulating layer is formed (Process P3). Specifically, the cell-thickness-adjusting insulating layer 18, which is made of a transparent resin material, is formed over one entire surface of the portion of the upper substrate 2, the BM and the colored layer 6, and then an etching process is performed. At this time, the thickness of the cell-thickness-adjusting insulating layer 18 is set to have the same thickness d3 as the colored layer 6. Thereby, when the liquid crystal device 100 is manufactured by the above-mentioned method, the thickness of the liquid crystal layer 4 at the transmissive region E10 of W can be set to have the same thickness as the liquid crystal layer 4 at the respective transmissive regions E10 of R, G, and B, and the thickness of the liquid crystal layer 4 at the respective transmissive region E10 of R, G, and B and the thickness of the liquid crystal layer 4 at the respective reflective regions E11 of R, G, and B can be set to the predetermined thickness.

Specifically, in this process, the cell-thickness-adjusting insulating layer 18, which is made of the same transparent resin material, are simultaneously formed in the sub-pixel region SG of W and the respective reflective regions E11 of R, G, and B. Therefore, when compared with a method of manufacturing a liquid crystal device in which the cell-thickness-adjusting insulating layer 18 is separately formed in the sub-pixel region SG of W and the respective reflective regions E11 of R, G, and B (comparative example), the number of the processes can be reduced. As a result, it is possible to reduce the manufacturing cost of the liquid crystal device 100 which is manufactured by the present manufacturing method.

However, due to the process, the thickness of the cell-thickness-adjusting insulating layer 18 may be larger than the thickness of each of the colored layers 6.

In this case, the thickness of the liquid crystal device 4 that corresponds to the sub-pixel region SG (transmissive region E10) of W (transparent) becomes different from that of the liquid crystal layer 4 that corresponds to the respective transmissive regions E10 of R, G, and B, which causes the variation in the optical characteristic to occur in both regions.

Accordingly, in this case, the process P4 as a following process is performed, and the thickness of the cell-thickness-adjusting insulating layer 18 that corresponds to the sub-pixel region SG (transmissive region E10) of W can be made to be the same thickness as the respective colored layers 6 that correspond to the respective transmissive regions E10 of R, G, and B. Further, when the thickness of the cell-thickness-adjusting insulating layer 18 and the thickness of the respective colored layer 6 are set to have the same thickness, the process P4 does not need to be performed. In addition, the process P4 may not the following process of the process P3 but may be included in the process P3.

In this case, the process P4 will be described with reference to FIGS. 19 and 20. As described above, when the thickness of the cell-thickness-adjusting insulating layer 18 is larger than the thickness of each of the colored layers 6, in order to resolve the disadvantages, in the process P4, the thickness of the cell-thickness-adjusting insulating layer 18 is made to be the same thickness as the respective colored layers 6 by means of a photolithography process that includes a resist coating process, a preliminary drying (prebaking) process, an exposure process, a development process, and an etching process. At this time, as an exposure method, for example, a double exposure method or a halftone exposure method can be preferably used. In this case, 'the double exposure method' refers to a method of exposing the substrate manufactured by the above-mentioned process by using each of two different kinds of masks 70 and 75 having different structures (totally, the exposure is performed twice). Meanwhile, 'a halftone exposing method' refers to a method of exposing the substrate manufactured by the above-mentioned process once by using a mask 76 of which a portion has a semitransparent film with the smaller light transmittance than the transparent film.

First, a method of setting the thickness of the cell-thickness-adjusting insulating layer 18 that corresponds to the sub-pixel region SG of W (transmissive region E10) and the thickness of the respective colored layer 6 with the same thickness by means of the double exposing method will be described with reference to FIG. 19. In the below description, in the photolithography technology, the description of the other processes other than the exposure process will be omitted or simplified.

As described above, the structure of the mask 70 is different from that of the mask 75. The mask 70 is used when performing first exposure to the substrate while the mask 75 is used when performing second exposure to the substrate. In addition, each of the plurality of arrows shown in FIGS. 19A and 19B indicates a propagating direction of light, such as a UV (ultraviolet) ray or an i ray.

First, in FIG. 19A, on the substrate that is manufactured by the process P3, a photosensitive resin (resist) 18x, which becomes a cell-thickness-adjusting insulating layer 18, is coated. At this time, for example, when the thickness of each of the colored layers 6 of R, G, and B is set to d20, the resist 18 is coated by predetermined thickness d21 (=2×d20). Next, first exposure is performed by using the mask 70 that is disposed on a predetermined location of the substrate, and then exposure and etching processes are performed so as to remove any unnecessary resist 18x of the predetermined region. In addition, at this time, as the resist 18x, a positive resist is preferably used in which a resist of the region where light is shielded by the mask is cured, and a resist of the region exposed by the mask is removed.

In this case, as shown in FIG. 19A, the mask 70 has the following regions that are sequentially formed from the left. That is, the mask 70 has a first complete exposure region where an opening for completely transmitting the light is formed (disposed on a location that corresponds to the region of SG (W)), a complete light shielding region that is made of a material for completely shielding the light (disposed on a location that corresponds to the respective reflective regions E11 of SG(G), SG(R), and SG(B)), and a second complete exposure region (disposed on a location that corresponds to the respective transmissive regions E10 of SG(G), SG(R), and SG(B)).

Thereby, the resist 18x (corresponding to the thickness d20), which is completely exposed by the mask 70 and corresponds to the region E50 formed on a colored layer 6 of each of the transmissive regions E10 of R, G, and B, and the resist 18x (corresponding to the thickness d20), which corresponds to the region E51 of the sub-pixel region SG of W, are removed. In contrast, the resist 18x, which is completely shielded by the mask 70 and corresponds to each of the reflective regions E11 of R, G, and B, remains as it is without being removed.

Then, the second exposure is performed by using the mask 75. First, as shown in FIG. 19B, the mask 75 is disposed at a predetermined location on the substrate, the second exposure is performed through the mask 75, and the development and etching processes are performed so as to remove the unnecessary portion.

As shown in FIG. 19B, the mask 75 has the following regions that are sequentially formed from the left. That is, the mask 75 has a first region for completely shielding the light (disposed on a location that corresponds to the region of SG (W)), a second region for completely shielding the light (disposed on a location that corresponds to the respective reflective regions E11 of SG(G), SG(R), and SG(B)), and a complete exposure region (disposed on a location that corresponds to the respective transmissive regions E10 of SG(G), SG(R), and SG(B)).

Thereby, the resist 18x (corresponding to the thickness d21), which is completely exposed by the mask 75 and corresponds to the region E52 of each of the transmissive regions E10 of R, G, and B, is completely removed. In contrast, the resist 18x, which is completely shielded by the mask 75 and corresponds to the sub-pixel region SG of W, and the resist 18x that corresponds to each of the reflective regions E11 of R, G, and B, remain as they are without being removed.

Figure 18:
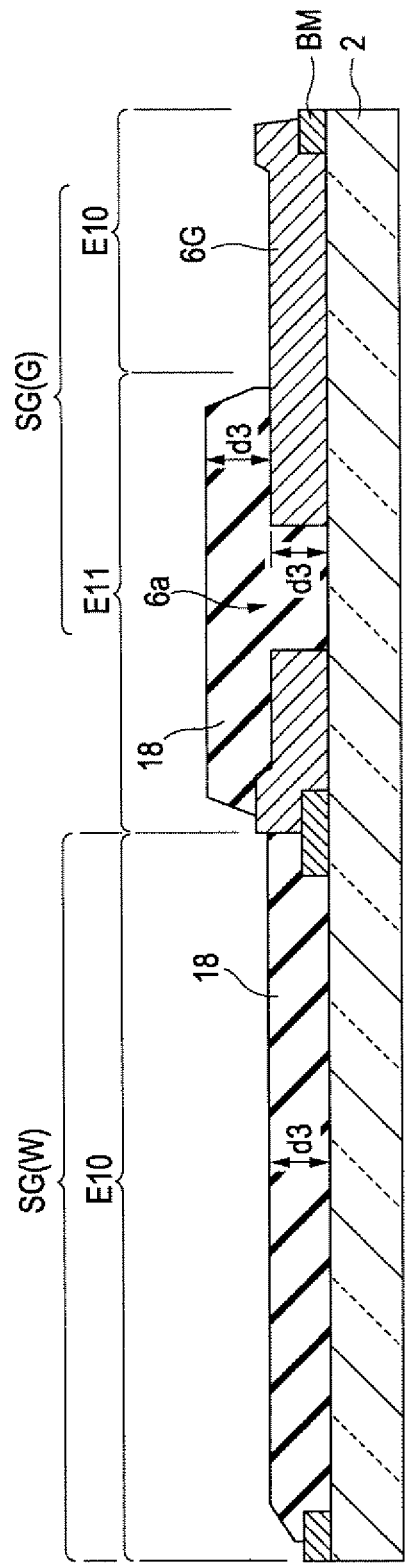
FIG. 18 is a cross-sectional view illustrating a process of a method of manufacturing a color filter substrate according to a first embodiment of the invention.

By adopting the above-mentioned double exposure method, it is possible to achieve the same state as the substrate shown in FIG. 18, that is, the thickness of the cell-thickness-adjusting insulating layer 18 that corresponds to the sub-pixel region SG (transmissive region E10) of W and the thickness of the respective colored layers 6 that correspond to the respective transmissive regions E10 of R, G, and B can be set to have the same thickness. Thereby, the thickness of the liquid crystal layer 4 that corresponds to the sub-pixel region SG (transmissive region E10) of W (transparent) and the thickness of the liquid crystal layer 4 that corresponds to the respective transmissive regions E10 of R, G, and B can be set to have the same thickness, and the same optical characteristic can be set in both regions.

Next, a method in which the thickness of the cell-thickness-adjusting insulating layer 18 that corresponds to the sub-pixel region SG (transmissive region E10) of W and the thickness of the respective colored layers 6 that correspond to the respective transmissive region E10 of R, G, and B can be set to have the same thickness by means of a half tone exposure method other than the double exposure method will be described with reference to FIG. 20.

Figure 20:
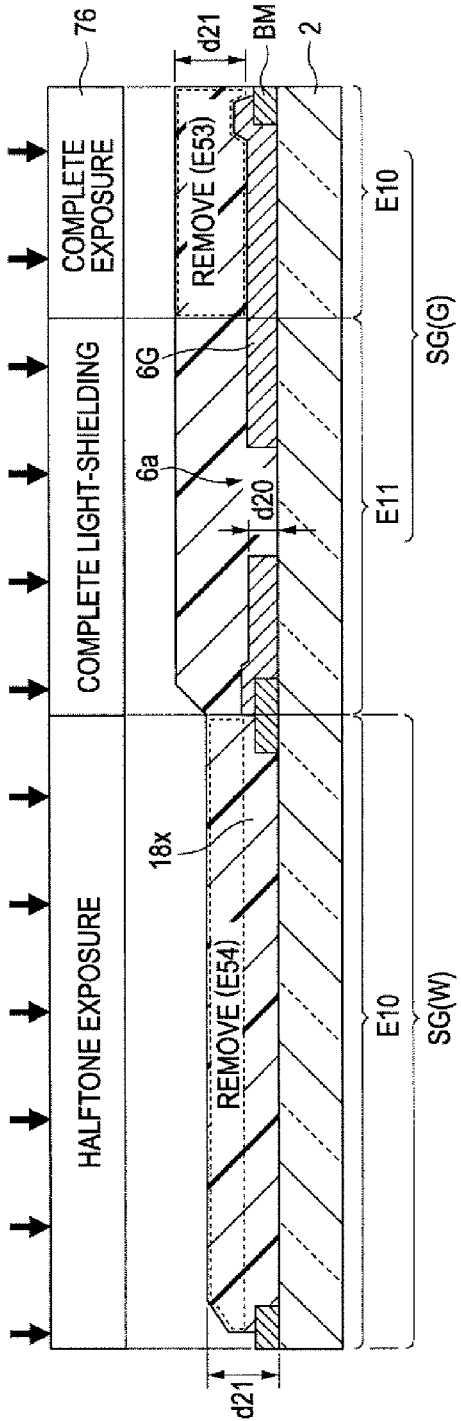
FIG. 20 is a cross-sectional view illustrating a process of a method of manufacturing a color filter substrate according to a first embodiment of the invention.

First, as shown in FIG. 20, on the substrate that is manufactured by the process P3, the resist 18x is coated. At this time, for example, when the thickness of the respective colored layers 6 of R, G, and B is set to d20, the resist 18 is coated with the predetermined thickness d21 (=2×d20). Next, the exposure is performed once by the mask 76 that is disposed at a predetermined location on the top surface of the substrate, and then the development and etching processes are performed with respect to the corresponding substrate so as to remove the unnecessary resist or the like.

In this case, as shown in FIG. 20, the mask 76 has the following regions that are sequentially formed from the left. That is, the mask 76 has a half tone exposure region that is made of a semitransparent film having smaller light transmittance than the transparent film (disposed on a location that corresponds to the region of SG (W))), a complete light shielding region (disposed on a location that corresponds to the respective reflective regions E11 of SG(G), SG(R), and SG(B)), and a complete exposure region (disposed on a location that corresponds to the respective transmissive regions E10 of SG(G), SG(R), and SG(B)).

Thereby, the resist 18x that is subjected to the half tone exposure by the mask 76 and corresponds to a region E54 of the sub-pixel region SG of W (transmissive region E10) is removed by the predetermined thickness d20 by means of an etching process, such that its thickness becomes smaller. In addition, the resist 18x that is completely shielded by the mask 76 and corresponds to the respective reflective regions E11 of R, G, and B remains as it is without being removed, and the resist 18x (having the thickness d21) that is completely exposed by the mask 76 and corresponds to the region E53 of each of the transmissive regions E10 of R, G, and B is completely removed.

By adopting the above-mentioned half tone exposure method, similar to the above-mentioned double exposure method, the thickness of the liquid crystal layer 4 that corresponds to the sub-pixel region SG (transmissive region E10) of W (transparent) and the thickness of the liquid crystal layer 4 that corresponds to the respective transmissive regions E10 of R, G, and B can be set to have the same thickness. As a result, the same optical characteristic can be set in both regions.

Figure 21:
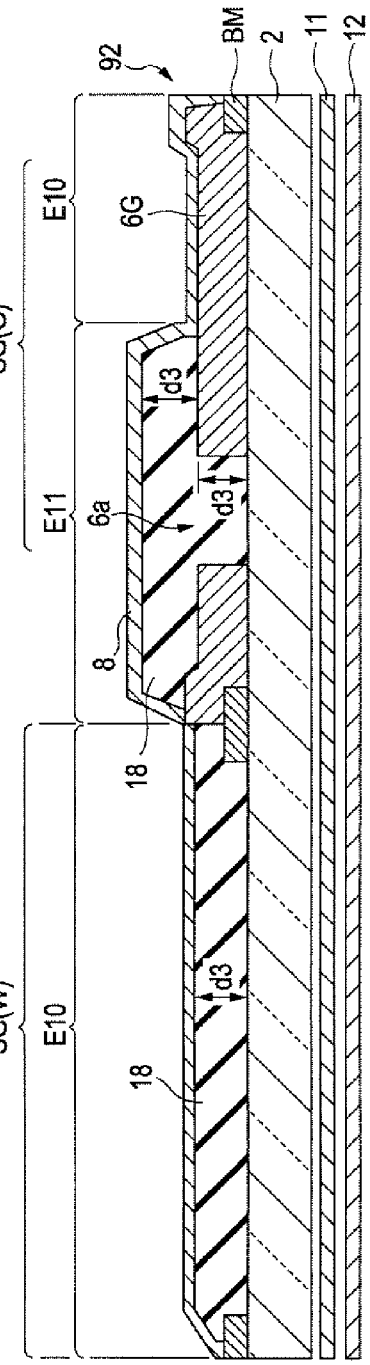
FIG. 21 is a cross-sectional view illustrating a process of a method of manufacturing a color filter substrate according to a first embodiment of the invention.

Next, as shown in FIG. 21, the common electrode 8, which is made of an ITO or the like, is formed on the cell-thickness-adjusting insulating layer 18 and the respective colored layers 6, and an alignment film (not shown) is formed on the common electrode 8 (Process P5). Then, the other constituent elements, for example, the phase difference plate 11 and the polarizer 12 are provided on the outer surface side of the upper substrate 2 (Process P6). In this manner, the color filter substrate 92 according to the first embodiment, which is shown in FIG. 5, is manufactured.

Then, referring back to FIG. 15, the element substrate 91 according to the first embodiment, which is shown in FIG. 5, is manufactured by means of a known method (Process S2). Then, the color filter substrate 92 and the element substrate 91 are bonded to each other through the sealant 5 (not shown) having the frame, the liquid crystal is inserted in both substrates through an opening that is provided in the sealant 5, and the opening is sealed by the resin material (Process S3). In addition, the essential elements are mounted (Process S4), and the liquid crystal device 100 according to the first embodiment, which is shown in FIGS. 1 and 5, is manufactured.

Method of Manufacturing Liquid Crystal Device According to Second Embodiment

Figure 22:
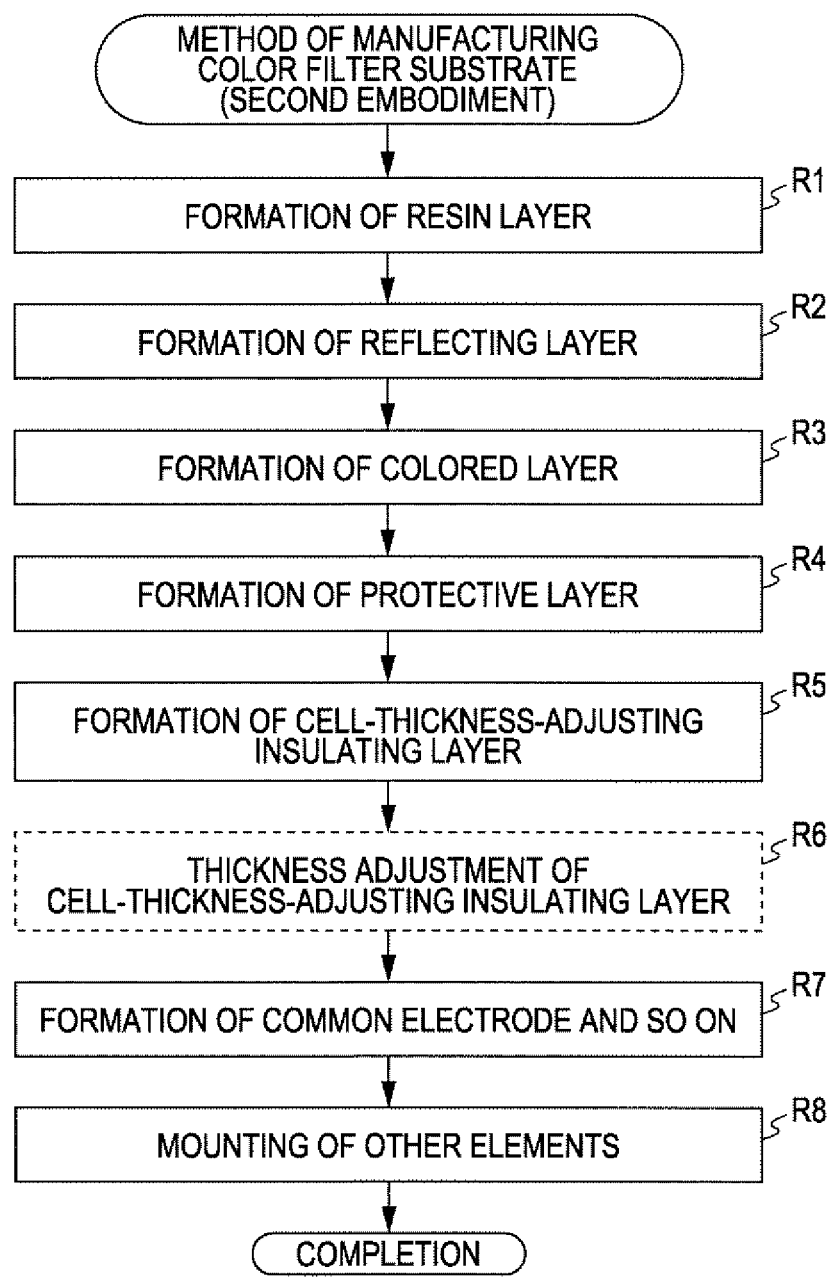
FIG. 22 is a flow chart illustrating a process of a method of manufacturing a color filter substrate according to a second embodiment of the invention.
Figure 25A:
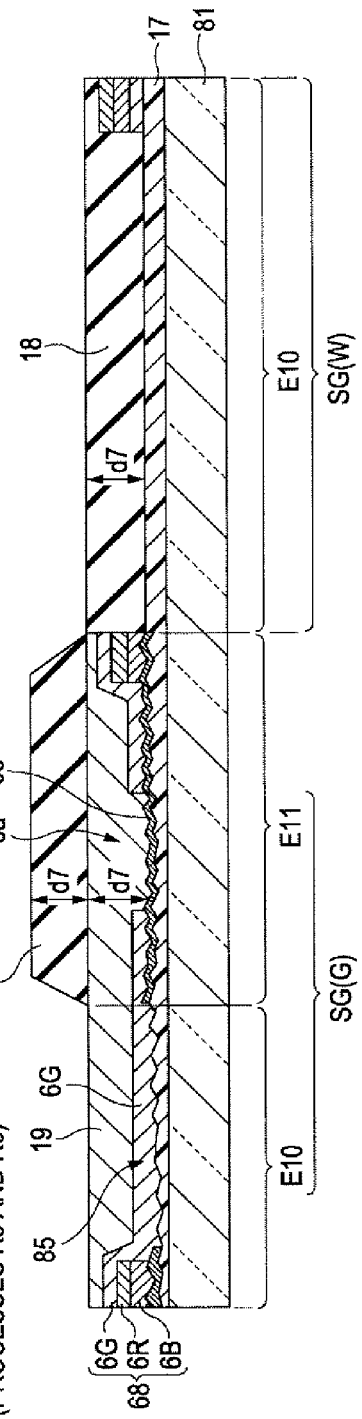
FIG. 25A is a cross-sectional view illustrating a process of a method of manufacturing a color filter substrate according to a second embodiment of the invention.
Figure 25B:
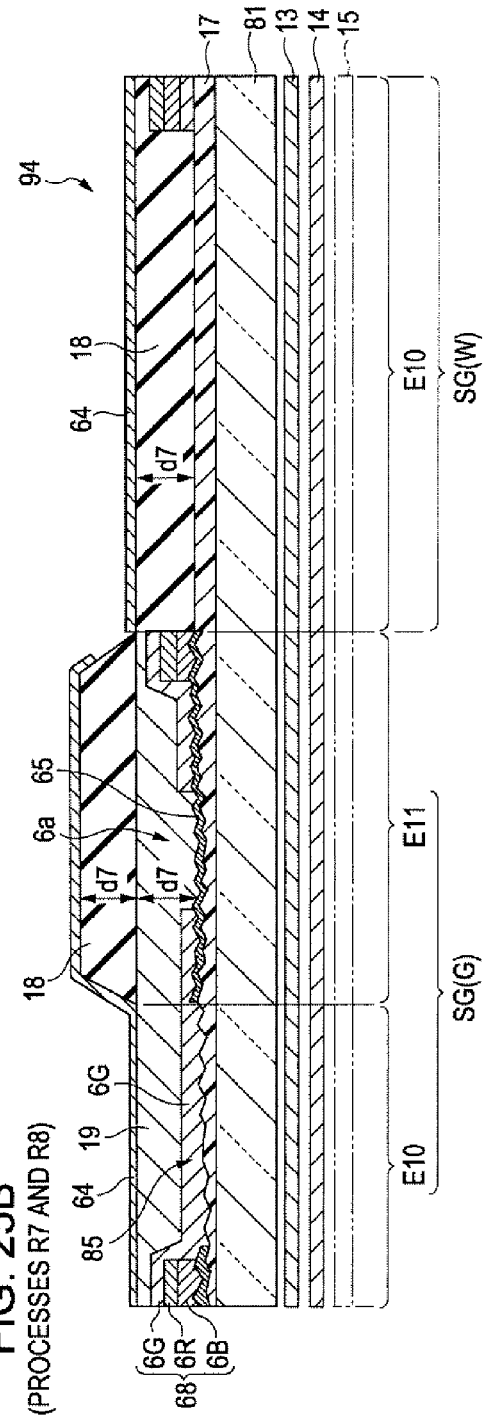
FIG. 25B is a cross-sectional view illustrating a process of a method of manufacturing a color filter substrate according to a second embodiment of the invention.

First, a method of manufacturing a liquid crystal device 200 according to the second embodiment of the invention will be described with reference to FIGS. 15, and 22 to 25. FIG. 22 is a flowchart illustrating a method of manufacturing the color filter substrate 94 according to the second embodiment of the invention. FIGS. 23 to 25 are diagram illustrating the respective processes that correspond to the process S1 in FIG. 15. In FIGS. 23 to 25, the SG (W) indicates the sub-pixel region SG that corresponds to W, and the SG (G) indicates the sub-pixel region SG that corresponds to G. In addition, E10 indicates the region that becomes the transmissive region, and E11 indicates the region that becomes the reflective region. In the below description, the sectional structure of the color filter substrate 94 shown in FIG. 10 will be exemplified.

First, the above-mentioned color filter substrate 94 is manufactured (Process S1). This color filter substrate 94 is manufactured through the processes R1 to R8.

Specifically, first, the lower substrate 81, which is made of a material, such as glass or quartz, is prepared. Then, a resin layer 17, which is made of, for example, a resin material, is formed on the lower substrate 81 by means of a photolithography technology, and then an etching process is performed on the surface of the resin layer 17 that corresponds to the respective sub-pixel regions SG of R, G, and B. Thereby, a plurality of minute unevenness portions are formed on the surface of the resin layer 17 (Process R1).

Next, the respective layer 65 is formed (Process R2). Specifically, on a resin layer 17 that corresponds to the respective reflective regions E11 of R, G, and B, an Al film is formed, and then a portion of the reflecting layer 65, which is formed on the resin layer 17 that corresponds to the respective transmissive regions E10 of R, G, and B, is removed by an etching process. Thereby, a transmissive opening region 85 that has function of transmitting the light is formed in the transmissive region E10 of each of the colored layers of R, G, and B, and the reflecting layer 65 is formed in the respective reflective regions E11 of R, G, and B.

Then, the respective colored layers 6 of R, G, and B are formed by a known method (Process R3). At this time, for example, in order to the respective colored layers 6B, 6R, and 6C, the respective colored layers 6R, 6G, and 6B are formed in the sub-pixel regions SG in which the respective colored layers should be formed. In addition, the order in which the respective colored layers 6R, 6G, and 6B are formed is limited thereto. At this time, an opening 6a, which has a function of displaying the uniform color in the transmissive region E10 and the reflective region E11, is formed in each of the colored layers that correspond to the respective reflective regions E11 of R, G, and B. In addition, in the regions that partition the respective colored layers 6, a light shielding layer 67 where colored layers of any two colors among the respective colored layers 6R, 6G, and 6B overlap each other, and a light shielding layer 68 where the colored layers 6R, 6G, and 6B of three colors overlap one another are formed (see FIG. 8B).

Next, buy using the known method, the protective film 19, which is made of an acrylic resin or the like, is formed at a location that corresponds to the respective sub-pixel regions SG of R, G, and B (Process R4). At this time, the distance from the top surface of the resin layer 17 to the top surface of the protective layer 19 is set to d7.

Then, the cell-thickness-adjusting insulating layer is formed (Process R5). Specifically, by using the same method as the color filter substrate 92 according to the first embodiment, the cell-thickness-adjusting insulating layer 18, which is made of a transparent resin material, is formed over the resin layer 17 that corresponds to the sub-pixel region SG of W and the protective layer 19 that corresponds to the respective sub-pixel regions SG of R, G, and B, and then an etching process is performed with respect to the substrate. At this time, the thickness of the cell-thickness-adjusting insulating layer 18 is set to d7. Thereby, when the liquid crystal device 100 is manufactured by the above-mentioned method, the thickness of the liquid crystal layer 4 at the transmissive region E10 of W can be set to have the same thickness as the liquid crystal layer 4 at the respective transmissive regions of R, G, and B, and the thickness of the liquid crystal layer 4 at the respective transmissive region E10 of R, G, and B and the thickness of the liquid crystal layer 4 at the respective reflective regions E11 of R, G, and B can be set to the predetermined thickness.

Specifically, in this process, the cell-thickness-adjusting insulating layer 18, which is made of the same transparent resin material, are simultaneously formed in the sub-pixel region SG of W and the respective reflective regions E11 of R, G, and B. Therefore, when compared with a method of manufacturing a liquid crystal device in which the cell-thickness-adjusting insulating layer 18 is separately formed in the sub-pixel region SG of W and the respective reflective regions E11 of R, G, and B (comparative example), the number of the processes can be reduced. As a result, it is possible to reduce the manufacturing cost of the liquid crystal device which is manufactured by the present manufacturing method. In addition, if necessary, similar to the method of manufacturing the color filter substrate 92 according to the first embodiment, a process for adjusting the thickness of the cell-thickness-adjusting insulating layer 18 can be performed (Process R6). Further, the process R6 may not the following process of the process R5, but may be included in the process R5.

Next, on the resin layer 17 and the cell-thickness-adjusting insulating layer 18, a scanning electrode 64, which is made of an ITO, is formed in a stripe. Then, an alignment film (not shown) is formed on the scanning electrode 64 or the like (Process R7). Then, the other constituent elements, for example, the phase difference plate 13, the polarizer 14, and the backlight 15 are provided on the outer surface side of the lower substrate 81 (Process R8). In this manner, the color filter substrate 94 according to the second embodiment, which is shown in FIG. 10, is manufactured.

Then, referring back to FIG. 15, the element substrate 93 according to the second embodiment, which is shown in FIG. 10, is manufactured by means of a known method (Process S2). Then, the color filter substrate 94 and the element substrate 93 are bonded to each other through the sealant 5 (not shown) in which a plurality of conductive members 7 are mixed and which has the frame, the liquid crystal is inserted in both substrates through an opening that is provided in the sealant 5, and the opening is sealed by the resin material (Process S3). In addition, the essential elements are mounted (Process S4), and the liquid crystal device 200 according to the second embodiment, which is shown in FIGS. 6 and 10, is manufactured.

Method of Manufacturing Color Filter Substrate (Modification)

Next, a method of manufacturing the color filter substrate 96 that has a structure similar to a structure according to a modification shown in FIG. 12 will be described.

Figure 26A:
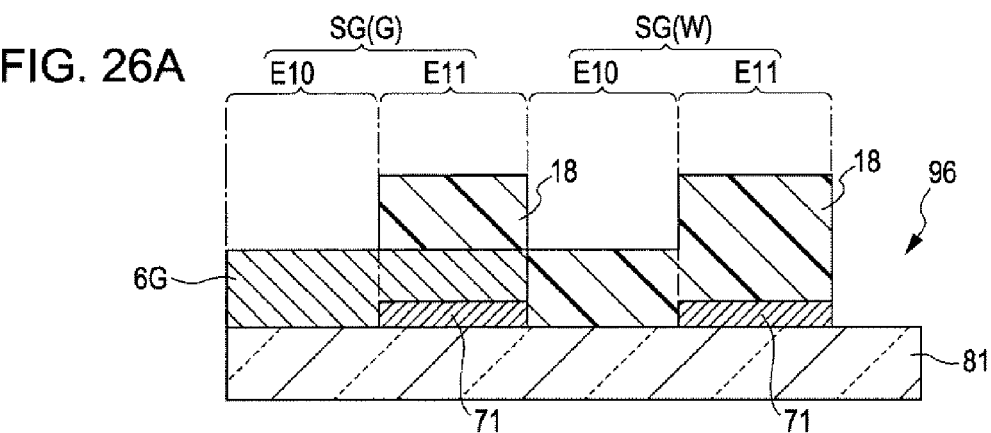
FIG. 26A is a cross-sectional view illustrating a process of manufacturing a color filter substrate according to a modification.

The color filter substrate 96 has the structure that is substantially similar to the structure shown in FIG. 12. However, in the structure of FIG. 12, it is constructed to have the transmissive region E10 and the reflective region E11 in the sub-pixel region SG of W (that is, including the structure that corresponds to FIG. 13B). FIG. 26A is a partial cross-sectional view illustrating a structure of the color filter substrate 96.

First, the structure of the color filter substrate 96 will be simply described with reference to FIG. 26A. In the below description, the same constituent elements as the above-mentioned constituent elements are denoted by the same reference numerals, and the description is omitted or simplified.

As shown in the drawing, the color filter substrate 96 has a structure in which each of the respective sub-pixel regions SG of R, G, B, and W has a transmissive region E10 and a reflective region E11. On each of the lower substrate 81 that corresponds to the reflective region E11 of W and the lower substrate 81 that corresponds to the respective reflective regions E11 of R, G, and B, a reflecting layer 71, which is made of Al or the like, is formed. In addition, on the lower substrate 81 that corresponds to the respective transmissive regions E10 of R, G, and B and the reflecting layer 71 that corresponds to the respective reflective regions E11 of R, G, and B, the colored layers 6R, 6G, and 6B are respectively formed. Therefore, as shown in the drawing, the thickness of the respective colored layers 6 that correspond to the respective transmissive regions E10 of R, G, and B is set to be larger than the thickness of each of the colored layers 6 that are formed on the respective reflecting layers 71. In addition, on the respective colored layers 6 that correspond to the respective reflective regions E11 of R, G, and B, the lower substrate 81 that corresponds to the transmissive region E10 of W, and the reflecting layer 71 that corresponds to the reflective region E11 of W, the cell-thickness-adjusting insulating layer 18, which is made of the same material, is formed. Although not shown, in the color filter substrate 96 that has the above-mentioned structure, the thickness of the liquid crystal layer 4 that corresponds to the respective transmissive regions E10 of R, G, and B is set to the same value as the thickness of the liquid crystal layer 4 that corresponds to the respective reflective regions E11 of R, G, and B, and the thickness of the liquid crystal layer 4 that corresponds to the reflective region E11 of W is set to the same value.

Figure 26B:
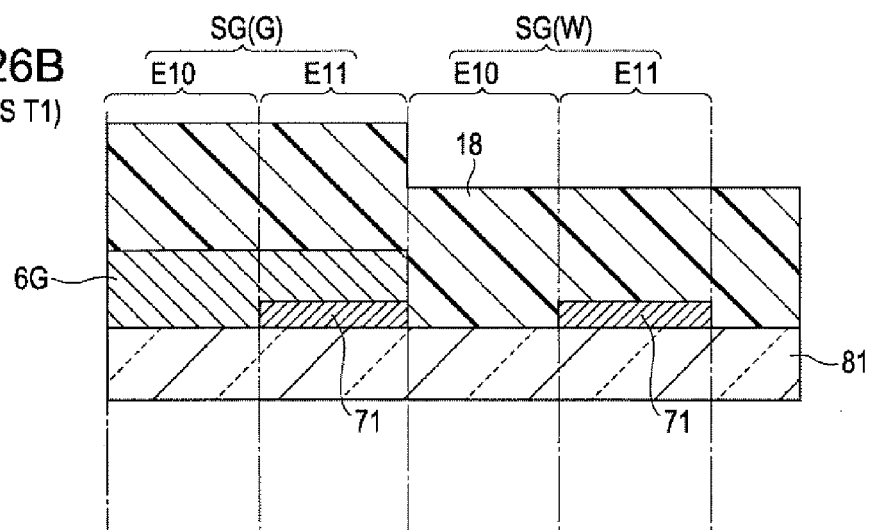
FIG. 26B is a cross-sectional view illustrating a process of manufacturing a color filter substrate according to a modification.

Next, a method of manufacturing the color filter substrate 96 having the above-mentioned structure will be simply described with reference to FIGS. 26B and 26C. In this case, only the processes that correspond to the processes P3 and P4 of FIG. 16 or the processes R5 and R6 of FIG. 22 will be described.

The color filter substrate 96 is manufactured through the process T1 and the process T2 that corresponds to the process subsequent to the process T1. First, in FIG. 26B, the substrate having the structure in which the cell-thickness-adjusting insulating layer 18 is removed is manufactured by the known method, and then the cell-thickness-adjusting insulating layer 18 is formed on the corresponding substrate so as to have the predetermined thickness (Process T1).

Figure 26C:
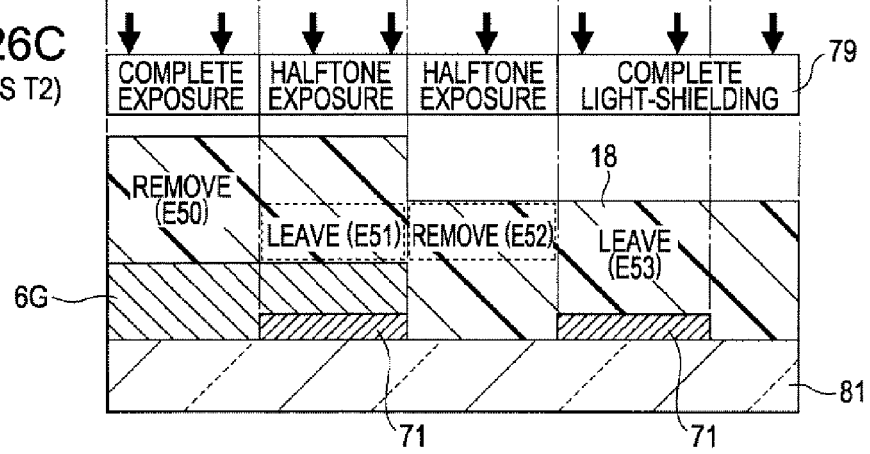
FIG. 26C is a cross-sectional view illustrating a process of manufacturing a color filter substrate according to a modification.

Next, as shown in FIG. 26C, in the photolithography technology, the half tone exposure method is carried out so as to remove the unnecessary cell-thickness-adjusting insulating layer 18. At this time, the used mask 79 has the following regions that are sequentially formed from the left. That is, the mask 79 has a complete exposure region 9 (disposed on a location that corresponds to the respective transmissive regions E10 of R, G, and B), a half tone exposure region (disposed on a location that corresponds to the respective reflective regions E11 of R, G, and B), a half tone exposure region (disposed on a location that corresponds to the transmissive region E10 OF W), and a complete light shielding region (disposed on a location that corresponds to the reflective region E11 of W).

Thereby, in the respective sub-pixel regions SG of R, G, and B, the cell-thickness-adjusting insulating layer 18 that corresponds to the region E50 (hook-shaped region) is removed while the cell-thickness-adjusting insulating layer 18 that corresponds to the region E51 (region surrounded with a broken-line portion) remains as it is. In addition, in the transmissive region E10 of W, the cell-thickness-adjusting insulating layer that corresponds to the region E52 (region surrounded with a broken-line portion) is removed, while in the sub-pixel region SG of W, the cell-thickness-adjusting insulating layer 18 that corresponds to the region E53 remains as it is. In this way, the color filter substrate 96 having the above-mentioned structure is manufactured.

In this manufacturing method, the thickness of the colored layers 6 that correspond to the respective transmissive regions E10 of R, G, and B, and the thickness of the cell-thickness-adjusting insulating layer 18 that corresponds to the respective transmissive regions of W are preferably set to have the same thickness. In addition, the total thickness of the colored layer 6 and the cell-thickness-adjusting insulating layer 18 that correspond to the respective reflective regions E11 of R, G, and B are preferably set to the same value.

Thereby, the advantages and effects of the invention can be achieved in the liquid crystal devices according to the first and second embodiments. In addition, although the color filter substrate 96 is manufactured by using the half tone exposure method in the second embodiment, but the invention is not limited thereto. Specifically, the color filter substrate 96 may be manufactured by using the double exposure method.

Electronic Apparatus

Next, an example in which the liquid crystal device 100 or 200 according to the first or second embodiment of the invention (including the above-described modifications, and it is the same in the below description) is used as a display device of an electronic apparatus will be described.

FIG. 27 is a diagram schematically illustrating an entire structure of the present example. The electronic apparatus that is illustrated in the present example includes the above-described liquid crystal device 100 or 200, and a control unit 410 that controls the liquid crystal device. In this case, the liquid crystal device 100 or 200 which is conceptually divided into a panel structure 403, and a driving circuit 402 having a semiconductor IC or the like is shown. In addition, the control unit 410 includes a display information output source 411, a display information processing circuit 412, a power supply circuit 413, and a timing generator 414.

The display information output source 411 includes a memory that is composed of a ROM (Read Only Memory) or a RAM (Random Access Memory), a storage unit that is composed of a magnetic recording disk or an optical recording disk, a tuning circuit that tunes the digital image signal. The display information output source 411 is constructed such that the display information is supplied to the display information processing circuit 412 in a form of an image signal having a predetermined format.

The display information processing circuit 412 includes various circuit, such as a serial-parallel conversion circuit, an amplifying/inverting circuit, a rotation circuit, a gamma correction circuit, or the like, and processes the input display information and supplies the image information to the driving circuit 402 together with the clock signal CLK. The driving circuit 402 includes a scanning line driving circuit, a data line driving circuit, and a test circuit. In addition, the power supply circuit 413 supplies the predetermined voltage to the above-described respective constituent elements.

Next, a specific example of an electronic apparatus to which the liquid crystal device 100 or 200 according to the first or second embodiment of the invention (including the above-mentioned various modifications) can be applied will be described with reference to FIG. 28.

Figure 28A:
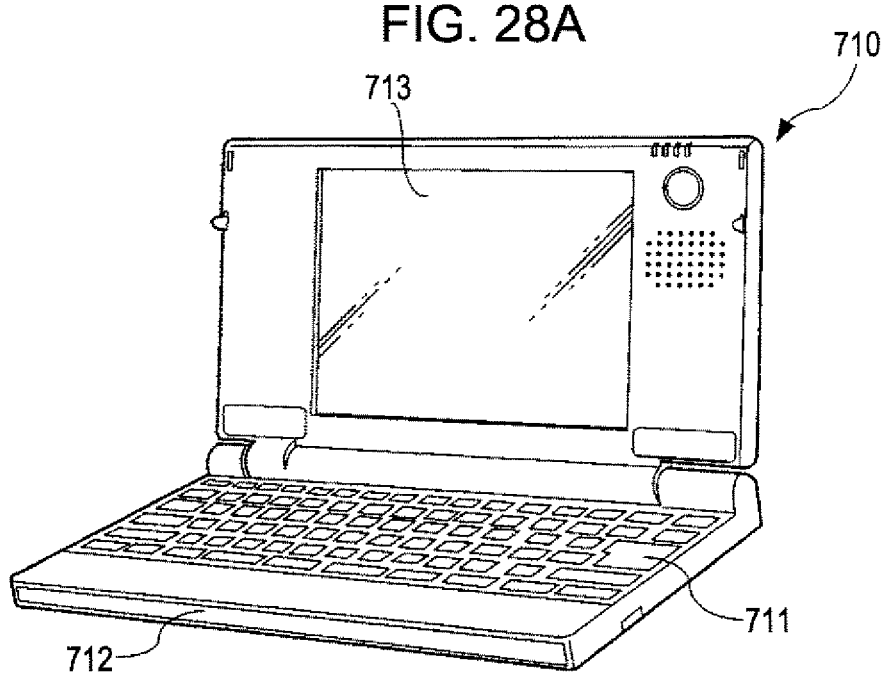
FIG. 28A is a diagram illustrating an example of an electronic apparatus to which a liquid crystal device according to embodiments of the invention is applied.

First, an example in which the liquid crystal device 100 or 200 according to the first or second embodiment of the invention (including the above-mentioned various modifications, and it is the same in the below description) is applied to the display unit of the portable personal computer (so-called notebook-type personal computer) will be described. FIG. 28A is a perspective view illustrating a structure of a personal computer. As shown in FIG. 28A, the personal computer 710 includes a main body unit 712 that has a keyboard 711 and a display unit 713 in which the liquid crystal device according to the present embodiment is applied as a panel.

Figure 28B:
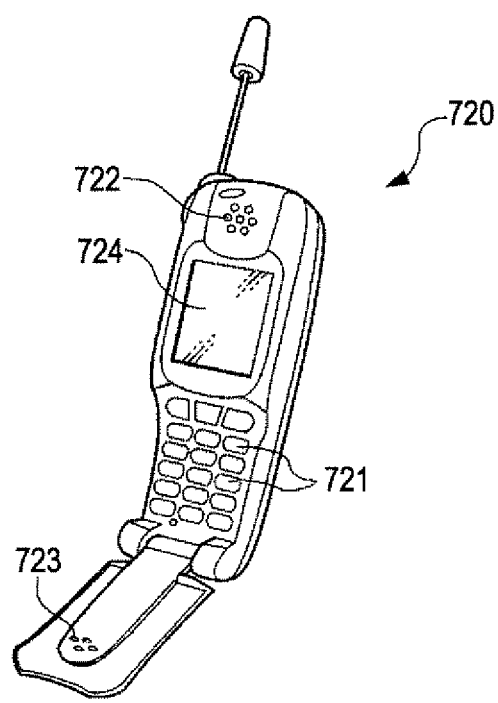
FIG. 28B is a diagram illustrating an example of an electronic apparatus to which a liquid crystal device according to embodiments of the invention is applied.

Next, an example in which the liquid crystal device 100 or 200 according to the first and second embodiments of the invention (including the various modifications) is applied to the display unit of the cellular phone will be described. FIG. 28B is a perspective view illustrating a structure of a cellular phone. As shown in the drawing, the cellular phone 720 includes, in addition to a plurality of operation buttons 721, an earpiece 722, a mouthpiece 723, and a display unit 724 to which the liquid crystal device according to the first to third embodiments of the invention is applied.

In addition, examples of an electronic apparatus in which the liquid crystal device 100 or 200 according to the first or second embodiment (including the various modifications) include, in addition to the personal computer shown in FIG. 28A and the cellular phone shown in FIG. 28B, a liquid crystal television, a view-finder-type or monitor-direct-view-type video tape recorder, a car navigation device, a pager, an electronic note, an electronic calculator, a word processor, a work station, a video phone, a POS terminal, a digital still camera or the like.

The entire disclosure of Japanese Patent Application Nos: 2005-197074, filed Jul. 6, 2005 and 2006-090365, filed Mar. 29, 2006 are expressly incorporated by reference herein.

What is claimed is:

1. A liquid crystal display device, comprising:
   a liquid crystal layer disposed between a pair of substrates;
   a first display pixel corresponding to a color other than white or no color, the first display pixel including a transmissive region and a reflective region;
   a second display pixel corresponding to white or no color, the second display pixel including at least a transmissive region;
   a colored layer between the first display pixel and the second display pixel, the colored layer having a thickness and being selectively disposed in the first display pixel;
   a cell-thickness-adjusting layer disposed above at least one of the pair of substrates that controls a thickness of the liquid crystal layer;
   the cell-thickness-adjusting layer being disposed in the reflective region of the first display pixel and in the transmissive region of the second display pixel;
   wherein no cell-thickness-adjusting layer is provided in the transmissive region of the first display pixel;
   a thickness of the liquid crystal layer is thicker in the transmissive region of the second display pixel than in the reflective region of the first display pixel; wherein
   the thickness of the cell-thickness-adjusting layer that is provided in the reflective region of the first display pixel is equal to the thickness of the cell-thickness-adjusting layer that is provided in the transmissive region of the second display pixel.

2. The liquid crystal display device according to claim 1, wherein the second display pixel has a reflective region, and a thickness of the cell-thickness-adjusting layer in the second display pixel is thicker in the reflective region than in the transmissive region.

3. The liquid crystal device according to claim 1, wherein the cell-thickness-adjusting layer is made of the same material in the first and second display pixels.

4. The liquid crystal device according to claim 1, wherein the thickness of the cell-thickness-adjusting layer and the thickness of the colored layer are set such that the thickness of the liquid crystal layer of the transmissive region in the first display pixel and the thickness of the liquid crystal layer of the transmissive region in the second display pixel are not largely different than each other.

5. The liquid crystal device according to claim 1, wherein the colored layer is disposed in the transmissive region and the reflective region in the first display pixel, and the thickness of the colored layer is thicker in the transmissive region than in the reflective region.

6. The liquid crystal device according to claim 1, further comprising a reflecting layer in the reflective region of the first display pixel.

7. An electronic apparatus comprising the liquid crystal device according to claim 1 as a display unit.

8. The liquid crystal device according to claim 1, wherein the thickness of the color layer disposed in the first display pixel is equal to the thickness of the cell-thickness-adjusting layer disposed in the second display pixel.

9. A liquid crystal display device, comprising:
a liquid crystal layer disposed between a pair of substrates;
a first display pixel including a transmissive region and a reflective region;
a second display pixel including at least a transmissive region;
a colored layer between the first display pixel and the second display pixel, the colored layer being disposed on a first substrate and having a thickness and being selectively disposed in the first display pixel;
a cell-thickness-adjusting layer disposed on said first substrate containing the colored layer, the cell-thickness-adjusting layer controlling a thickness of the liquid crystal layer;
the cell-thickness-adjusting layer being disposed in the reflective region of the first display pixel and in the transmissive region of the second display pixel, wherein a thickness of the cell-thickness-adjusting layer that is provided in the reflective region of the first display pixel is equal to a thickness of the cell-thickness-adjusting layer that is provided in the transmissive region of the second display pixel,
wherein no cell-thickness-adjusting layer is provided in the transmissive region of the first display pixel, and wherein,
a thickness of the liquid crystal layer is thicker in the transmissive region of the second display pixel than in the reflective region of the first display pixel.

10. The liquid crystal display device according to claim 9, wherein the second display pixel has no reflective region.

11. The liquid crystal display device according to claim 9, wherein the second display pixel has a reflective region, and a thickness of the cell-thickness-adjusting layer in the second display pixel is thicker in the reflective region than in the transmissive region.

12. The liquid crystal device according to claim 9, wherein the cell-thickness-adjusting layer is made of the same material in the first and second display pixels.

13. The liquid crystal device according to claim 9, wherein the thickness of the cell-thickness-adjusting layer and the thickness of the colored layer are set such that the thickness of the liquid crystal layer of the transmissive region in the first display pixel and the thickness of the liquid crystal layer of the transmissive region in the second display pixel are not largely different than each other.

14. The liquid crystal device according to claim 9, wherein the colored layer is disposed in the transmissive region and the reflective region in the first display pixel, and the thickness of the colored layer is thicker in the transmissive region than in the reflective region.

15. The liquid crystal device according to claim 9, further comprising a reflecting layer in the reflective region of the first display pixel.

16. An electronic apparatus comprising the liquid crystal device according to claim 9 as a display unit.

* * * * *